United States Patent
Sudo

(10) Patent No.: US 8,363,632 B2
(45) Date of Patent: Jan. 29, 2013

(54) RADIO TRANSMITTING APPARATUS, RADIO RECEIVING APPARATUS, AND RADIO TRANSMISSION METHOD

(75) Inventor: Hiroaki Sudo, Yokohama (JP)

(73) Assignee: Panasonic Corporation, Osaka (JP)

( * ) Notice: Subject to any disclaimer, the term of this patent is extended or adjusted under 35 U.S.C. 154(b) by 360 days.

(21) Appl. No.: 12/561,206

(22) Filed: Sep. 16, 2009

(65) Prior Publication Data

US 2010/0008301 A1 Jan. 14, 2010

Related U.S. Application Data

(63) Continuation of application No. 10/466,674, filed as application No. PCT/JP02/12254 on Nov. 25, 2002.

(30) Foreign Application Priority Data

Nov. 26, 2001 (JP) .................. 2001-359964
Feb. 7, 2002 (JP) .................. 2002-031243
Apr. 17, 2002 (JP) .................. 2002-115537

(51) Int. Cl.
 H04B 7/216 (2006.01)
 H04J 1/00 (2006.01)
 H04J 11/00 (2006.01)
(52) U.S. Cl. .................. 370/342; 370/343; 370/206
(58) Field of Classification Search .................. 370/208, 370/206, 342, 343
 See application file for complete search history.

(56) References Cited

U.S. PATENT DOCUMENTS

| | | | |
|---|---|---|---|
| 5,371,548 A | 12/1994 | Williams | |
| 5,646,935 A | 7/1997 | Ishikawa et al. | |
| 6,298,035 B1 * | 10/2001 | Heiskala | 370/206 |
| 6,473,467 B1 * | 10/2002 | Wallace et al. | 375/267 |
| 6,721,300 B1 | 4/2004 | Akiba | |
| 6,801,586 B1 * | 10/2004 | Imamura | 375/340 |
| 6,937,558 B2 | 8/2005 | Wakutsu | |
| 6,996,077 B1 | 2/2006 | Suenaga | |
| 7,171,175 B2 | 1/2007 | Lahti | |
| 2001/0028637 A1 | 10/2001 | Abeta et al. | |
| 2002/0054585 A1 | 5/2002 | Hanada | |
| 2002/0159425 A1 | 10/2002 | Uesugi | |
| 2003/0072254 A1 * | 4/2003 | Ma et al. | 370/208 |
| 2003/0185179 A1 | 10/2003 | Inogai | |
| 2010/0074377 A1 | 3/2010 | Izumi | |

FOREIGN PATENT DOCUMENTS

| | | |
|---|---|---|
| CN | 1314750 | 9/2001 |
| EP | 0 869 647 | 10/1998 |
| EP | 1033853 | 9/2000 |
| EP | 1083719 | 3/2001 |

(Continued)

OTHER PUBLICATIONS

International Search Report dated Mar. 4, 2003.

(Continued)

*Primary Examiner* — Mark Rinehart
*Assistant Examiner* — Angel Brockman
(74) *Attorney, Agent, or Firm* — Dickinson Wright PLLC

(57) ABSTRACT

The degree of multiplexing of a code division multiplexed signal transmitted by subcarriers is selected on a subcarrier-by-subcarrier basis. As a result, inter-code interference on the propagation path and degradation on the propagation path are lower for a code division multiplexed signal allocated to subcarriers with a low degree of signal multiplexing (G1) than for transmit signals allocated to subcarriers with a high degree of multiplexing. By this technique, it is possible to prevent degradation of the error rate characteristics of important information without lowering spectral efficiency significantly as compared with the case in which the degree of signal multiplexing is decided uniformly for all subcarriers, and to achieve compatibility between spectral efficiency and error rate characteristics.

5 Claims, 66 Drawing Sheets

FOREIGN PATENT DOCUMENTS

| | | |
|---|---|---|
| EP | 1094679 | 4/2001 |
| EP | 1115221 | 7/2001 |
| JP | 60074856 | 4/1985 |
| JP | 04022232 | 1/1992 |
| JP | 06204969 | 7/1994 |
| JP | 07079415 | 3/1995 |
| JP | 07254915 | 10/1995 |
| JP | 11145929 | 5/1999 |
| JP | 11145933 | 5/1999 |
| JP | 2000261366 | 9/2000 |
| JP | 2000332723 | 11/2000 |
| JP | 2000332724 | 11/2000 |
| JP | 2001028577 | 1/2001 |
| JP | 2001077788 | 3/2001 |
| JP | 2001128238 | 5/2001 |
| JP | 2001144722 | 5/2001 |
| JP | 2001156744 | 6/2001 |
| JP | 2001203664 | 7/2001 |
| JP | 2001237803 | 8/2001 |
| JP | 2002077105 | 3/2002 |
| JP | 2002111631 | 4/2002 |

OTHER PUBLICATIONS

Japanese Office Action dated Mar. 8, 2005 with English translation.
Japanese Office Action dated Apr. 12, 2005 with English translation.
Sumasu, et al., "An OFDM-CDMA System Using Combination of Time and Frequency Domain Spreading," The Institute of Electronics, information and Communication Engineers, Technical Report of IEICE, RCS2000-3 (Apr. 2000), vol. 100, No. 21, pp. 13-18, Apr. 21, 2000, with English abstract,.
European Search Report dated Dec. 19, 2008.
Japanese Office Action dated Nov. 8, 2005 with English translation.
M. Sawahashi, et al., "Broadband TD-OFCDM Packet Transmission using Variable Spreading Factor," Proceedings of the 2001 IEICE General Conference, Japan, The Institute of Electronics Information and Communication Engineers, vol. 1, 3 pages total, Mar. 7, 2001, with partial English translation.
Chinese Office Action dated Aug. 17, 2012 on the corresponding Chinese Patent Application.

* cited by examiner

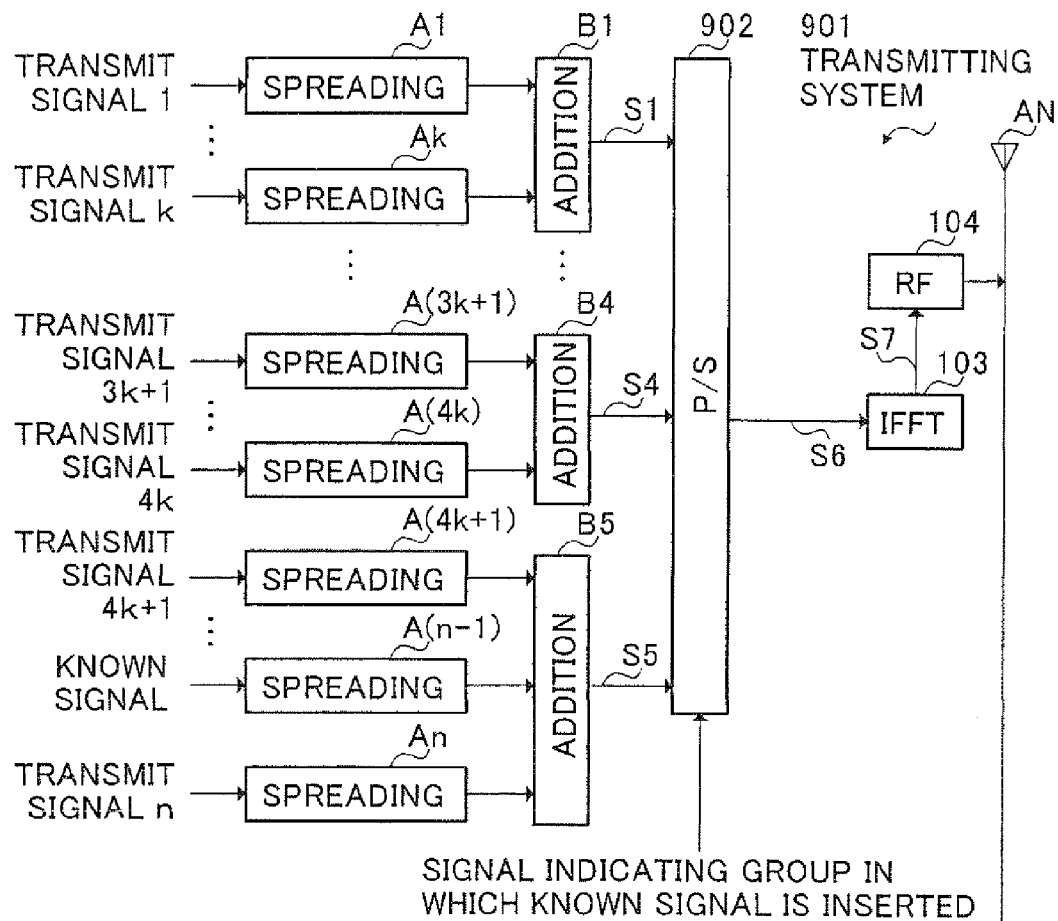
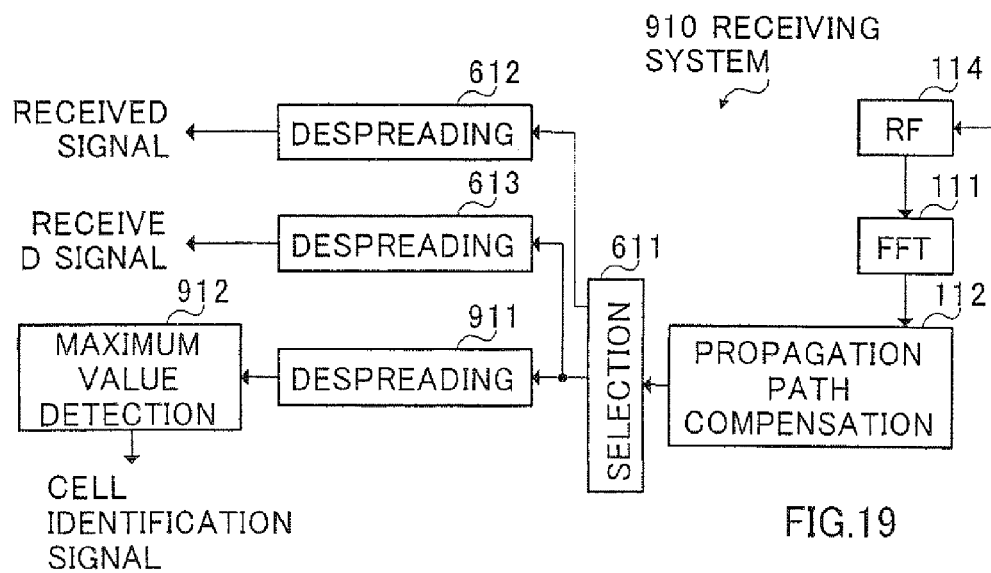
FIG.19

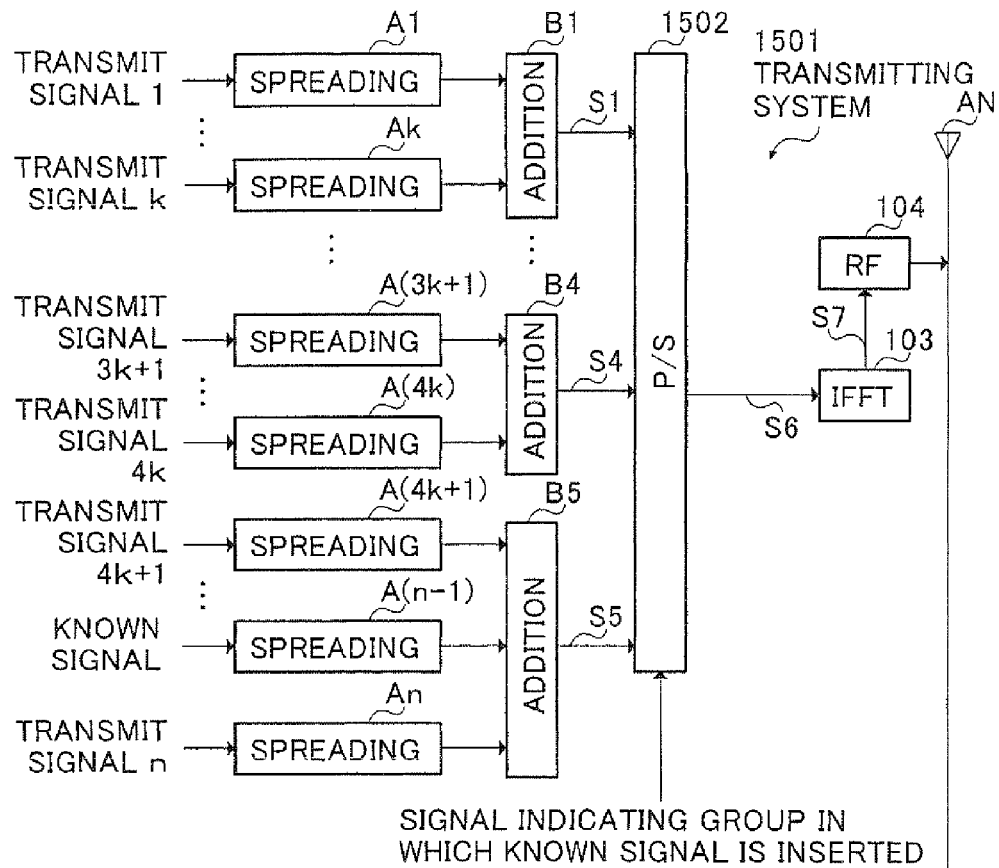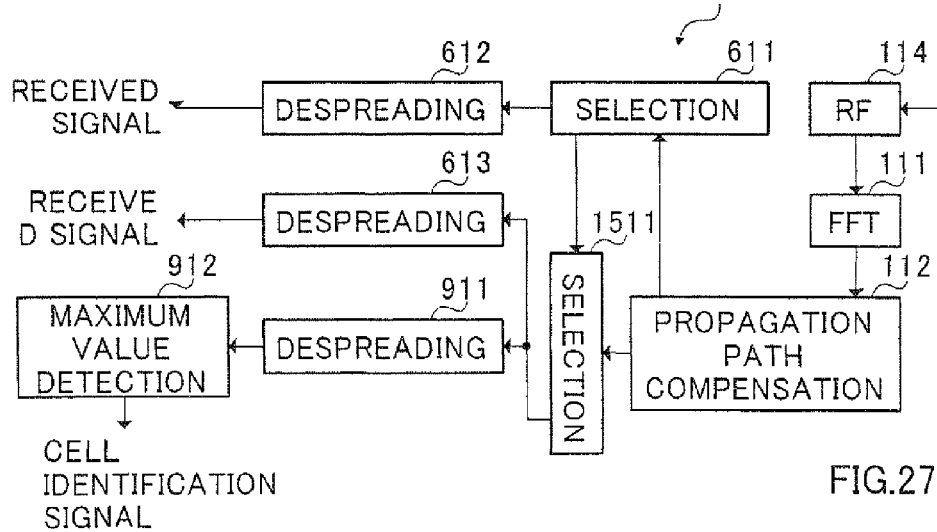
FIG.27

RADIO TRANSMITTING APPARATUS, RADIO RECEIVING APPARATUS, AND RADIO TRANSMISSION METHOD

This is a continuation application of application Ser. No. 10/466,674 filed Jul. 21, 2003, which is a national phase under 35 USC 371 of PCT/PCT/JP2002/12254 filed Nov. 25, 2002, which is based on Japanese application number 2002-115537 filed Apr. 17, 2002, Japanese application number 2002-31243 filed Feb. 7, 2002, and Japanese application number 2001-359964 filed Nov. 26, 2001, the entire contents of each of which are incorporated by reference herein.

TECHNICAL FIELD

The present invention relates to a radio transmitting apparatus, radio receiving apparatus, and radio transmission method for use in a radio communication system that employs CDMA (Code Division Multiple Access) and OFDM (Orthogonal Frequency Division Multiplexing) technologies.

BACKGROUND ART

Conventionally, in a radio communication system combining OFDM and CDMA (hereinafter referred to as "OFDM-CDMA"), the combination of the characteristic of resistance to frequency selective fading that is an advantage of OFDM modulation, and the characteristic of excellent interference resistance through spreading gain that is an advantage of CDMA, results in an ability to implement high-speed, high-quality communications.

OFDM-CDMA methods broadly comprise a time domain spreading method and a frequency domain spreading method. With the time domain spreading method, spread data that have been spread on a chip-by-chip basis by means of a spreading code are arranged in the time direction within the same subcarrier. With the frequency domain spreading method, on the other hand, spread data that have been spread on a chip-by-chip basis are assigned to different subcarriers.

The frequency domain spreading method will now be described. FIG. 1 is a schematic diagram showing the state of digital symbols before OFDM-CDMA processing, and FIG. 2 is a schematic diagram showing the arrangement of chips after OFDM-CDMA processing using frequency domain spreading. With frequency domain spreading, each of N digital symbols constituting a serial data sequence (FIG. 1) is multiplied by, for example, a spreading code with a spreading factor of M, the same value as the number of subcarriers M.

After spreading, the chips, arranged with M chips in parallel, undergo IFFT (inverse fast Fourier transform) processing sequentially, one symbol at a time. As a result, N OFDM symbols for M subcarriers are created. That is to say, with frequency domain spreading, spread chips are arranged on the frequency axis at their respective times (FIG. 2). In other words, spread chips are allocated to different subcarriers.

A sample configuration of a conventional OFDM-CDMA communication apparatus that implements this frequency spreading method is shown in FIG. 3. First, transmitting system 2 of OFDM-CDMA communication apparatus 1 will be described. In the OFDM-CDMA communication apparatus 1, a plurality of transmit signals 1 through k, ..., (4k+1) through 5k are input to spreaders A1 through A(5k) that perform spreading processing using different spreading codes. The spread signals are added by adders C1 through C5, as a result of which code division multiplexed signals are obtained. In the case shown in FIG. 3, k transmit signals are multicode-multiplexed by each of adders C1 through C5.

The code division multiplexed signals output from adders C1 through C5 undergo parallel/serial conversion by a parallel/serial converter (P/S) 4, and then undergo orthogonal frequency division multiplexing by means of inverse fast Fourier transform processing by an inverse fast Fourier transform circuit (IFFT) 5. By this means, an OFDM-CDMA signal is formed in which spread chips are distributed among a plurality of subcarriers that have a mutually orthogonal relationship, and this OFDM-CDMA signal is transmitted via a radio transmitting section (RF) 10 that performs radio transmission processing such as digital/analog conversion and signal amplification, and an antenna AN.

Next, receiving system 3 of OFDM-CDMA communication apparatus 1 will be described. In OFDM-CDMA communication apparatus 1, an OFDM-CDMA signal transmitted from an OFDM-CDMA communication apparatus with a similar configuration is input to a fast Fourier transform circuit (FFT) 6 via an antenna AN and a radio receiving section (RF) 11 that performs radio reception processing such as analog/digital conversion. FFT 6 executes fast Fourier transform processing on the input signal, and thereby extracts a code division multiplexed signal distributed among a plurality of subcarriers.

A propagation path compensation circuit 7 compensates for phase fluctuations, etc., occurring in the propagation path, based on a known signal such as a propagation path estimation preamble included in the signal. After propagation path compensation, the signal is despread by a despreader 8, and the received signal for that station is extracted from the spread plurality of transmit signals.

FIG. 4 shows the arrangement of OFDM-CDMA signals formed by OFDM-CDMA communication apparatus 1. As can be seen from FIG. 4, radio transmitting apparatus 1 divides $5k$ transmit signals 1 through $5k$ into 5 groups, forms code division multiplexed signals on a group-by-group basis, and performs frequency domain spreading of the code division multiplexed signals in subcarriers of different groups.

Specifically, code division multiplexed transmit signals 1 through k are allocated by frequency domain spreading to subcarriers #1 through #m, the same number as the spreading ratio m, code division multiplexed transmit signals k+1 through $2k$ are allocated by frequency domain spreading to subcarriers #$4m$+1 through #$5m$, and so on through to code division multiplexed transmit signals $4k$+1 through $5k$, which are allocated by frequency domain spreading to subcarriers #m+1 through #$2m$.

The number of subcarriers need not coincide with the spreading ratio. Here, a case has been shown in which subcarriers are divided into 5 subcarrier groups, and the spreading ratio is made 1/5 the number of subcarriers in order for code division multiplexed signals to be allocated within each subcarrier group. However, the spreading ratio is not limited to this case, and may be set arbitrarily.

In an OFDM-CDMA communication apparatus, it is necessary to increase the degree of signal multiplexing in order to improve spectral efficiency. However, in a multipath environment, for instance, orthogonality between spreading codes is lost and error rate characteristics degrade. This is because multipathing occurs independently in each subcarrier, and therefore inter-chip orthogonality is lost when each spread chip is spread along the frequency axis.

As the degree of signal multiplexing is increased, in particular, interference between spreading codes also increases, resulting in greater degradation of error rate characteristics. Thus, a problem with conventional OFDM-CDMA communication apparatuses is the difficulty of making spectral efficiency compatible with error rate characteristics.

DISCLOSURE OF INVENTION

It is an object of the present invention to provide an OFDM-CDMA radio transmitting apparatus, radio receiving apparatus, and radio transmission method that make it possible to make spectral efficiency compatible with error rate characteristics.

This object is achieved by appropriately selecting the degree of transmit signal multiplexing on subcarrier-by-subcarrier when performing radio transmission using the OFDM-CDMA method. By so doing, it is possible to improve error rate characteristics in subcarriers for which the degree of signal multiplexing has been reduced without greatly lowering overall spectral efficiency.

BRIEF DESCRIPTION OF DRAWINGS

FIG. 19 is a block diagram showing the configuration of an OFDM-CDMA communication apparatus according to Embodiment 9;

FIG. 27 is a block diagram showing the configuration of an OFDM-CDMA communication apparatus according to Embodiment 15;

BEST MODE FOR CARRYING OUT THE INVENTION

With reference now to the accompanying drawings, embodiments of the present invention will be explained in detail below.

(Embodiment 1)

Figure 5:
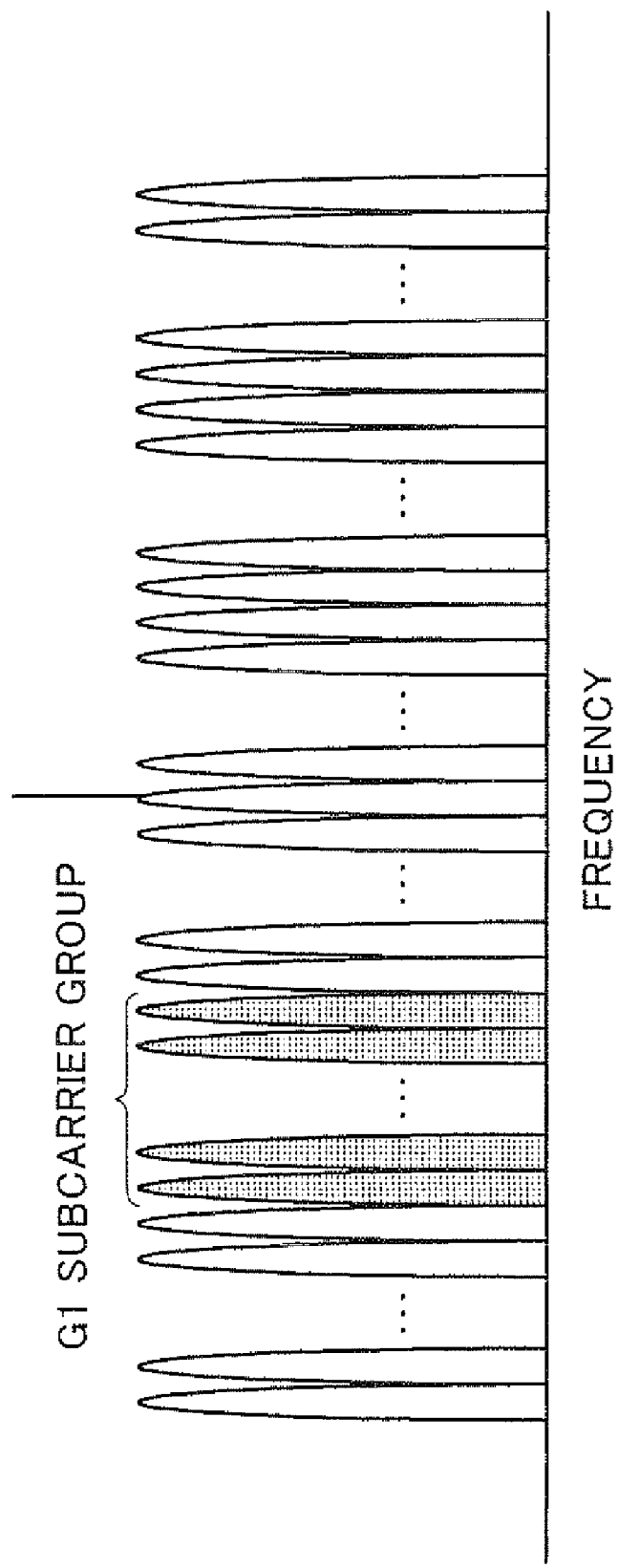
FIG. 5 is a schematic diagram showing a sample arrangement of subcarrier groups for which the degree of signal multiplexing has been reduced in an OFDM-CDMA signal of the present invention.

In an OFDM-CDMA radio transmitting apparatus according to Embodiment 1 of the present invention, the degree of signal multiplexing is set individually for each subcarrier. For example, the spreading ratio may be set as 1/5 the number of subcarriers, with all subcarriers being divided into 5 subcarrier groups. Here, as shown in FIG. 5, the degree of signal multiplexing is set low for one subcarrier group G1 (indicated by shading in FIG. 5) of the 5 subgroups.

As a result, within the 5 subcarrier groups, error rate characteristics can be improved for subcarrier group G1 without lowering spectral efficiency at all for the subcarrier groups other than subcarrier group G1. By this means, it is possible to make spectral efficiency compatible with error rate characteristics.

In this embodiment, a signal for a communicating party whose channel quality is poor, such as a distant radio station or a radio station with a poor SIR (Signal to Interference Ratio), for example, is allocated to subcarrier group G1 for which the degree of signal multiplexing is set low. By this means, it is possible to improve the error rate characteristics of a communicating party with poor channel quality, with almost no lowering of spectral efficiency.

Here, a case has been described in which the spreading ratio is made 1/5 the number of subcarriers, but the spreading ratio is not restricted to this case, and can be set arbitrarily. For example, it is possible to divide all the subcarriers into 4 subcarrier groups, and to set the spreading ratio of one of those subcarrier groups at twice that of the other groups.

Thus, according to this embodiment, by setting the degree of signal multiplexing individually for each subcarrier and reducing the degree of signal multiplexing for a user with poor channel quality, it is possible to improve error rate characteristics with almost no lowering of spectral efficiency.

The actual configuration of an OFDM-CDMA communication apparatus according to this embodiment will now be described, using FIG. 6. Transmitting system 101 of OFDM-CDMA communication apparatus 100 divides n transmit signals 1 through n into 5 groups, and performs frequency domain spreading of transmit signals within each group onto the same plurality of subcarriers.

In actuality, in transmitting system 101, transmit signals 1 through n are input to spreaders A1 through An, which perform spreading processing using different spreading codes.

The spread signals are added by adders B1 through B5 as signal multiplexing degree selecting sections, one of which is provided for each group (in this embodiment, each of 5 groups), and by this means, code division multiplexed signals S1 through S5 corresponding to the predetermined number of groups are obtained.

Here, in transmitting system 101, adders B1 through B4 form code division multiplexed signals S1 through S4 in each of which k transmit signals are multiplexed, whereas adder B5 forms code division multiplexed signal S5 in which fewer than k transmit signals are multiplexed. That is to say, the number of signals (n−4k) of transmit signals (4k+1) through n that are code division multiplexed by adder B5 is selected so that 1<(n−4k)<k. By this means, code division multiplexed signals S1 through S4, and S5, with different chip rates, are output by adders B1 through B4 and adder B5.

Code division multiplexed signals S1 through S5 obtained by adders B1 through B5, respectively, are input to a parallel/serial converter (P/S) 102 as a multiplex signal allocation selecting section. Parallel/serial converter 102 rearranges code division multiplexed signals S1 through S5 in a predetermined order, and outputs them as a serial signal S6. In this embodiment, this arrangement order determines which subcarrier groups in FIG. 5 code division multiplexed signals S1 through S5 are allocated to by frequency domain spreading.

Serial signal S6 output from parallel/serial converter 102 is input to an inverse fast Fourier transform circuit (IFFT) 103 as an orthogonal frequency division multiplexing section. Inverse fast Fourier transform circuit 103 executes inverse fast Fourier transform processing on serial signal S6 for each of code division multiplexed signals S1 through S5, and thereby allocates spread chips by distributing them among a plurality of subcarriers that are in a mutually orthogonal relationship.

At this time, code division multiplexed signal S1 that was code division multiplexed by adder B1, for example, is allocated by frequency domain spreading to a certain subcarrier group, and code division multiplexed signal S5 that was code division multiplexed by adder B5 is allocated by frequency domain spreading to subcarrier group G1 in FIG. 5.

In this way, it is possible to form an OFDM-CDMA signal S7 in which a transmit signal with a smaller degree of multiplexing than other subcarrier groups is allocated to subcarrier group G1. Obtained OFDM-CDMA signal S7 is then transmitted via a radio transmitting section (RF) 104 that performs radio transmission processing such as digital/analog conversion and signal amplification, and an antenna AN.

Next, receiving system 110 of OFDM-CDMA communication apparatus 100 will be described. In OFDM-CDMA communication apparatus 100, an OFDM-CDMA signal transmitted from an OFDM-CDMA communication apparatus with a similar configuration is input to a fast Fourier transform circuit (FFT) 111 via antenna AN and a radio receiving section (RF) 114 that performs radio reception processing such as analog/digital conversion. FFT 111 executes fast Fourier transform processing on the input signal, and thereby extracts a code division multiplexed signal distributed among a plurality of subcarriers.

A propagation path compensation circuit 112 compensates for phase fluctuations, etc., occurring in the propagation path, based on a known signal such as a propagation path estimation preamble included in the signal. After propagation path compensation, the signal is despread by a despreader 113, and the received signal for that station is extracted from the spread plurality of transmit signals.

With the above configuration, transmit signals (4k+1) through n allocated to subcarriers with a low degree of signal multiplexing are subject to less inter-code interference on the propagation path than transmit signals 1 through k, . . . , (3k+1) through 4k allocated to subcarriers with a high degree of multiplexing.

As a result, compared with the case in which the degree of signal multiplexing is decided uniformly for all subcarriers, if transmit signals (4k+1) through n carrying important information or for which it is desired to improve the error rate are allocated to subcarriers with a low degree of signal multiplexing, and transmit signals 1 through k, . . . , (3k+1) through 4k for which the error rate need not be improved so much are allocated to subcarriers with a high degree of signal multiplexing, degradation of error rate characteristics can be prevented without lowering spectral efficiency significantly.

Thus, an OFDM-CDMA communication apparatus 100 can be implemented that enables spectral efficiency and error rate characteristics to be made compatible.

(Embodiment 2)

A special feature of an OFDM-CDMA communication apparatus according to Embodiment 2 of the present invention is that, by selecting as a transmit signal for which the degree of signal multiplexing is set low, described in Embodiment 1, a transmit signal such as retransmission information or control information for which better channel quality is required than for other data, the quality of data for which better channel quality is required than for other data is improved.

Figure 6:
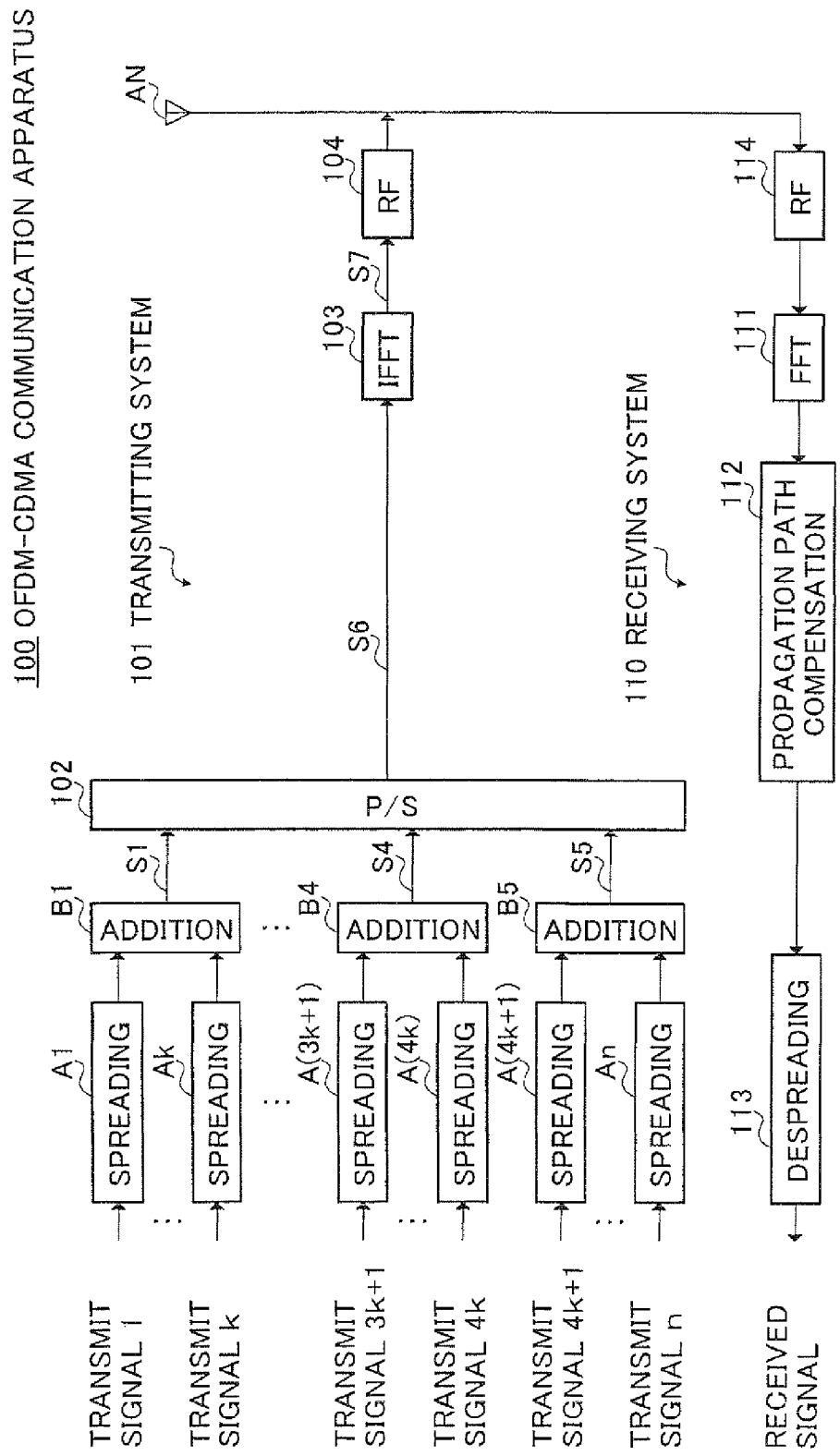
FIG. 6 is a block diagram showing the configuration of an OFDM-CDMA communication apparatus according to Embodiment 1 of the present invention.
Figure 7:
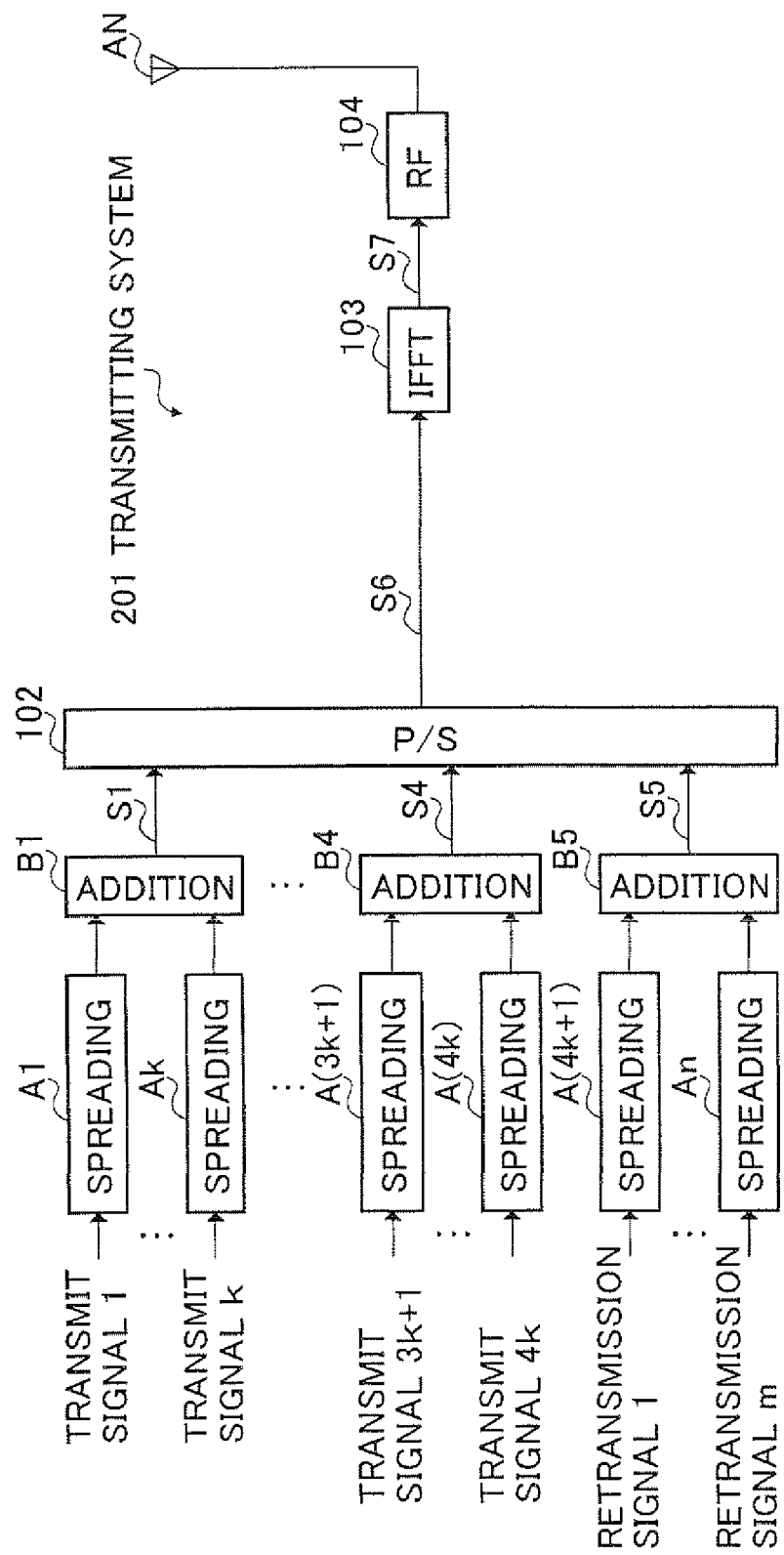
FIG. 7 is a block diagram showing the configuration of the transmitting system of an OFDM-CDMA communication apparatus according to Embodiment 2.

FIG. 7 shows the configuration of an OFDM-CDMA communication apparatus according to this embodiment. In OFDM-CDMA communication apparatus 200 according to this embodiment, the special feature lies particularly in the transmitting system 201, and therefore a description of the receiving system will be omitted. In FIG. 7, in which parts corresponding to those in FIG. 6 are assigned the same codes as in FIG. 6, OFDM-CDMA communication apparatus 200 transmits retransmission signals 1 through m as transmit signals for which the degree of signal multiplexing is set low.

That is to say, number of signals m of retransmission signals 1 through m is selected so that 1<m<k. As a result, code division multiplexed retransmission signals 1 through m are allocated by frequency domain spreading to subcarrier group G1 with a low degree of signal multiplexing shown in FIG. 5, thereby enabling the error rate characteristics of those retransmission signals 1 through m to be improved.

In performing retransmission as referred to here, the propagation path environment between the local station and the far-end station are often poor, and as the number of retransmissions increases the same signal must be transmitted numerous times, resulting in lower transmission efficiency. In this embodiment, the error rate characteristics of retransmission signals 1 through m can be improved, making it possible to reduce the number of retransmissions.

Signals allocated to subcarriers for which the degree of signal multiplexing is set low are not limited to retransmission signals, and control signals may also be effectively allocated to such subcarriers. For example, if the quality of a control signal degrades, it may no longer be possible to establish communication. According to this embodiment, this can be prevented effectively.

According to the above configuration, by allocating data such as retransmission information or control information, for which better channel quality is required than for other data, to subcarriers for which the degree of signal multiplexing is set low, the quality of data for which better channel quality is required than for other data can be improved with almost no lowering of spectral efficiency.

(Embodiment 3)

Figure 8:
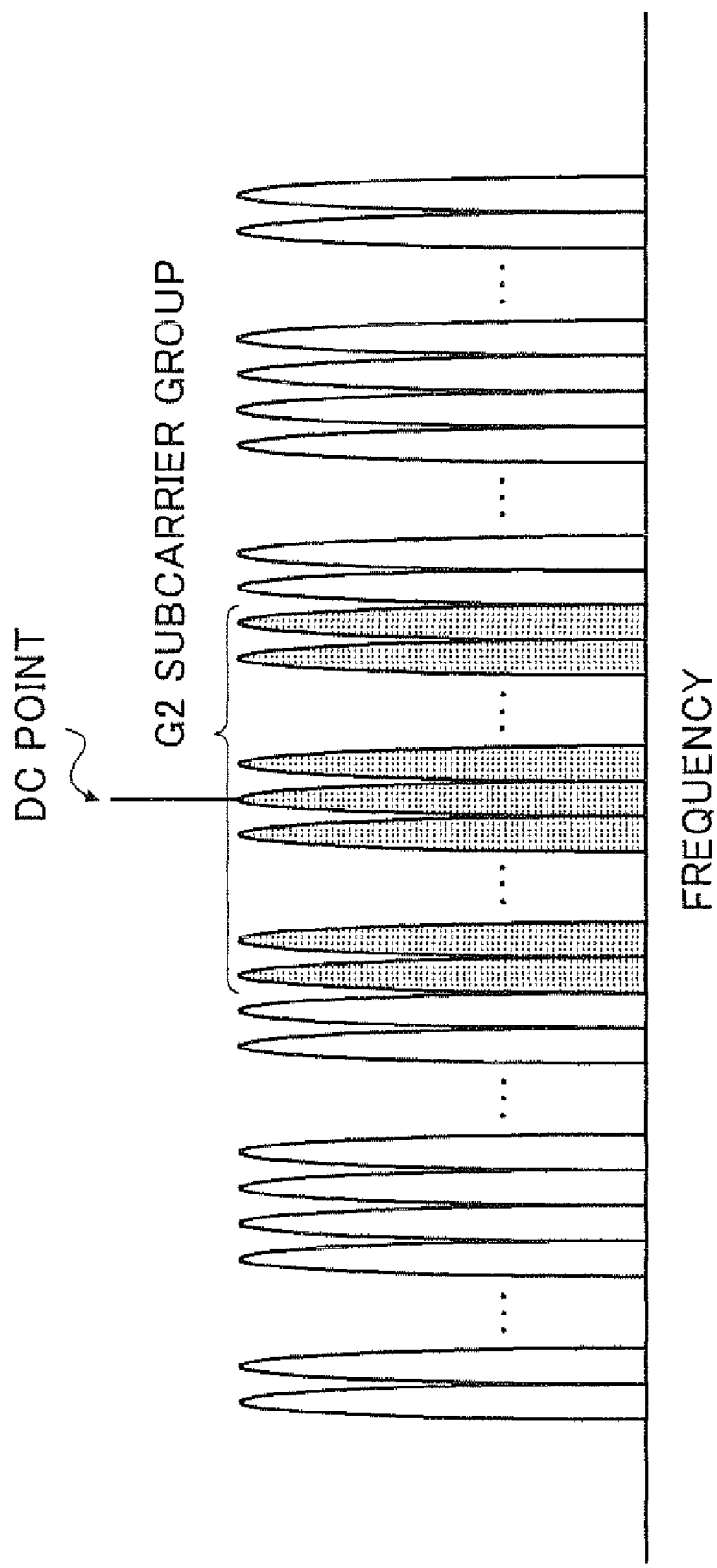
FIG. 8 is a drawing provided in order to explain an OFDM-CDMA signal for which the degree of signal multiplexing of subcarriers that include the DC point has been reduced in Embodiment 3.

A special feature of an OFDM-CDMA communication apparatus according to Embodiment 3 of the present invention is that, in addition to providing the configuration of Embodiment 1, by reducing the degree of signal multiplexing of subcarriers that include the DC (Direct Current) point, as shown in FIG. 8, the error rate characteristics of the subcarrier located at the DC point are improved.

Generally, in an OFDM-CDMA radio transmitting apparatus, DC offset is generated by analog circuitry provided in the amplifier of the radio transmitting section (RF) 104, and therefore the error rate characteristics of a signal transmitted by subcarriers near the DC point are poorer than those of signals transmitted by other subcarriers.

Focusing on this point, this embodiment improves the error rate characteristics of a subcarrier located at the DC point by reducing the degree of signal multiplexing of subcarriers that include the DC point.

Figure 9:
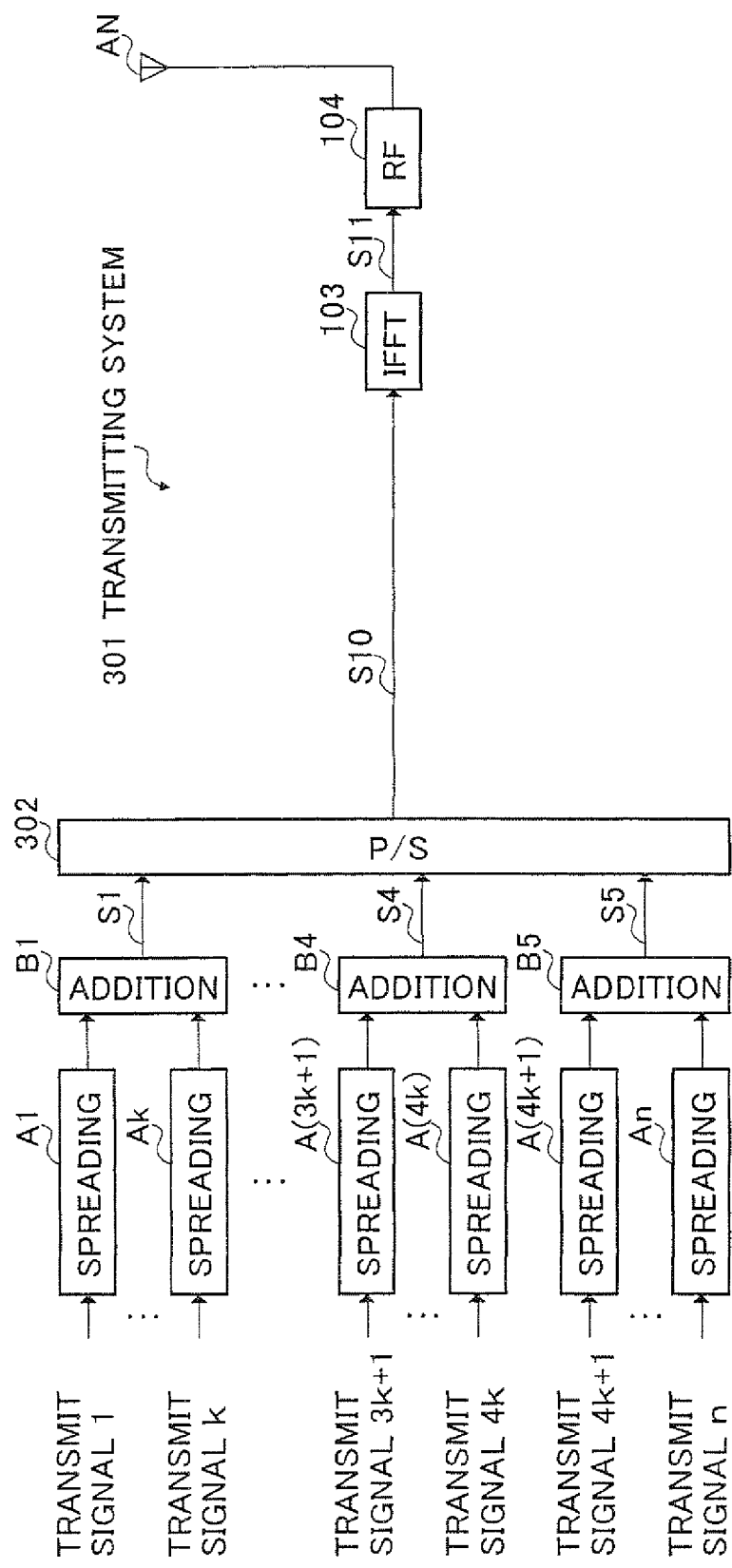
FIG. 9 is a block diagram showing the configuration of the transmitting system of an OFDM-CDMA communication apparatus according to Embodiment 3.

In FIG. 9, in which parts corresponding to those in FIG. 6 are assigned the same codes as in FIG. 6, transmitting system 301 of OFDM-CDMA communication apparatus 300 according to this embodiment has a similar configuration to that of transmitting system 101 in FIG. 6 except for the configuration of parallel/serial converter (P/S) 302 as a multiplex signal allocation selecting section.

That is to say, parallel/serial converter 302 forms a serial signal S10 in which code division multiplexed signals S1 through S5 are rearranged in an order whereby code division multiplexed signal S5 with a low degree of signal multiplexing, output from adder B5, is allocated to subcarrier group G2 that includes the DC point, as shown in FIG. 8, and sends this to next-stage inverse fast Fourier transform circuit 103. By this means, an OFDM-CDMA signal S11 is obtained from inverse fast Fourier transform circuit 103 such that code division multiplexed signal S5 with a low degree of signal multiplexing is allocated to subcarrier group G2 that includes the DC point, as shown in FIG. 5.

According to the above configuration, the error rate characteristics of subcarriers including the DC point can be improved by reducing the degree of signal multiplexing of the subcarrier located at the DC point.

(Embodiment 4)

Figure 10:
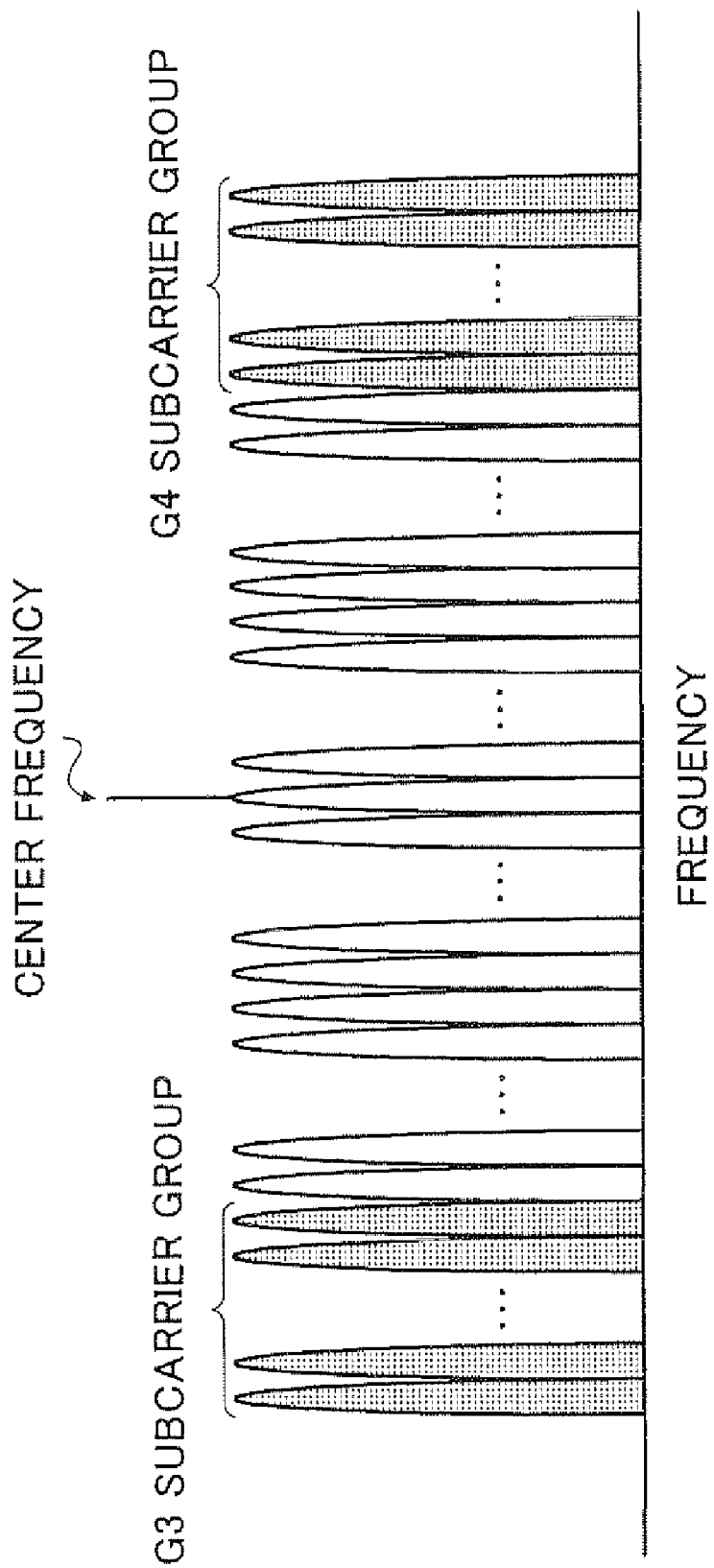
FIG. 10 is a drawing provided in order to explain an OFDM-CDMA signal for which the degree of signal multiplexing of subcarriers at a distance from the center frequency has been reduced in Embodiment 4.

A Special Feature of an OFDM-CDMA communication apparatus according to Embodiment 4 of the present invention is that, in addition to providing the configuration of Embodiment 1, by reducing the degree of signal multiplexing of subcarriers at a distance from the center frequency, as shown in FIG. 10, error rate characteristics in the event of adjacent channel interference signals or analog filter degradation are improved.

When there are adjacent channel interference signals, the further a subcarrier is from the center frequency, the greater is the interference, and therefore the further a subcarrier is from the center frequency, the greater is the degradation of error rate characteristics. In addition, degradation (amplitude deviation or phase deviation) of an analog filter provided in the latter-stage radio transmitting section (RF) 104 is also greater the further a subcarrier is from the center frequency.

Focusing on this point, this embodiment improves error rate characteristics in the event of adjacent channel interference signals or analog filter degradation by reducing the degree of signal multiplexing of subcarriers at a distance from the center frequency.

Figure 11:
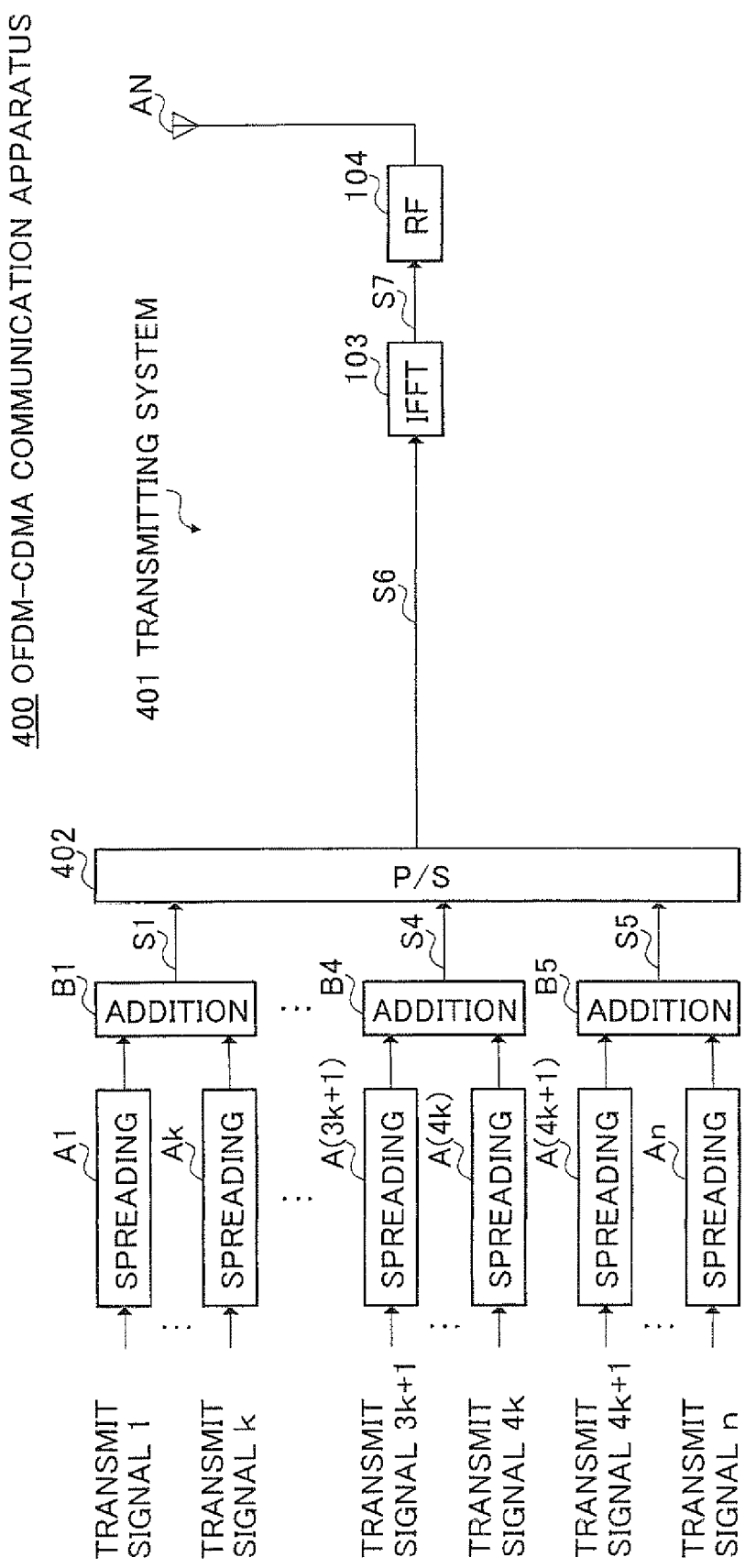
FIG. 11 is a block diagram showing the configuration of the transmitting system of an OFDM-CDMA communication apparatus according to Embodiment 4.

In FIG. 11, in which parts corresponding to those in FIG. 6 are assigned the same codes as in FIG. 6, transmitting system 401 of OFDM-CDMA communication apparatus 400 according to this embodiment has a similar configuration to that of transmitting system 101 in FIG. 6 except for the configuration of parallel/serial converter (P/S) 402 as a multiplex signal allocation selecting section.

That is to say, parallel/serial converter 402 forms a serial signal S6 in which code division multiplexed signals S1 through S5 are rearranged in an order whereby code division multiplexed signal S5 with a low degree of signal multiplexing, output from adder B5, is allocated to subcarrier groups G3 and G4 that are at a distance from the center frequency, as shown in FIG. 10, and sends this to next-stage inverse fast Fourier transform circuit 103. By this means, an OFDM-CDMA signal S7 is obtained from inverse fast Fourier transform circuit 103 such that code division multiplexed signal S5 with a low degree of signal multiplexing is allocated to subcarrier groups G3 and G4 that are at a distance from the center frequency, as shown in FIG. 10.

According to the above configuration, error rate characteristics in the event of adjacent channel interference signals or analog filter degradation can be improved by reducing the degree of signal multiplexing of subcarriers at a distance from the center frequency.

Figure 12:
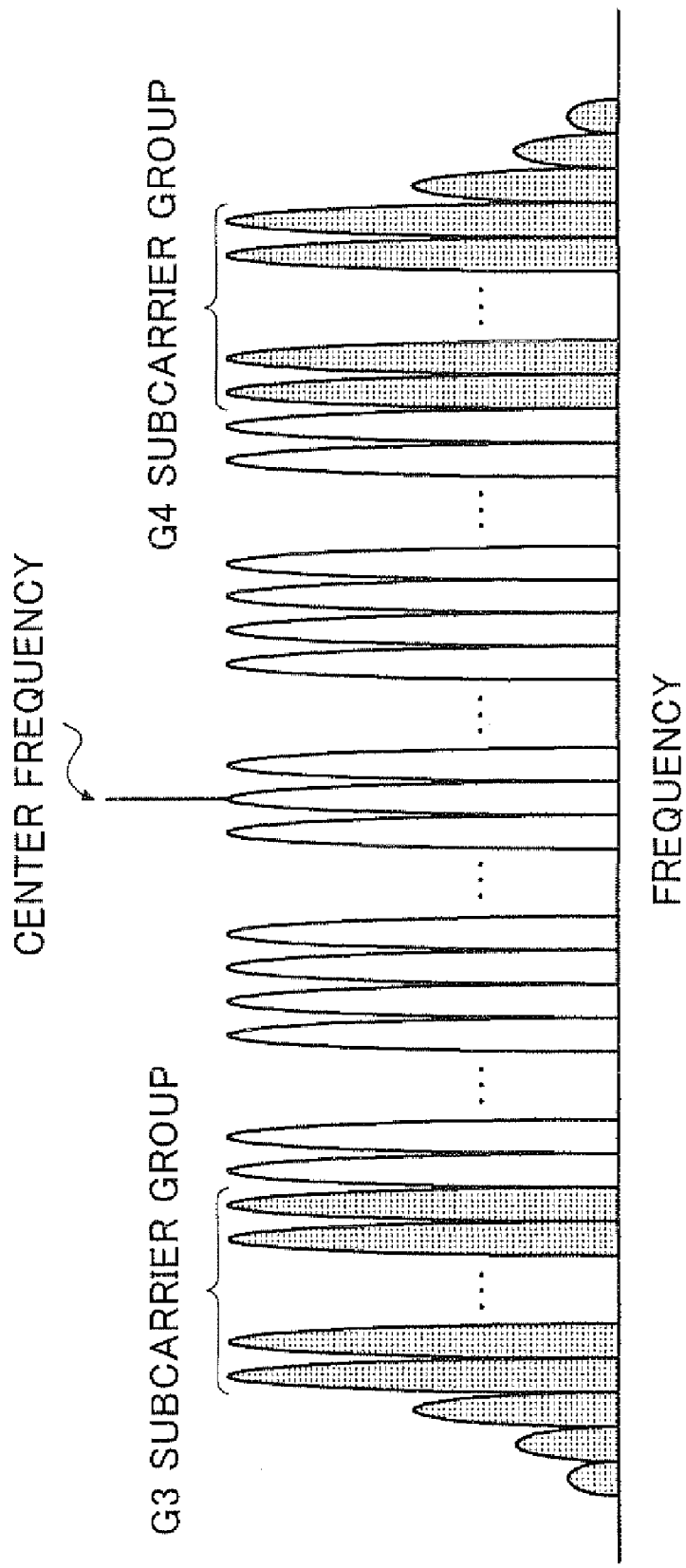
FIG. 12 is a drawing of an OFDM-CDMA signal provided in order to explain the side-lobe reduction effect according to Embodiment 4.

Also, out-of-band side lobes occur in OFDM-CDMA, and as shown in FIG. 12, the side lobe component is large for subcarriers at a distance from the center frequency. By reducing the degree of signal multiplexing of subcarriers at a distance from the center frequency in this case, as in this embodiment, the transmission power of subcarriers at a distance from the center frequency can be decreased, and thus side lobes can also be decreased. As a result, according to the configuration of this embodiment, out-of-band leakage power can also be decreased.

(Embodiment 5)

A special feature of an OFDM-CDMA communication apparatus according to Embodiment 5 of the present invention is that error rate characteristics in the event of adjacent channel interference signals or analog filter degradation are further improved by raising the transmission power of subcarriers for which the degree of signal multiplexing is set low above that of other subcarriers, in addition to reducing the degree of signal multiplexing of subcarriers at a distance from the center frequency in the same way as in Embodiment 4.

Subcarriers for which the degree of signal multiplexing is set low have lower transmission power than other subcarriers. Therefore, transmission power is further raised, enabling error rate characteristics in the event of adjacent channel interference signals or analog filter degradation to be further improved.

Also, even if transmit signal power is increased to a certain extent for subcarriers for which the degree of signal multiplexing is set low, compared with other subcarriers, there is little likelihood of the occurrence of a peak voltage greater than or equal to a predetermined value—which is a problem with the OFDM-CDMA method—and therefore error rate characteristics in the event of adjacent channel interference signals or analog filter degradation can be effectively improved.

Figure 1:
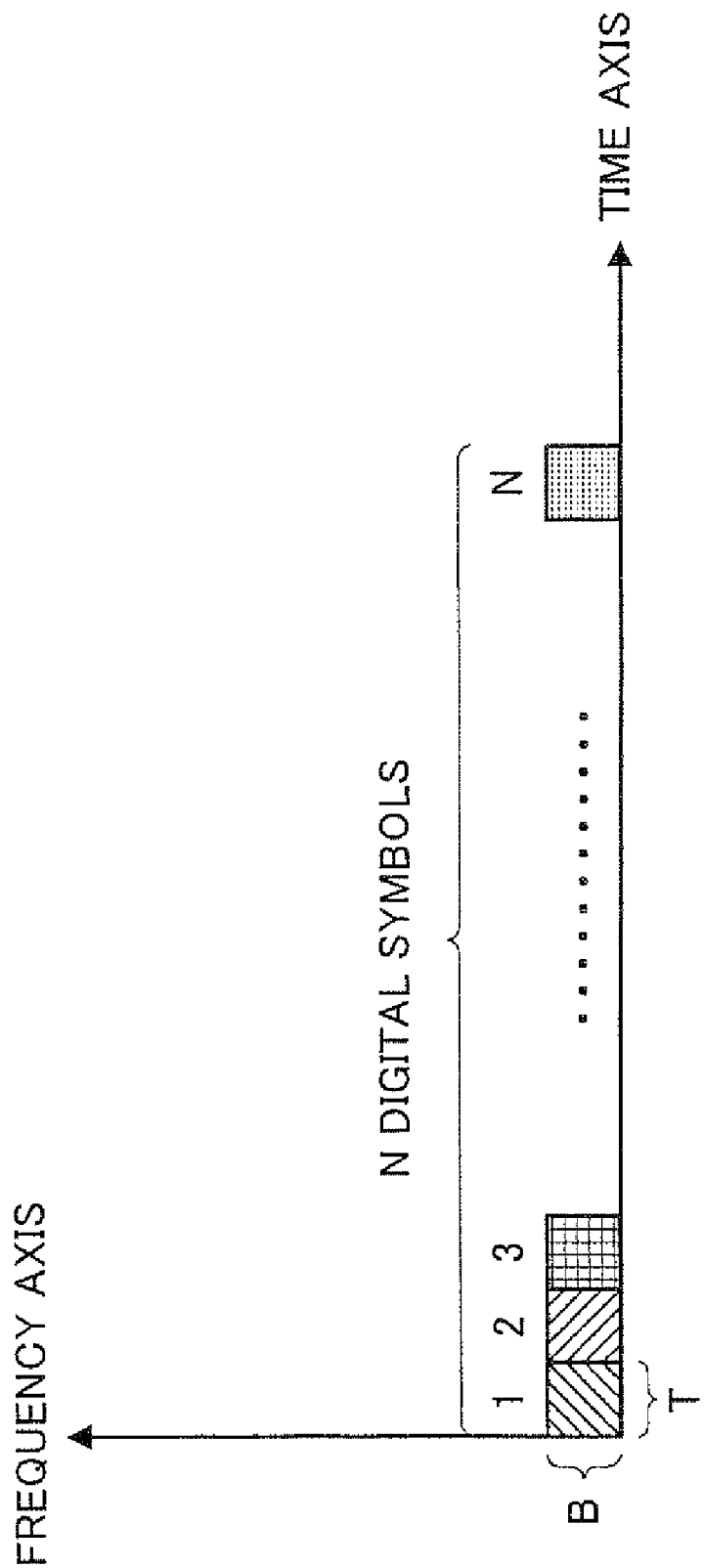
FIG. 1 is a drawing showing the state of digital symbols before OFDM-CDMA processing.
Figure 2:
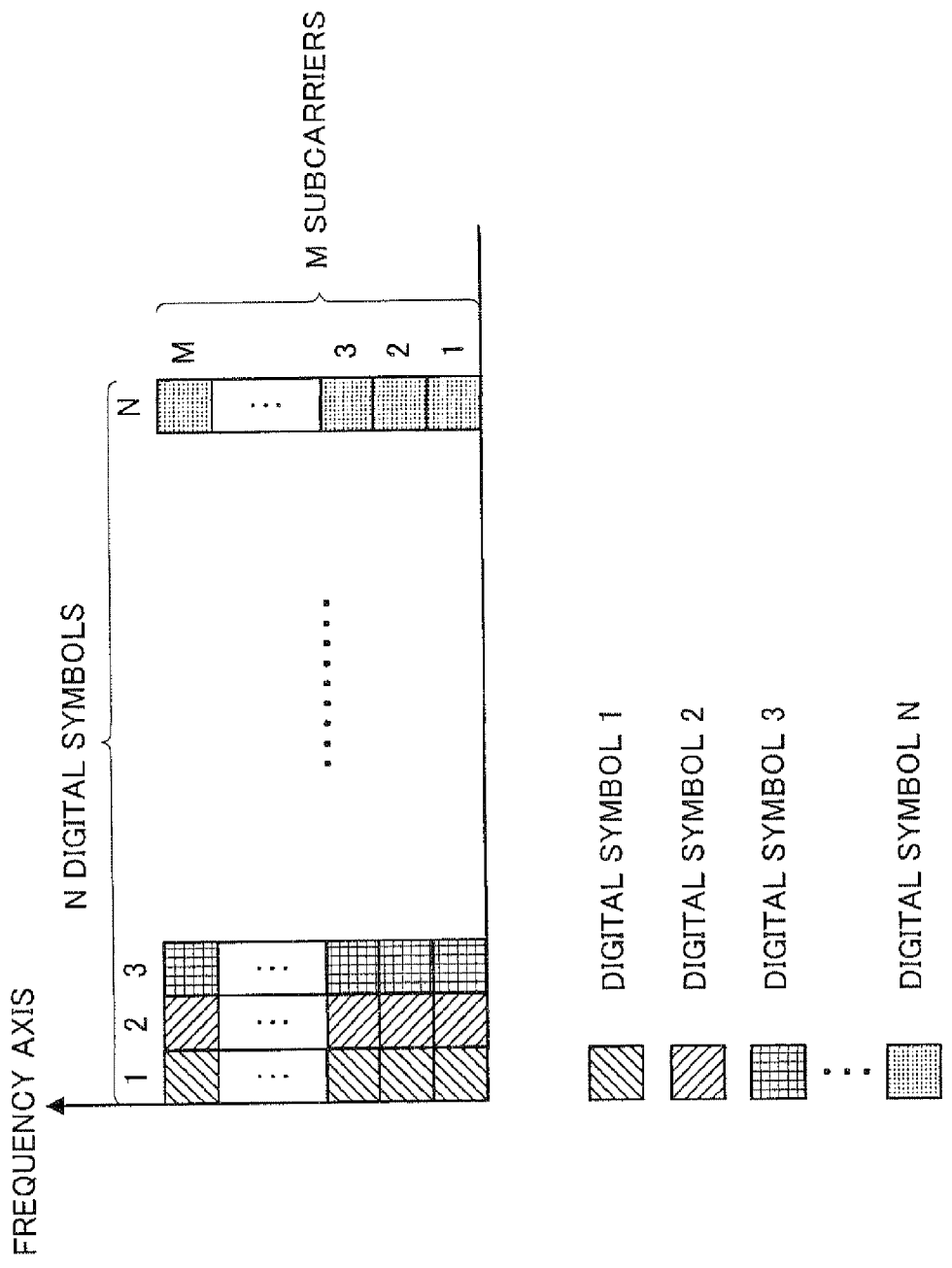
FIG. 2 is a drawing showing the arrangement of chips after OFDM-CDMA processing using frequency domain spreading.
Figure 3:
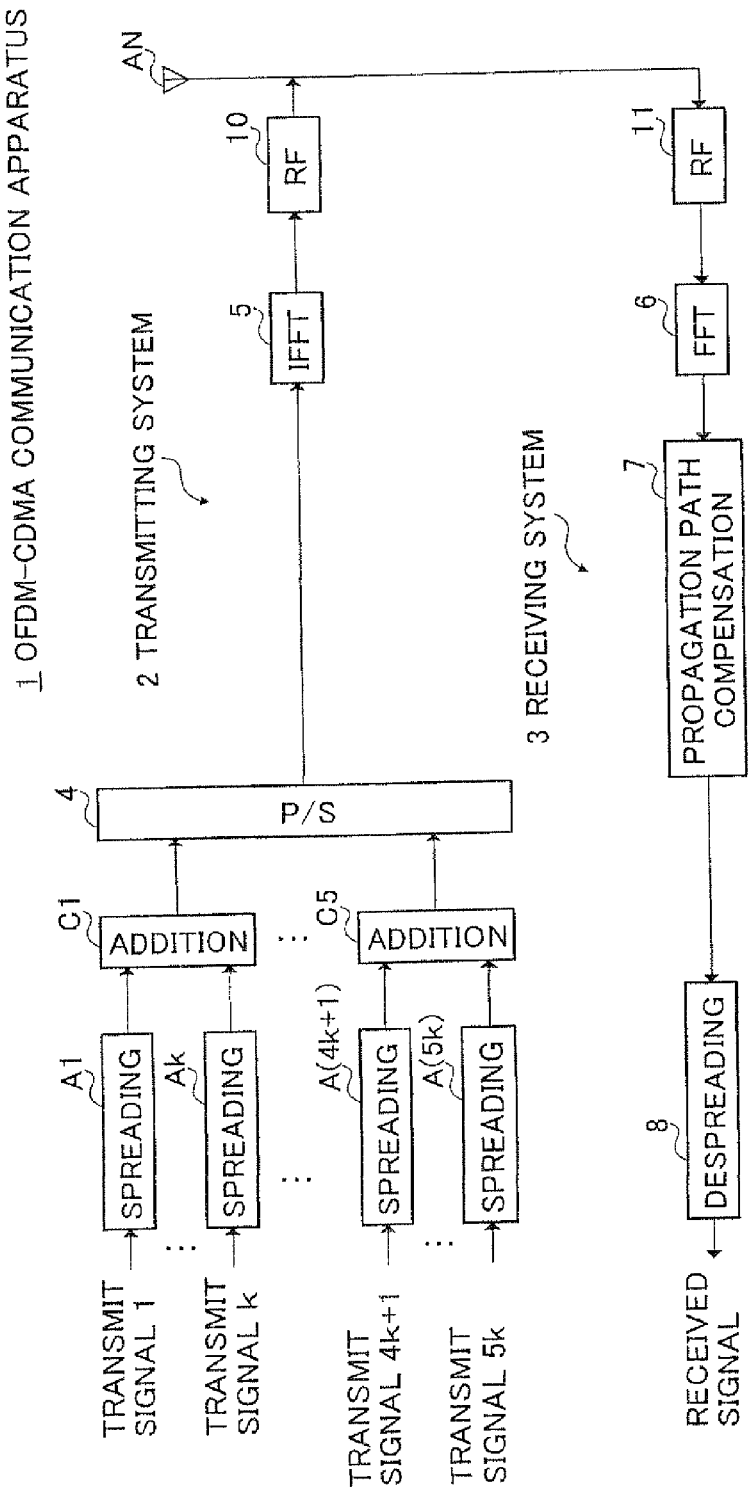
FIG. 3 is a block diagram showing a sample configuration of a conventional OFDM-CDMA communication apparatus.
Figure 4:
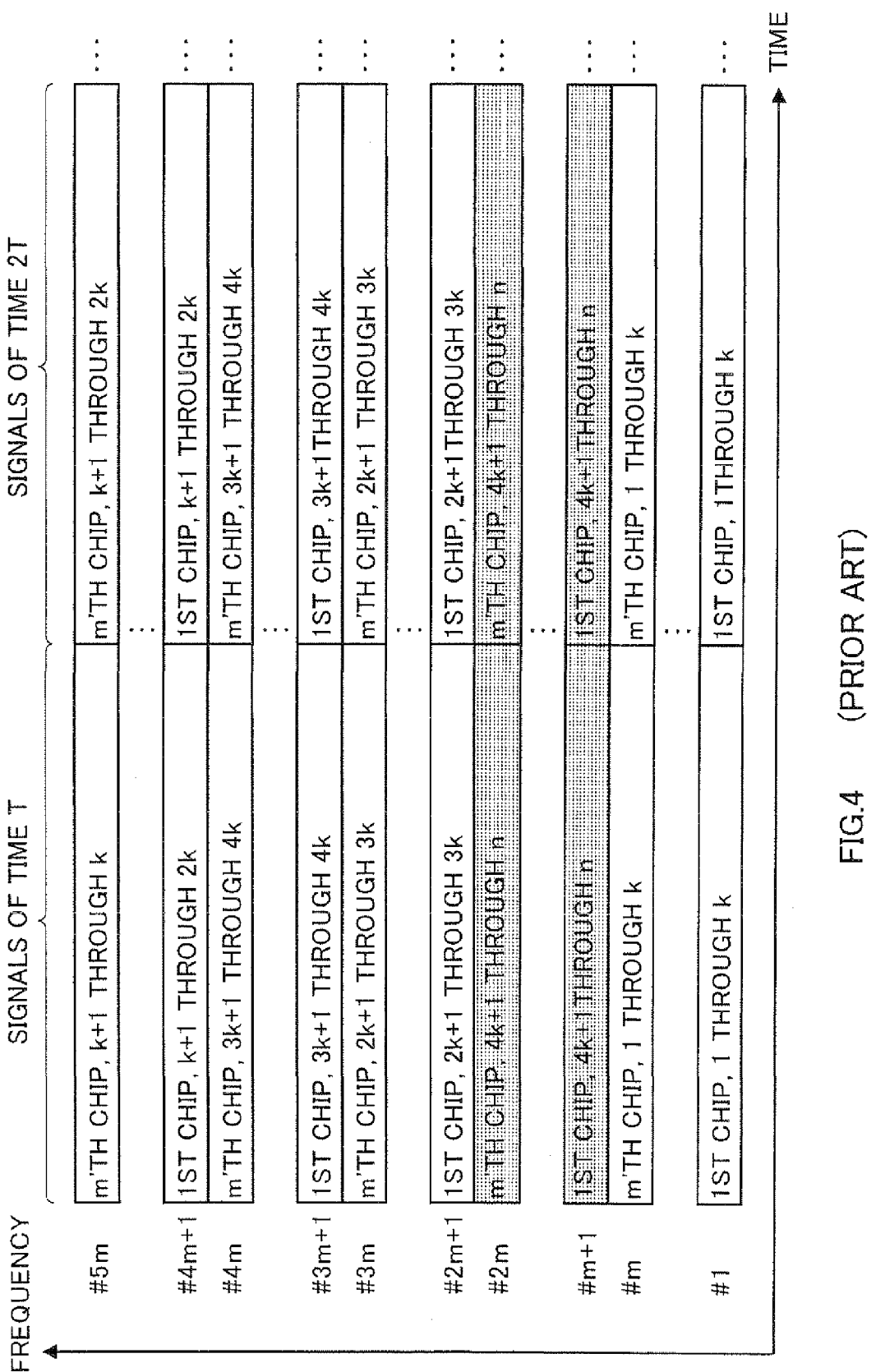
FIG. 4 is a drawing showing the arrangement of OFDM-CDMA signals formed by a conventional OFDM-CDMA communication apparatus.
Figure 13:
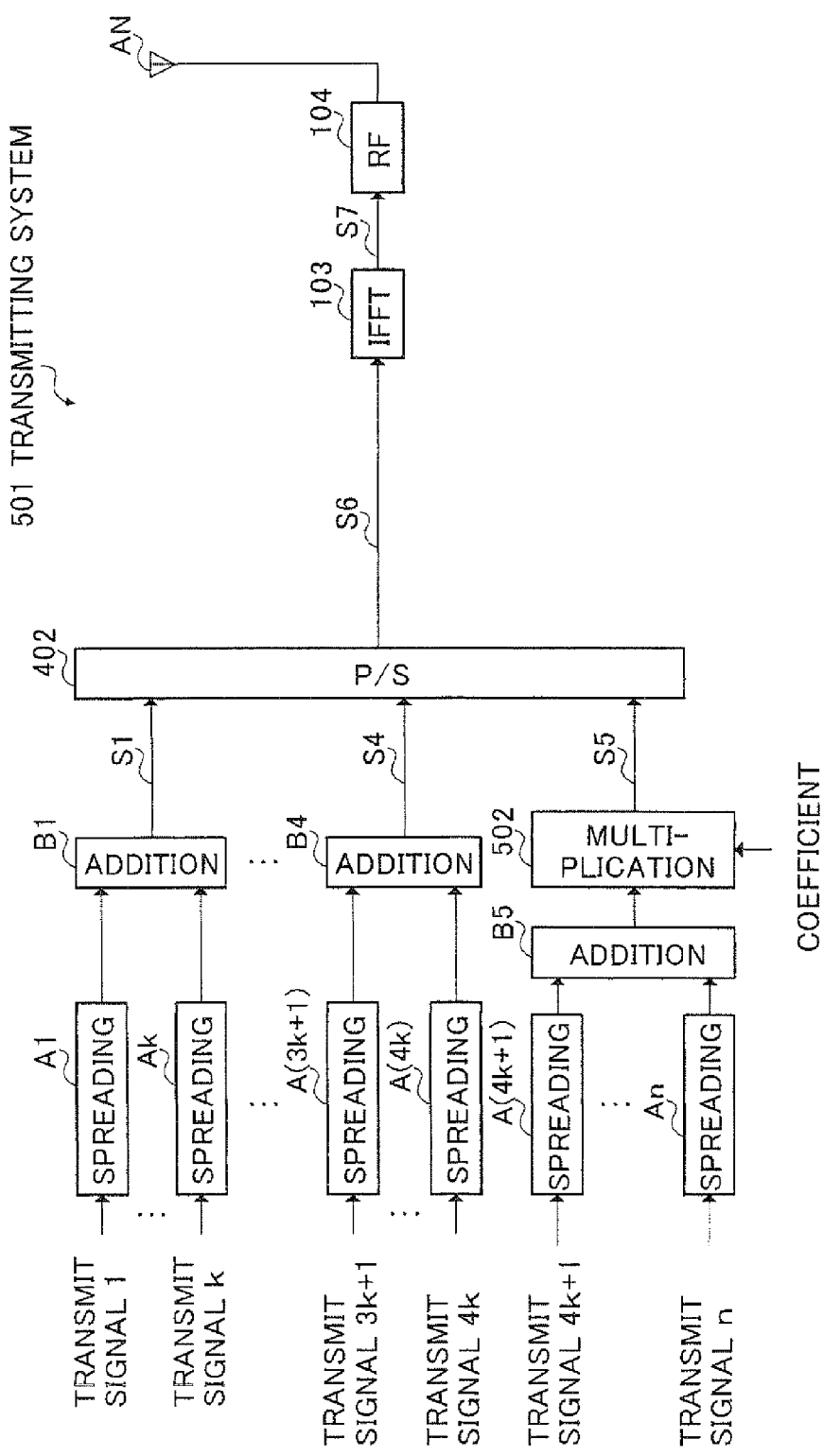
FIG. 13 is a block diagram showing the configuration of the transmitting system of an OFDM-CDMA communication apparatus according to Embodiment 5.

In FIG. 13, in which parts corresponding to those in FIG. 11 are assigned the same codes as in FIG. 11, transmitting system 501 of OFDM-CDMA communication apparatus 500 according to this embodiment has a similar configuration to that of transmitting system 401 in FIG. 1, but differs in having a multiplier 502 that increases the signal value of a code division multiplexed signal with a low degree of signal multiplexing. If a value greater than 1 is selected as the multiplication coefficient of multiplier 502, the signal power of a transmit signal allocated to subcarriers with a low degree of signal multiplexing can be increased.

According to the above configuration, by reducing the degree of signal multiplexing of subcarriers at a distance from the center frequency, and also raising the signal power of a signal for which the degree of signal multiplexing is set low above the signal power of transmit signals allocated to other subcarriers, in addition to achieving the effect of Embodiment 4 it is possible to significantly improve error rate characteristics in the event of adjacent channel interference signals or analog filter degradation.

(Embodiment 6)

A special feature of an OFDM-CDMA communication apparatus according to Embodiment 6 of the present invention is that error rate characteristics of a signal for which the degree of signal multiplexing is set low are further improved by making the spreading ratio of subcarriers for which the degree of signal multiplexing is set low larger than the spreading ratio of other subcarriers.

That is to say, the larger the spreading ratio, the longer is the tap length of spread chips for one symbol, enabling despreading accuracy to be increased accordingly, and transmit symbols to be accurately recovered on the receiving side.

Figure 14:
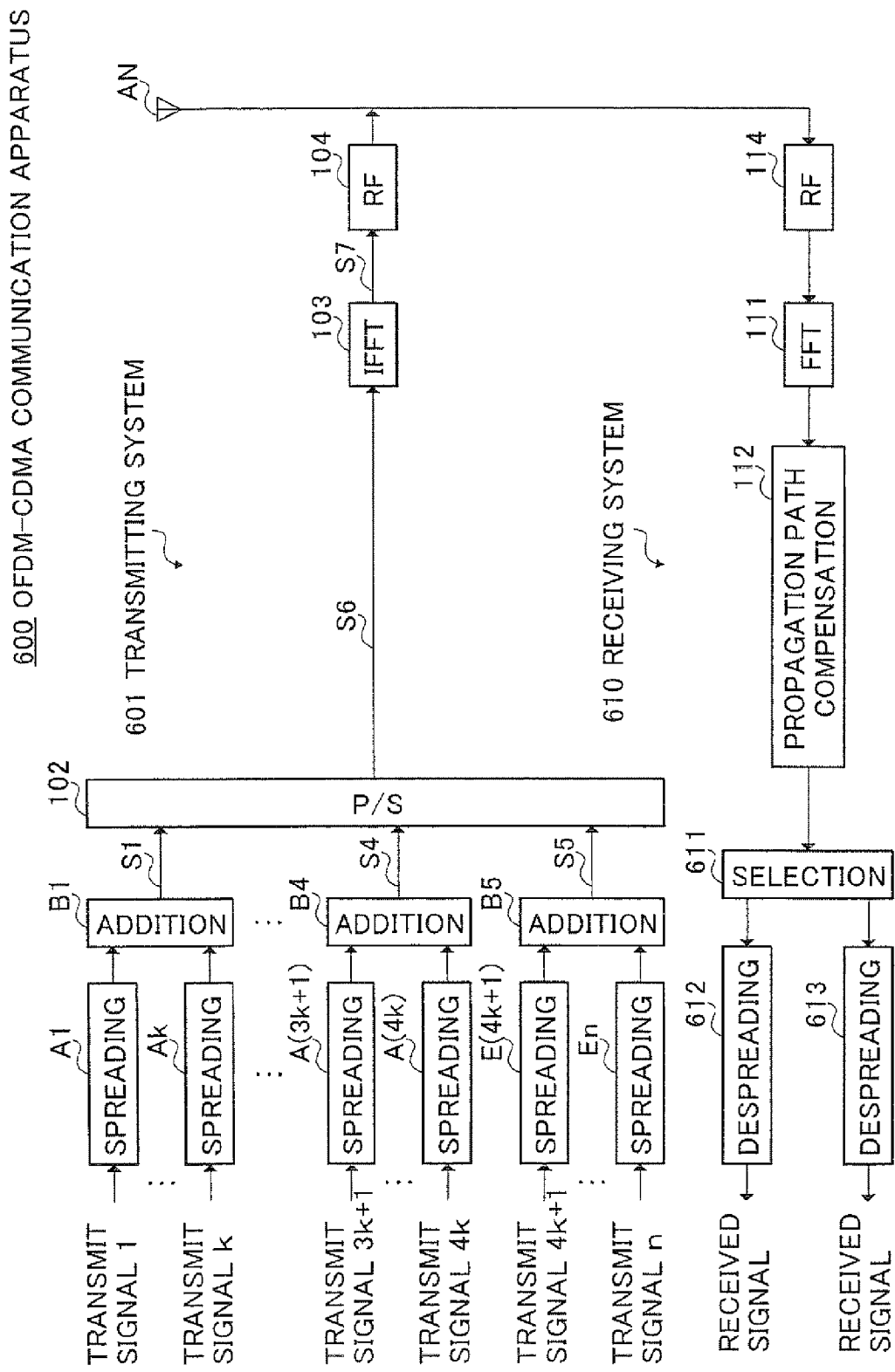
FIG. 14 is a block diagram showing the configuration of an OFDM-CDMA communication apparatus according to Embodiment 6.

In FIG. 14, in which parts corresponding to those in FIG. 6 are assigned the same codes as in FIG. 6, transmitting system 601 of OFDM-CDMA communication apparatus 600 has a similar configuration to that of transmitting system 101 described in Embodiment 1, but differs in that the spreading ratio of spreaders $E(4k+1)$ through En, which despread transmit signals $(4k+1)$ through n for which the degree of signal multiplexing is set low, is made larger than the spreading ratio of spreaders A1 through $A(4k)$, which despread the other transmit signals 1 through $4k$.

In receiving system 610 of OFDM-CDMA communication apparatus 600, a signal that has undergone propagation path compensation is input to a selecting section 611 as a multiplex signal discrimination section. Selecting section 611 divides the sequentially input signal into a code division multiplexed signal with a high degree of signal multiplexing and a code division multiplexed signal with a low degree of signal multiplexing, and outputs these signals. This discrimination processing can be performed easily if, for example, the input signal is split in the same order as in the code division multiplexed signal rearrangement processing by parallel/serial converter 102 of transmitting system 601. This rearrangement order is assumed to have been determined beforehand between the respective radio stations. Discrimination can also be carried out based on the chip rate, etc., of the input code division multiplexed signal.

By this means, a code division multiplexed signal with a low degree of signal multiplexing is input to a despreader 613 for which the spreading ratio is set to a large value in the same way as in transmitting system 601, and the received signal for this station is extracted from the code division multiplexed signal by despreading processing. Also, a code division multiplexed signal with a high degree of signal multiplexing is input to a despreader 612, and the received signal for this station is extracted from the code division multiplexed signal by despreading processing.

In the above configuration, the spreading ratio for a signal allocated to subcarriers for which the degree of signal multiplexing is set low may, for example, be made twice the spreading ratio of signals allocated to other subcarriers. By doubling the spreading ratio, the signal-to-noise ratio can also be doubled, and it is therefore possible to significantly improve the quality of data such as control information or retransmission information for which better quality is required than for other data, or the quality of a user with poor quality. The spreading ratio here is not limited to twice the spreading ratio of other subcarriers, but can be set arbitrarily.

According to the above configuration, by making the spreading ratio of a signal allocated to subcarriers for which the degree of signal multiplexing is set low larger than the spreading ratio of signals allocated to other subcarriers, in addition to achieving the effect of Embodiment 1 it is possible to significantly improve the quality of data such as control information or retransmission information for which better quality is required than for other data, or the quality of data for a user with poor quality.

(Embodiment 7)

A special feature of an OFDM-CDMA communication apparatus according to Embodiment 7 of the present invention is that signals in which a known signal is spread are multiplexed in subcarriers for which the degree of signal multiplexing is set low.

By multiplexing signals in which a known signal (generally called a pilot signal) is spread, it is possible for the receiving side to perform residual phase error detection, cell identification in a multi-cell system, and so forth, based on this known signal. According to this embodiment, the accuracy of such processing can be improved.

While a pilot signal is also used in DS-CDMA, when used in OFDM-CDMA a frequency diversity effect is obtained, enabling the accuracy of the above-mentioned processing to be significantly improved compared with DS-CDMA.

Figure 15:
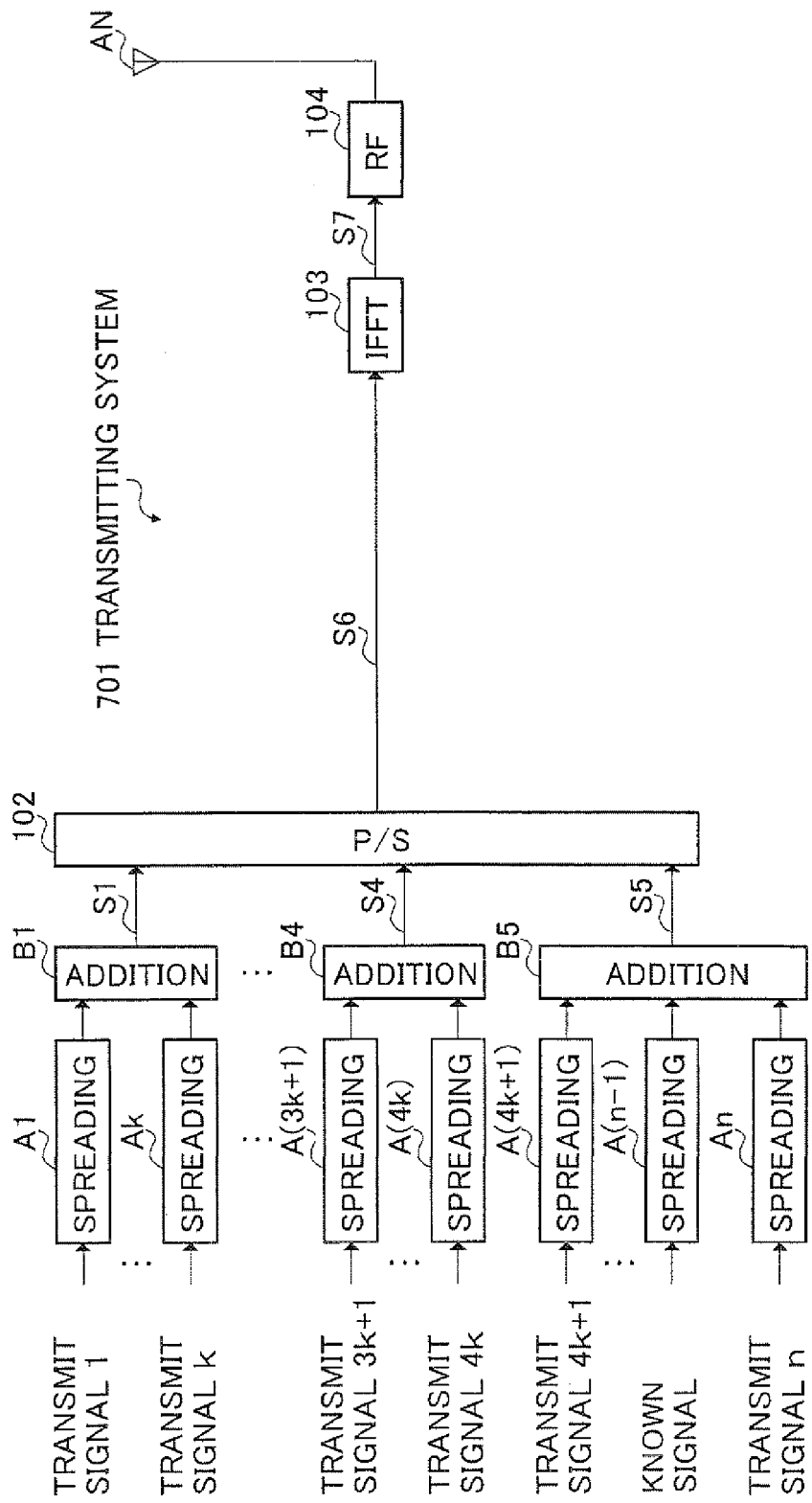
FIG. 15 is a block diagram showing the configuration of the transmitting system of an OFDM-CDMA communication apparatus according to Embodiment 7.

FIG. 15 shows the actual configuration of transmitting system 701 of an OFDM-CDMA communication apparatus 700 according to this embodiment. In FIG. 15, in which parts corresponding to those in FIG. 6 are assigned the same codes as in FIG. 6, transmitting system 701 of OFDM-CDMA communication apparatus 700 has a similar configuration to that of transmitting system 101 described in Embodiment 1, but differs in that a known signal is included in transmit signals $(4k+1)$ through n with a low degree of multiplexing.

According to the above configuration, a known signal used for propagation path compensation, synchronization processing, or the like, on the receiving side is allocated to subcarriers for which the degree of signal multiplexing is set low, enabling known signal error rate characteristics to be improved, and making it possible to perform received signal propagation path compensation and synchronization processing with a high degree of accuracy, and to obtain a high-quality received signal.

(Embodiment 8)

A special feature of an OFDM-CDMA communication apparatus according to Embodiment 8 of the present invention is that, by steering subcarriers for which the degree of signal multiplexing is set low, the occurrence of burst errors is prevented in a signal with a low degree of signal multiplexing when channel fluctuations are slow.

Even when the degree of signal multiplexing of particular subcarriers has been reduced in order to improve the error rate characteristics of those signals, if channel fluctuations are slow, there is a risk of burst errors occurring in signals allocated to those subcarriers due to frequency selective fading.

Focusing on this point, this embodiment steers subcarriers for which the degree of signal multiplexing is set low. By this means, it is possible to prevent a poor state from continuing for a long period for subcarriers with a low degree of signal multiplexing, and to prevent the occurrence of burst errors in data for which good quality is required. To explain this using FIG. 5, the subcarriers with a low degree of signal multiplexing indicated by shading in FIG. 5 are taken to be subcarriers of a frequency Tower than the center frequency, but it is also possible for subcarriers with a low degree of signal multiplexing to be, for example, sequentially close to the center frequency and to have a frequency higher than the center frequency.

Figure 16:
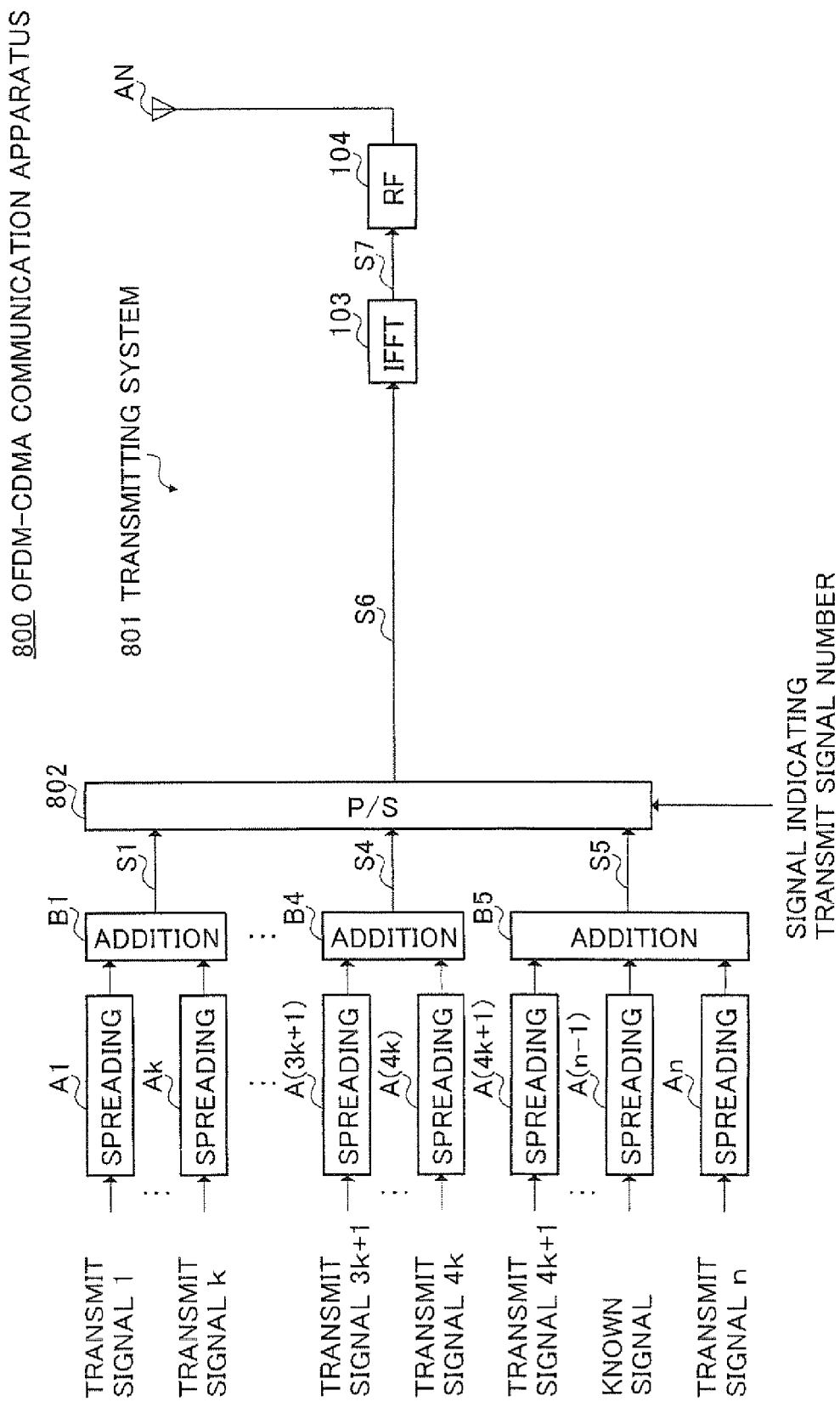
FIG. 16 is a block diagram showing the configuration of the transmitting system of an OFDM-CDMA communication apparatus according to Embodiment 8.
Figure 17:
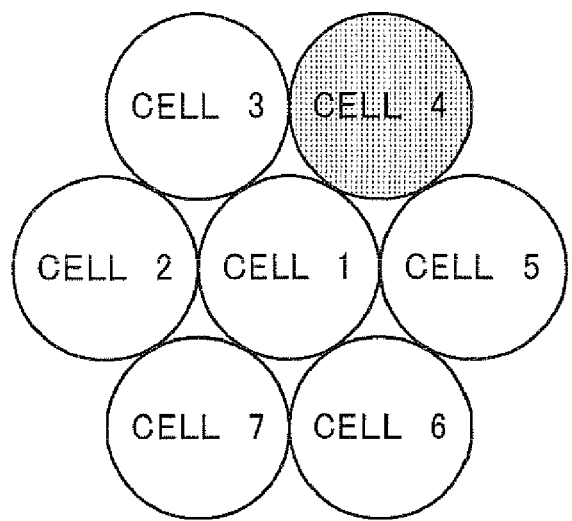
FIG. 17 is a drawing provided in order to explain cells.

In FIG. 16, in which parts corresponding to those in FIG. 15 are assigned the same codes as in FIG. 15, transmitting system 801 of OFDM-CDMA communication apparatus 800 according to this embodiment has a similar configuration to that of transmitting system 701 in FIG. 15 except for the configuration of parallel/serial converter (P/S) 802 as a multiplex signal allocation selecting section.

That is to say, parallel/serial converter 802 steers subcarriers with a low degree of signal multiplexing in OFDM-CDMA signal S7 formed by next-stage inverse fast Fourier transform circuit 103, by switching the output order of code division multiplexed signal S5 with a low degree of signal multiplexing, input from adder B5, with the order of the other code division multiplexed signals S1 through S4.

At this time, each time a signal indicating a transmit symbol number is input, parallel/serial converter 802 switches the output order of code division multiplexed signals S1 through S5, and by this means the receiving side can recover received symbols satisfactorily.

According to the above configuration, by steering subcarriers with a low degree of signal multiplexing, the occurrence of burst errors when channel fluctuations are slow can be prevented.

(Embodiment 9)

A special feature of an OFDM-CDMA communication apparatus according to Embodiment 9 of the present invention is that, by changing subcarriers with a low degree of signal multiplexing according to the cell, it is possible for cell identification to be performed by a communicating-party communication terminal apparatus without increasing the number of spreading codes assigned to a known signal.

Figure 18:
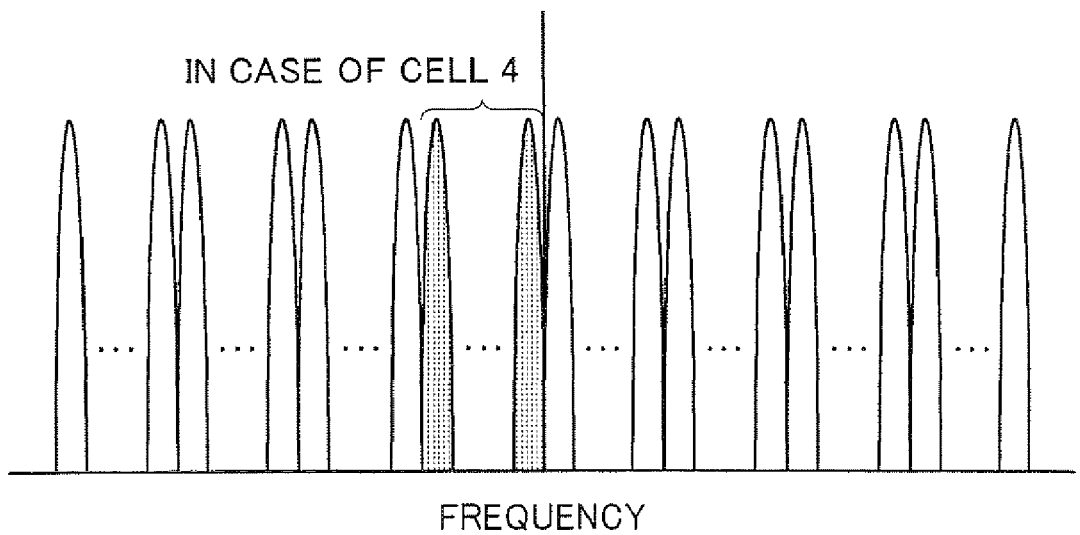
FIG. 18 is a drawing showing a sample arrangement of an OFDM-CDMA signal when the cell to which the communicating-party communication terminal apparatus belongs is reported based on a subcarrier group for which the degree of signal multiplexing has been reduced.

A case will be considered in which, for example, the number of cells is 7, as shown in FIG. 7. All subcarriers are divided into 7 groups, and subcarriers with a low degree of signal multiplexing are assigned on a cell-by-cell basis. For example, in order to notify a communication terminal apparatus that that communication terminal apparatus belongs to cell 4, a signal with a low degree of signal multiplexing can be allocated to the subcarrier group corresponding to cell 4, as shown in FIG. 18.

As a result, the receiving side can easily identify the cell to which the station itself belongs by detecting to which subcarrier group a signal with a low degree of signal multiplexing is allocated.

FIG. 19 shows the configuration of an OFDM-CDMA communication apparatus 900 according to this embodiment. In FIG. 19, in which parts corresponding to those in FIG. 14 or FIG. 16 are assigned the same codes as in FIG. 14 or FIG. 16, transmitting system 901 of OFDM-CDMA communication apparatus 900 has a similar configuration to that of transmitting system 801 in FIG. 16 except for the configuration of parallel/serial converter 902 as a multiplex signal allocation selecting section.

Parallel/serial converter 902 sends code division multiplexed signal S5 with a low degree of signal multiplexing in an order such that code division multiplexed signal S5 with a low degree of signal multiplexing is allocated to the subcarrier group at the location corresponding to the cell to which the communicating-party communication terminal apparatus belongs, based on a signal indicating the group in which a known signal is inserted (that is, a signal indicating a group with a low degree of signal multiplexing).

In receiving system 910, a signal that has undergone propagation path compensation is divided into a code division multiplexed signal with a low degree of signal multiplexing and a code division multiplexed signal with a high degree of signal multiplexing by a selecting section 611 as a multiplex signal selecting section. The code division multiplexed signal with a low degree of signal multiplexing is then subjected to despreading processing by a despreader 613.

In addition, the code division multiplexed signal with a low degree of signal multiplexing is subjected to despreading processing by a despreader 911 that has the spreading code of the known signal as a coefficient. The timing at which the maximum value of the despread signal is obtained is detected by a maximum value detection circuit 912. Based on this maximum value detection timing, the subcarrier group to which the known signal (that is, the signal with a low degree of signal multiplexing) is allocated is ascertained, and therefore OFDM-CDMA communication apparatus 900 can identify the cell to which this station belongs.

According to the above configuration, by changing subcarriers with a low degree of signal multiplexing according to the cell, it is possible for the receiving side to identify easily the cell to which it belongs, even if a signal for cell identification is not transmitted. As a result, an OFDM-CDMA communication apparatus 900 can be implemented that, in addition to achieving the effect obtained in above-described Embodiment 1, improves transmission efficiency inasmuch as a signal for cell identification need not be transmitted.

(Embodiment 10)

A special feature of an OFDM-CDMA communication apparatus according to Embodiment 10 of the present invention is that the quality of important information can be further improved by making the modulation M-ary value of subcarriers with a low degree of signal multiplexing smaller than for other subcarriers. Incidentally the modulation method can be set arbitrarily.

Figure 20:
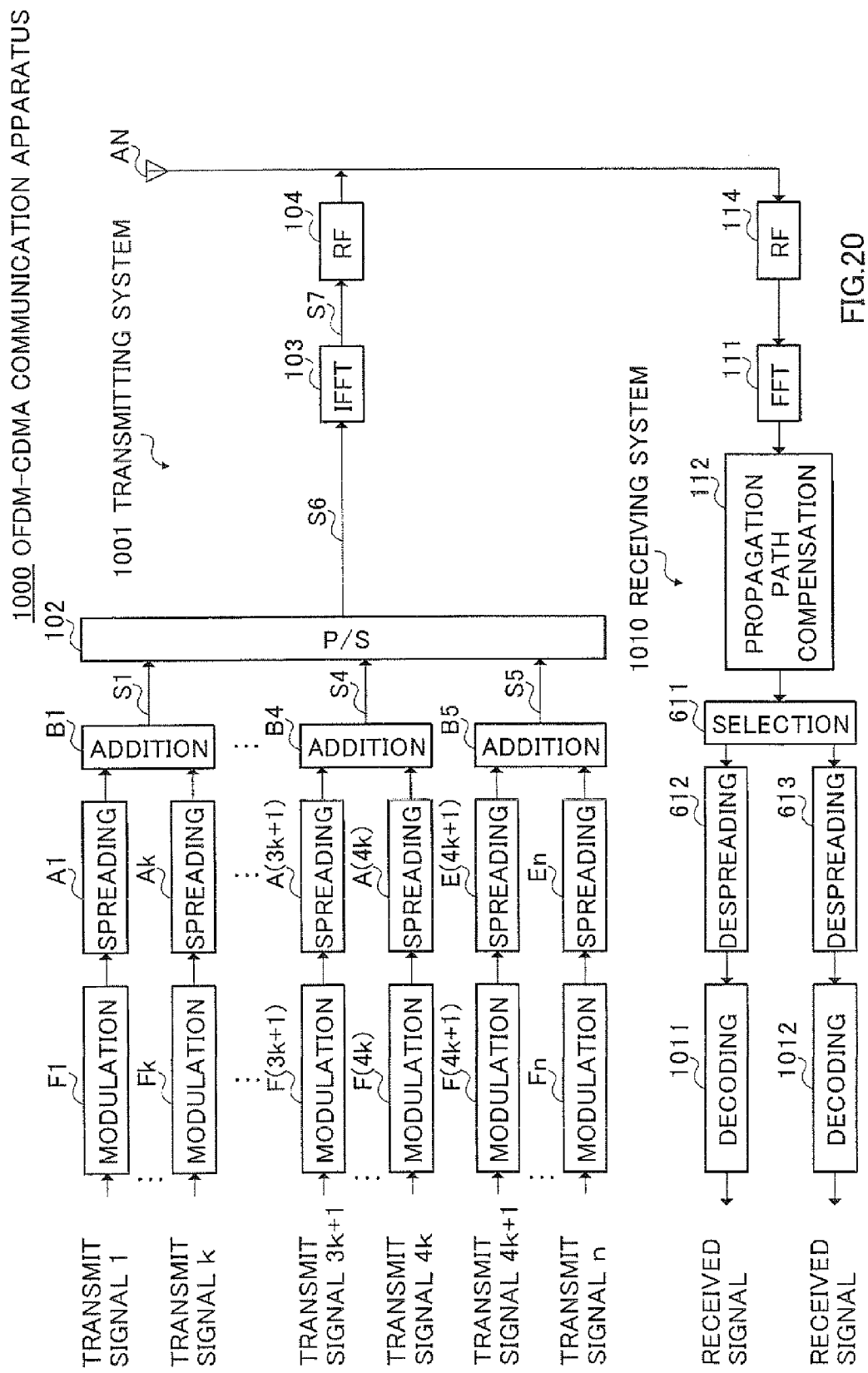
FIG. 20 is a block diagram showing the configuration of an OFDM-CDMA communication apparatus according to Embodiment 10.

In FIG. 20, in which parts corresponding to those in FIG. 6 are assigned the same codes as in FIG. 6, in OFDM-CDMA communication apparatus 1000, of modulation circuits F1 through Fn provided in correspondence to transmit signals 1 through n in transmitting system 1001, modulation circuits F($4k$+1) through Fn provided in correspondence to transmit signals ($4k$+1) through n, for which the degree of signal multiplexing is low, modulate transmit signals ($4k$+1) through n by means of a modulation method with a smaller modulation M-ary value than that of modulation circuits F1 through F($4k$) provided in correspondence to transmit signals 1 through $4k$, for which the degree of signal multiplexing is high. For example, modulation circuits F1 through F($4k$) may execute 16QAM (Quadrature Amplitude Modulation) modulation processing, while modulation circuits F($4k$+1) through Fn execute QPSK (Quadrature Phase Shift Keying) modulation processing.

In receiving system 1010, a signal that has undergone propagation path compensation is divided into a code division multiplexed signal with a high degree of signal multiplexing and a code division multiplexed signal with a low degree of signal multiplexing by a selecting section 611. The code division multiplexed signal with a low degree of signal multiplexing is sent to despreader 613, by which the signal for this station is extracted.

Decoding circuit 1012 performs the reverse of the processing by modulation circuits F($4k$+1) through Fn, thereby demodulating the modulated signal for which the modulation M ary value is small, and obtaining a received signal. In the case of the code division multiplexed signal with a high degree of signal multiplexing, on the other hand, the signal for this station is extracted by despreader 612, and decoding circuit 1011 performs the reverse of the processing by modulation circuits F1 through F(4k), thereby demodulating the modulated signal for which the modulation M-ary value is large, and obtaining a received signal.

According to the above configuration, in addition to provision of the configuration in Embodiment 1, by making the modulation M-ary value of a transmit signal correspondingly smaller for a multiplex signal with a low degree of multiplexing, it is possible, in addition to achieving the effect obtained in Embodiment 1, to significantly improve the error rate characteristics of a multiplex signal with a low degree of multiplexing.

This principle is not limited to OFDM-CDMA, but is also effective when applied to OFDM. That is to say, in OFDM, the modulation M-ary value of specific subcarriers is made smaller than the modulation M-ary value of the other subcarriers. For example, by making the modulation M-ary value of signals allocated to subcarriers for which degradation is greater than for other subcarriers, such as a subcarrier at the DC point and subcarriers on either side thereof, it is possible to improve error rate characteristics without greatly lowering transmission efficiency. Specifically, this can be implemented with a configuration virtually the same as the configuration of transmitting system 1001 in FIG. 20 with the exception of the spreaders and adders. By this means, it is possible to greatly reduce the circuit scale compared with an OFDM-CDMA system, and to improve the error rate characteristics of specific subcarriers.

Also, with OFDM, a one-times spreading, one-code multiplexing CDMA-OFDM method, as it is called, is possible. That is to say, OFDM is a CDMA-OFDM method whereby one-times spreading is performed by a spreading section, and the degree of signal multiplexing for transmission by each subcarrier is made 1 by a signal multiplexing degree selecting section.

(Embodiment 11)

A special feature of an OFDM-CDMA communication apparatus according to Embodiment 11 of the present invention is that, by changing the spreading code of a known signal only at the start of a frame, frame synchronization can easily be achieved using the result of despreading the known signal.

Generally, achieving frame synchronization requires processing such as the insertion of a special preamble at the start of a frame, but in this embodiment, frame synchronization can easily be achieved without the need for such processing.

Figure 21:
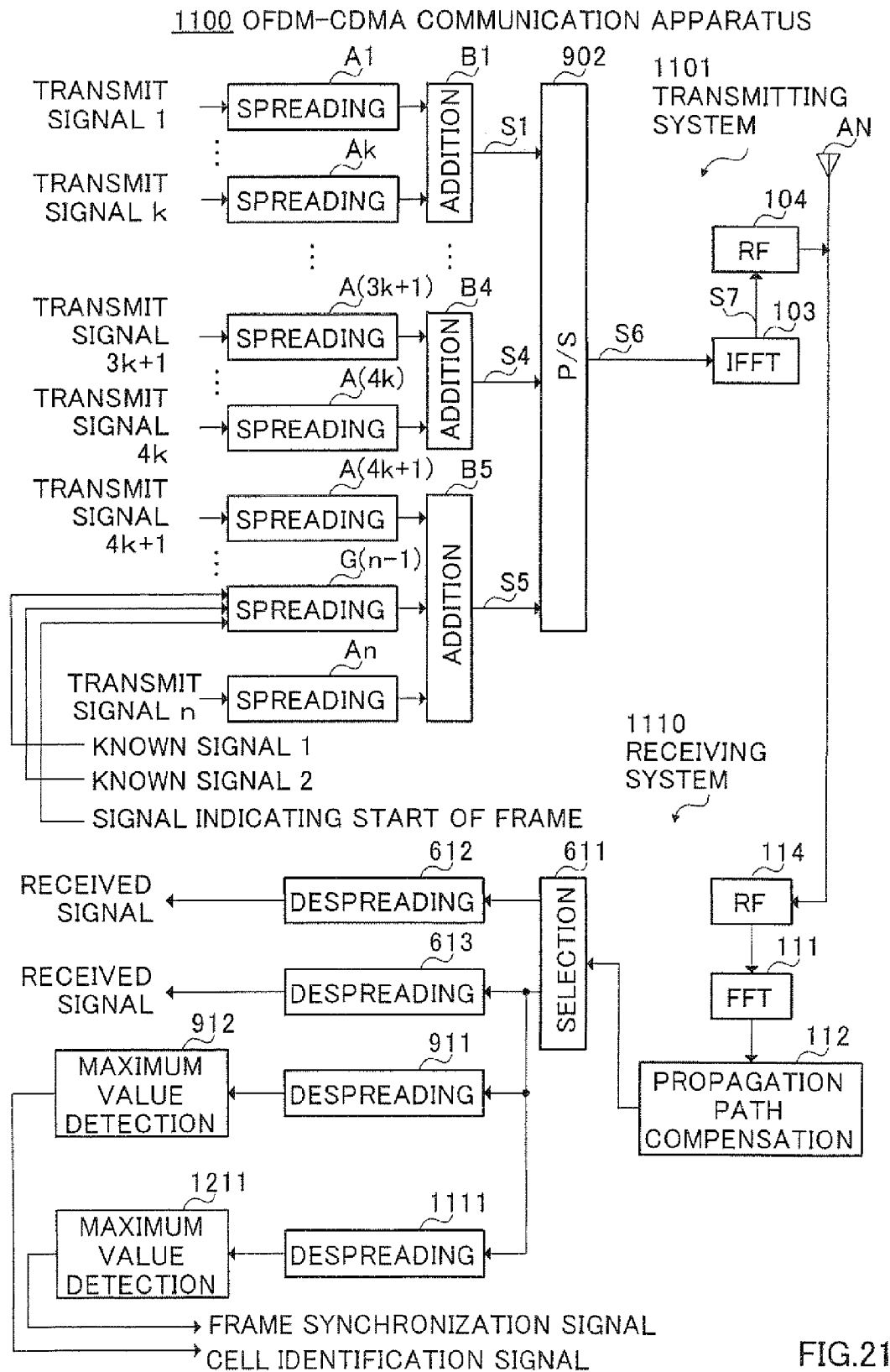
FIG. 21 is a block diagram showing the configuration of an OFDM-CDMA communication apparatus according to Embodiment 11.

FIG. 21 shows the configuration of an OFDM-CDMA communication apparatus 1100 according to this embodiment. In FIG. 21, in which parts corresponding to those in FIG. 19 are assigned the same codes as in FIG. 19, transmitting system 1101 of OFDM-CDMA communication apparatus 1100 has a similar configuration to that of transmitting system 901 in FIG. 19, but differs in that known signal 1 is spread using a different spreading code only when a signal indicating the start of a frame is input to spreader G(n−1) that spreads known signal 1.

In receiving system 1110, a code division multiplexed signal with a low degree of signal multiplexing, separated by selecting section 611, is input to despreaders 911 and 1111. In the same way as described in Embodiment 9, despreader 911 executes despreading processing on an input signal with a spreading code other than that for the start of a frame used by spreader G(n−1) in despreader 911 as a coefficient, and the cell to which this station belongs is identified by having maximum value detection circuit 912 detect the maximum value timing of the signal that has undergone despreading.

Despreader 1111 performs despreading processing on an input signal, using the spreading code used by spreader G(n−1) at the start of a frame. Maximum value detection circuit 1112 obtains a frame synchronization signal by detecting the maximum value of the output result of despreader 1111.

According to the above configuration, by changing the spreading code of a known signal only at the timing of the start of a transmit frame, frame synchronization can be performed easily without inserting a signal for frame synchronization such as a preamble. As a result, it is no longer necessary to insert a signal for frame synchronization such as a preamble. Therefore, the configuration can be simplified accordingly, and transmission efficiency can be improved inasmuch as a signal for frame synchronization such as a preamble need not be transmitted.

In the above-described embodiment, a case has been described in which the spreading code of a known signal is changed at the timing of the start of a transmit frame, but it is also possible to change the type of signal transmitted from known signal 1 to known signal 2 at the timing of the start of a transmit frame, as shown in FIG. 21. If this is done, the same effect as in the above-described embodiment can be obtained by executing despreading processing using a coefficient corresponding to known signal 2 in despreader 1111.

(Embodiment 12)

A special feature of an OFDM-CDMA communication apparatus according to Embodiment 12 of the present invention is that, by multiplexing a signal in which a known signal is spread only at the start of a frame, frame synchronization can easily be achieved without increasing the number of spreading codes assigned to a known signal.

When, the spreading code for the start of a frame is changed, as in Embodiment 11, it is necessary to assign a plurality of spreading codes to a known signal, and therefore the number of spreading codes needed increases accordingly. However, in this embodiment, frame synchronization can easily be achieved without increasing the necessary number of spreading codes.

Figure 22:
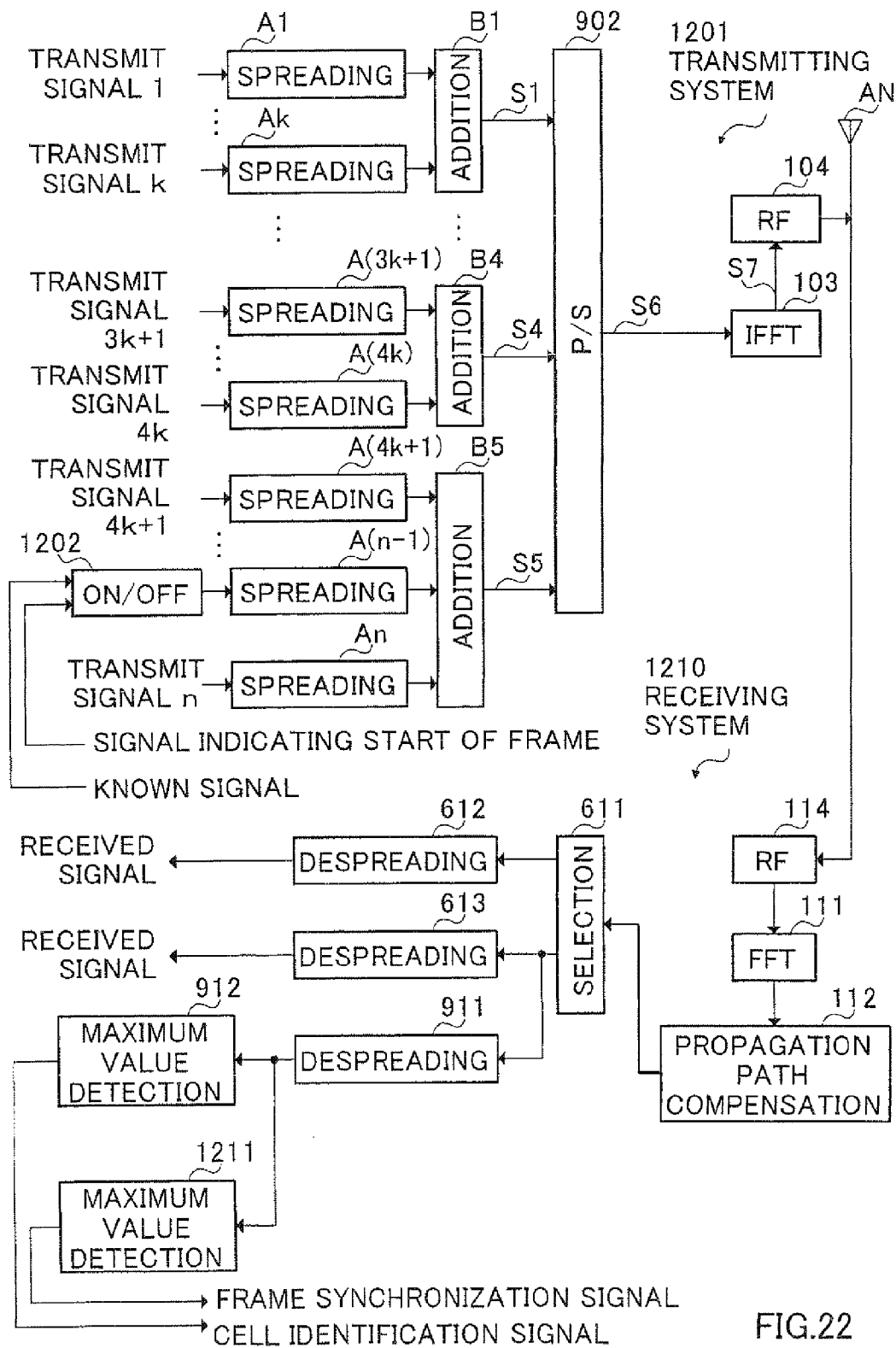
FIG. 22 is a block diagram showing the configuration of an OFDM-CDMA communication apparatus according to Embodiment 12.

FIG. 22 shows the configuration of an OFDM-CDMA communication apparatus according to this embodiment. In FIG. 22, in which parts corresponding to those in FIG. 19 are assigned the same codes as in FIG. 19, transmitting system 1201 of OFDM-CDMA communication apparatus 1200 has a similar configuration to that of transmitting system 901 in FIG. 19, but differs in that a known signal is input to spreader A(n−1) via an on/off switch (ON/OFF) 1202. On/off switch 1202 inputs the known signal to spreader A(n−1) only when a signal indicating the start of a frame is input. Thus, transmitting system 1201 multiplexes and transmits a signal in which a known signal is spread only at the start of a frame.

In receiving system 1210, a code division multiplexed signal with a low degree of signal multiplexing, separated by selecting section 611, is input to despreader 911. The signal despread by despreader 911 using the same spreading code as spreader A(n−1) is sent to maximum value detection circuits 912 and 1211.

Maximum value detection circuit 912 identifies the cell to which this station belongs by detecting the maximum value timing of the signal that has undergone despreading. Maximum value detection circuit 1211 obtains a frame synchronization signal by detecting the maximum value timing of the signal that has undergone despreading (the detection timing of the maximum value of the correlation result for one frame).

According to the above configuration, by multiplexing a signal in which a known signal is spread only at the start of a frame, frame synchronization can easily be achieved without increasing the number of spreading codes assigned to a known signal, in contrast to Embodiment 11.

(Embodiment 13)

A special feature of an OFDM-CDMA communication apparatus according to Embodiment 13 of the present invention is that the quality of specific data is improved by assigning a plurality of spreading codes to a specific signal, and transmitting the signal after spreading with a plurality of spreading codes.

Figure 23:
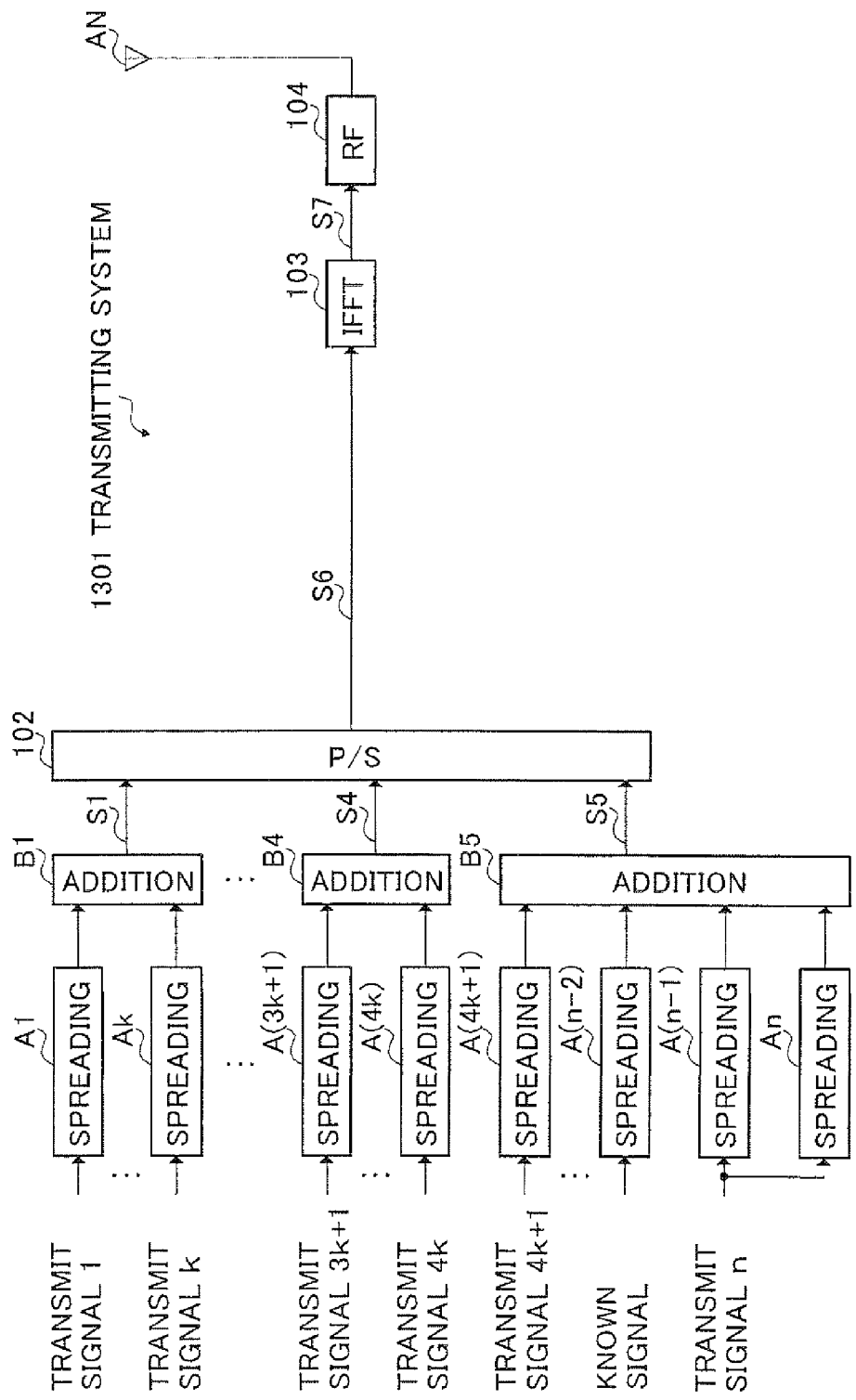
FIG. 23 is a block diagram showing the configuration of the transmitting system of an OFDM-CDMA communication apparatus according to Embodiment 13.

FIG. 23 shows the configuration of an OFDM-CDMA communication apparatus according to this embodiment. In FIG. 23, in which parts corresponding to those in FIG. 15 are assigned the same codes as in FIG. 15, transmitting system 1301 of OFDM-CDMA communication apparatus 1300 has a similar configuration to that of transmitting system 701 in FIG. 15, but differs in that transmit signal n is spread by spreaders A(n−1) and An using different spreading codes.

According to the above configuration, by assigning a plurality of spreading codes to a specific signal, and transmitting the signal after spreading with a plurality of spreading codes, the receiving side can recover the specific signal with a high signal level by despreading the specific signal using a plurality of spreading codes, and combining the signals after despreading processing. As a result, error rate characteristics can be significantly improved for that specific signal.

(Embodiment 14)

Figure 24:
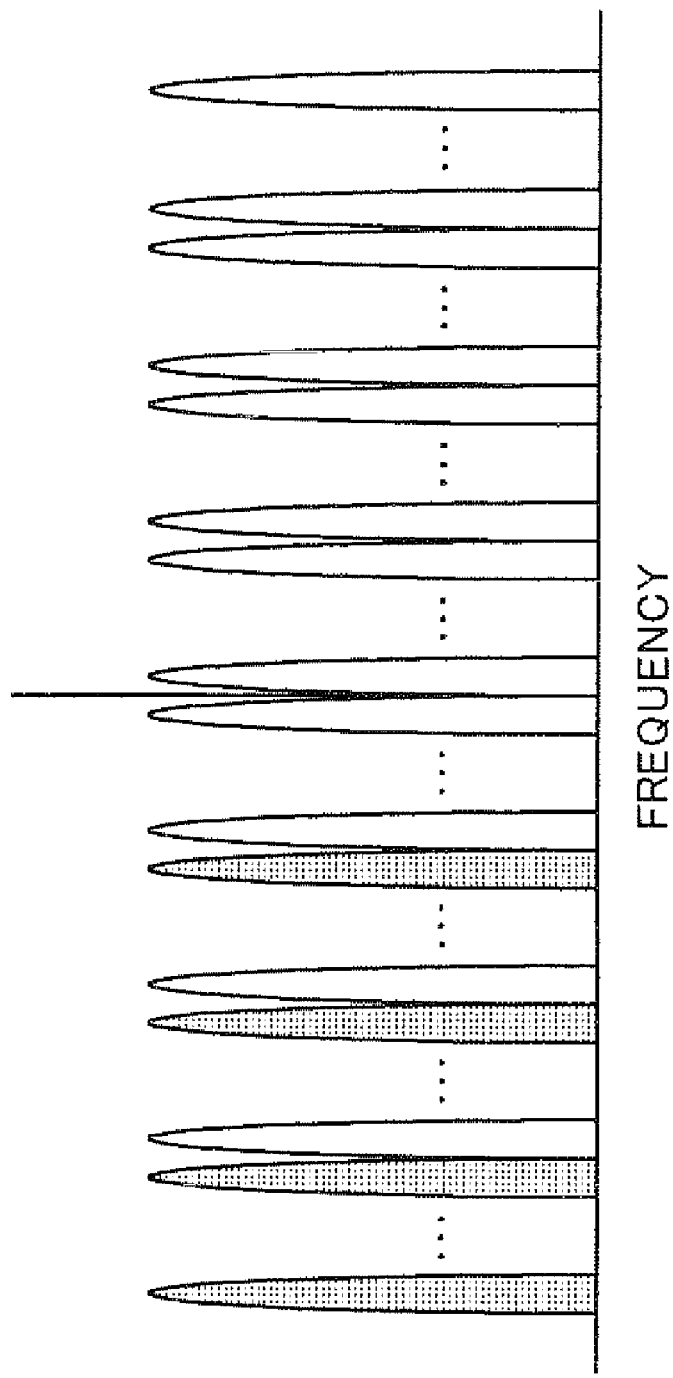
FIG. 24 is a drawing provided in order to explain an OFDM-CDMA signal when a subcarrier for which the degree of multiplexing has been reduced is located at intervals of a plurality of subcarriers in Embodiment 14.

A special feature of an OFDM-CDMA communication apparatus according to Embodiment 14 of the present invention is that quality in a propagation environment in which multipath delay time is short is further improved by allocating a code division multiplexed signal for which the degree of signal multiplexing is set low at intervals of a plurality of subcarriers, as indicated by shading in FIG. 24.

In a propagation environment in which multipath delay time is short, it may happen that the reception levels of a plurality of subcarriers decline together. In this case, the effectiveness of error correction decreases, and channel quality greatly degrades.

Focusing on this point, this embodiment prevents the reception levels of code division multiplexed signals for which the degree of signal multiplexing is set low from declining together by allocating code division multiplexed signals for which the degree of signal multiplexing is set low to, for example, every second subcarrier. As a result, quality can be further improved in a propagation environment in which multipath delay time is short.

Figure 25:
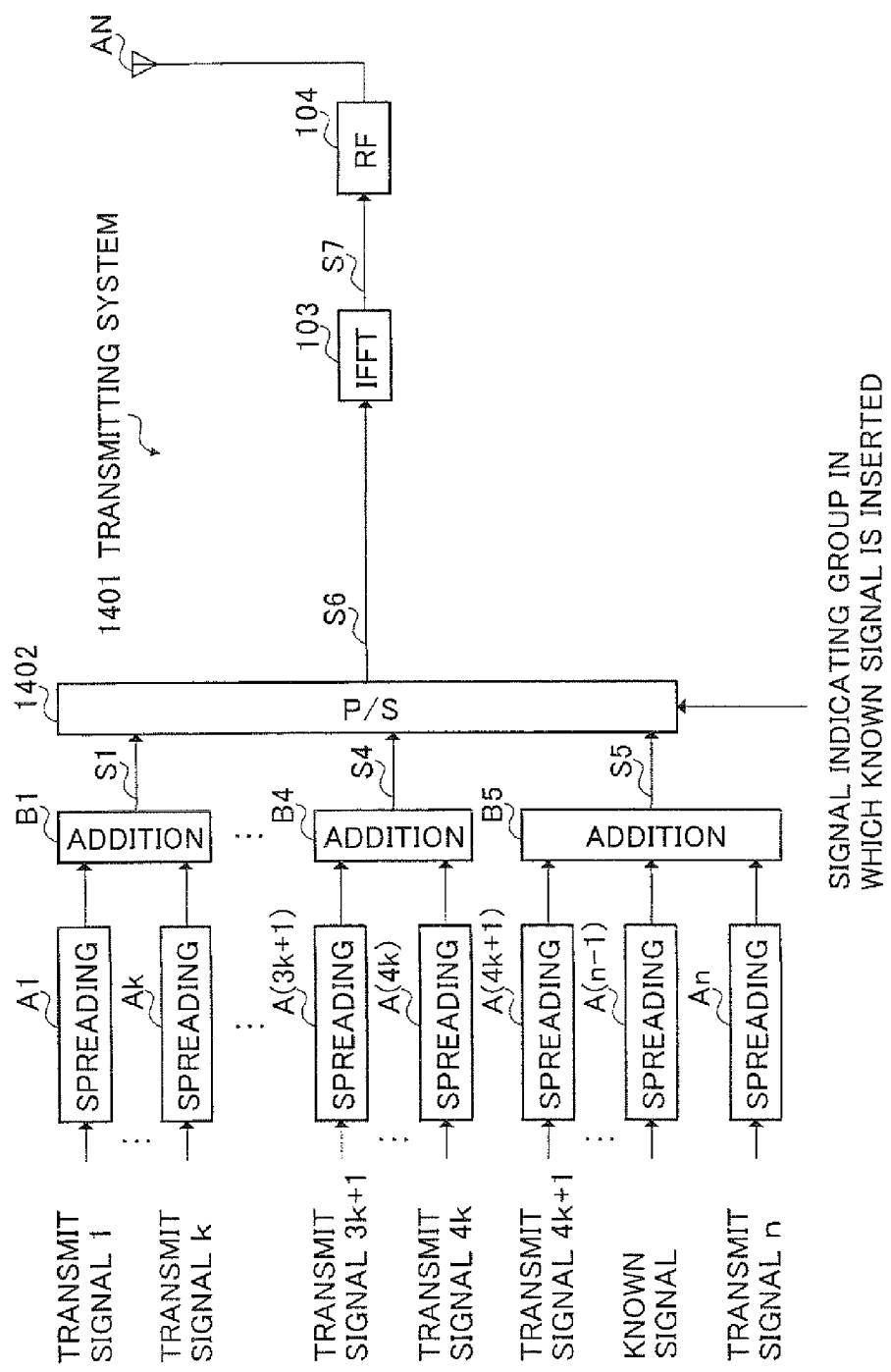
FIG. 25 is a block diagram showing the configuration of the transmitting system of an OFDM-CDMA communication apparatus according to Embodiment 14.

FIG. 25 shows the configuration of an OFDM-CDMA communication apparatus according to this embodiment. In FIG. 25, in which parts corresponding to those in FIG. 16 are assigned the same codes as in FIG. 16, transmitting system 1401 of OFDM-CDMA communication apparatus 1400 has a similar configuration to that of transmitting system 801 in FIG. 16 except for the configuration of parallel/serial converter 1402 as a multiplex signal allocation selecting section.

Parallel/serial converter 1402 rearranges as appropriate code division multiplexed signals S1 through S5 input from adders B1 through B5, based on a signal indicating the group to which a known signal belongs (that is, the group on which addition is performed by adder B5), so that code division multiplexed signals for which the degree of signal multiplexing is set low are allocated at intervals of a plurality of subcarriers, and sends the resulting signal to inverse fast Fourier transform circuit 103.

According to the above configuration, the error rate characteristics of a code division multiplexed signal with a low degree of signal multiplexing can be significantly improved by allocating a code division multiplexed signal for which the degree of signal multiplexing is set low at intervals of a plurality of subcarriers.

(Embodiment 15)

Figure 26:
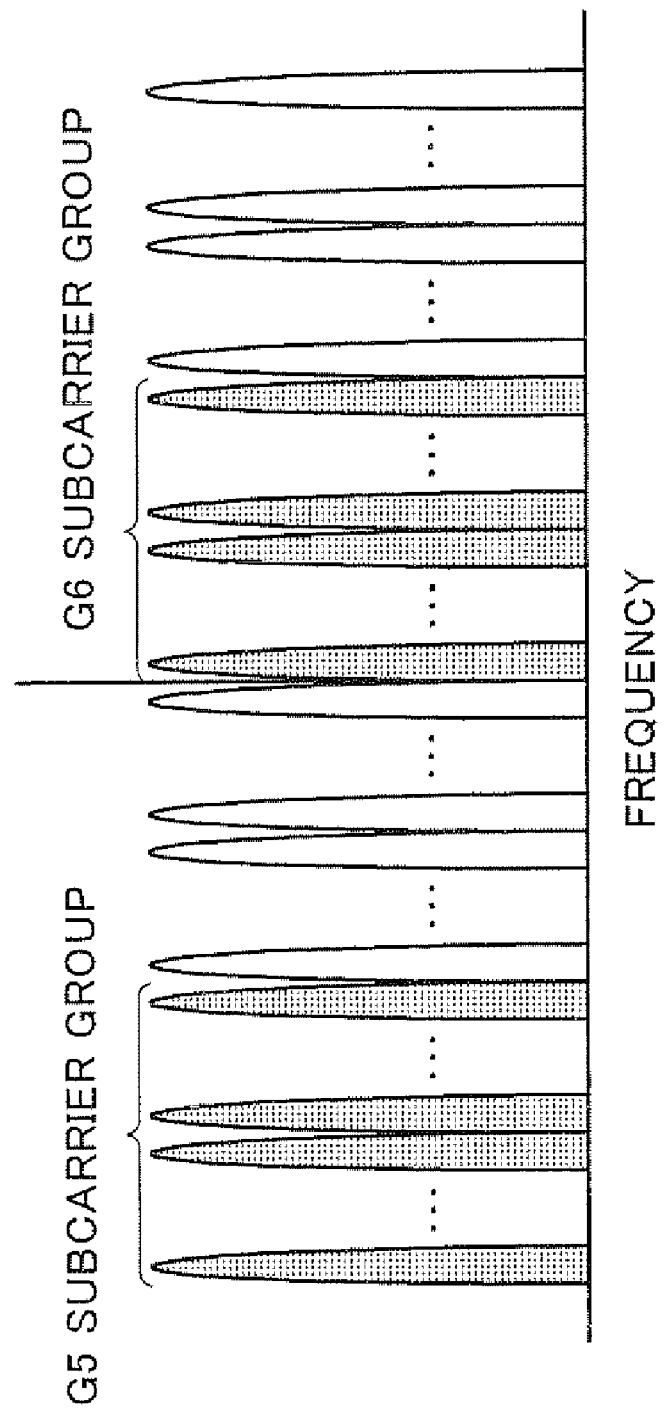
FIG. 26 is a drawing provided in order to explain an OFDM-CDMA signal when a multiplex signal for which the degree of multiplexing has been reduced is allocated to a plurality of subcarriers of a plurality of groups in Embodiment 14.

A special feature of an OFDM-CDMA communication apparatus according to Embodiment 15 of the present invention is that a code division multiplexed signal for which the degree of signal multiplexing is set low is allocated to a plurality of subcarrier groups G5 and G6, as indicated by shading in FIG. 26.

By this means, by having the receiving side select from subcarrier groups G5 and G6, after propagation path compensation, the one with the higher reception level, it is possible to prevent a fall in the reception level of code division multiplexed signals for which the degree of signal multiplexing is set low, and to significantly improve reception quality.

FIG. 27 shows the configuration of an OFDM-CDMA communication apparatus according to this embodiment. In FIG. 27, in which parts corresponding to those in FIG. 19 are assigned the same codes as in FIG. 19, transmitting system 1501 of OFDM-CDMA communication apparatus 1500 has a similar configuration to that of transmitting system 901 in FIG. 19 except for the configuration of parallel/serial converter 1502 as a multiplex signal allocation selecting section.

Parallel/serial converter 1502 rearranges as appropriate code division multiplexed signals S1 through S5 into an order whereby code division multiplexed signal S5 is allocated to subcarrier groups G5 and G6, as shown in FIG. 26, and sends the resulting signal to inverse fast Fourier transform circuit 103.

In receiving system 1510, the reception levels of subcarrier groups G5 and G6 are detected by propagation path compensation circuit 112 based on the reception level of a known signal, and the results of this detection are sent to a selecting section 1511. Selecting section 1511 selects, from the two subcarrier groups G5 and G6 for code division multiplexed signals with a low degree of signal multiplexing input from selecting section 611, only the subcarrier group with the higher reception level, and sends this to next-stage despreaders 613 and 911. The subsequent processing is the same as in Embodiment 9.

According to the above configuration, reception quality can be significantly improved by transmitting a multiplex signal with a low degree of signal multiplexing allocated to a plurality of subcarrier groups, and demodulating only the multiplex signal of a subcarrier group with a small decrease in reception level on the receiving side.

(Embodiment 16)

A special feature of an OFDM-CDMA communication apparatus according to Embodiment 16 of the present invention is that, whereas in Embodiment 15 a multiplex signal with a low degree of signal multiplexing is transmitted allocated to a plurality of subcarrier groups, and the multiplex signal of a subcarrier group with a small decrease in reception level is selected and demodulated on the receiving side, in this embodiment the same kind of signals are transmitted, and signals that have undergone propagation path compensation are combined on the receiving side. By this means, it is possible to obtain received signals of significantly improved quality compared with Embodiment 15.

Figure 28:
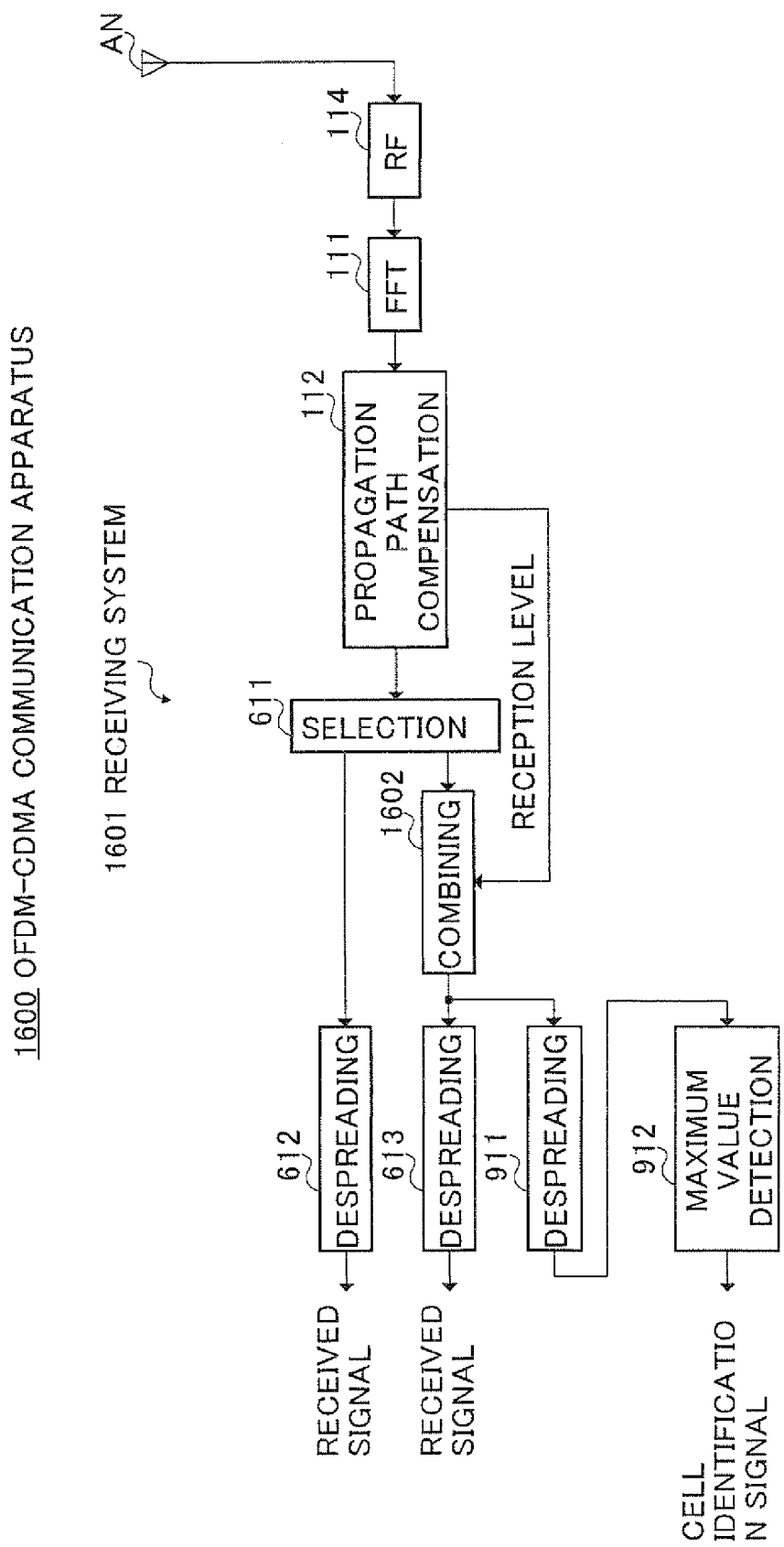
FIG. 28 is a block diagram showing the configuration of the receiving system of an OFDM-CDMA communication apparatus according to Embodiment 16.
Figure 29:
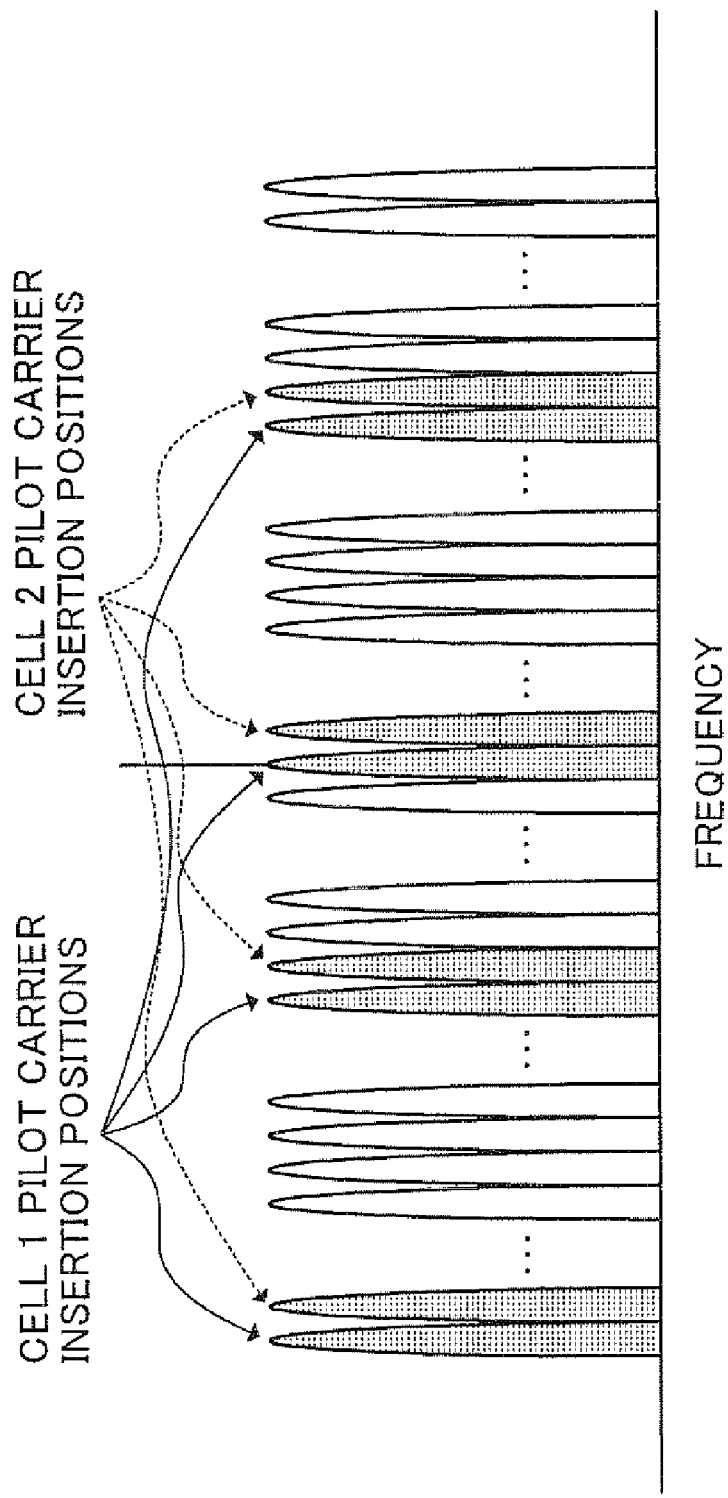
FIG. 29 is a drawing provided in order to explain an OFDM-CDMA signal according to Embodiment 17.

FIG. 28 shows the configuration of an OFDM-CDMA communication apparatus according to this embodiment. In FIG. 28, in which parts corresponding to those in FIG. 27 are assigned the same codes as in FIG. 27, receiving system 1601 of OFDM-CDMA communication apparatus 1600 has a similar configuration to that of receiving system 1510, except for having a combining section 1602 instead of selecting section 1511 (FIG. 27).

Based on the reception levels of subcarrier groups G5 and G6 detected by propagation path compensation circuit 112, and in accordance with a comparison of these reception levels, combining section 1602 performs maximal-ratio combining of the code division multiplexed signals of the two subcarrier groups G5 and G6 for code division multiplexed signals with a low degree of signal multiplexing input from selecting section 611.

According to the above configuration, reception quality can be significantly improved by transmitting a multiplex signal with a low degree of signal multiplexing allocated to a plurality of subcarrier groups, and performing demodulation on the receiving side after combining the multiplex signals of these subcarriers.

In the above-described configuration, a case has been described in which signals of a plurality of subcarriers with a low degree of signal multiplexing are subjected to maximal-ratio combining, but the present invention is not limited to this, and equal-gain combining, for example, may also be used.

(Embodiment 17)

A special feature of an OFDM-CDMA communication apparatus according to Embodiment 17 of the present invention is that, when only a known signal is transmitted on specific subcarriers, the subcarriers that transmit the known signal only are changed according to the cell.

Generally, in OFDM-CDMA communication, a method is used whereby only a known signal is superimposed on specific subcarriers (generally called "pilot carriers"). These pilot carriers are normally used for residual phase error detection, etc., when demodulation is carried out. In this embodiment, subcarriers in which pilot carriers are inserted are changed according to the cell.

By this means, cell identification characteristics can be further improved compared with Embodiment 9. In other words, to compare this embodiment with Embodiment 9, in Embodiment 9 signals in which a known signal is spread are multiplexed in subcarriers for which the degree of signal multiplexing is set low, but in this embodiment subcarriers are formed only by signals in which a known signal is spread.

It is also possible to use a combination of the configuration according to this embodiment and the configuration according to Embodiment 9. In this case, it is not absolutely necessary for pilot carriers and a known signal inserted in other subcarriers for which the degree of multiplexing is set low (generally called "pilot channel") both to be used, and it is also possible, for example, to use a pilot channel for another purpose (such as for residual phase error detection, for instance). By so doing, a new effect of enabling the pilot channel to be used for a different purpose is also achieved. Moreover, it is also possible to insert only pilot carriers and not to insert a pilot channel.

Figure 30:
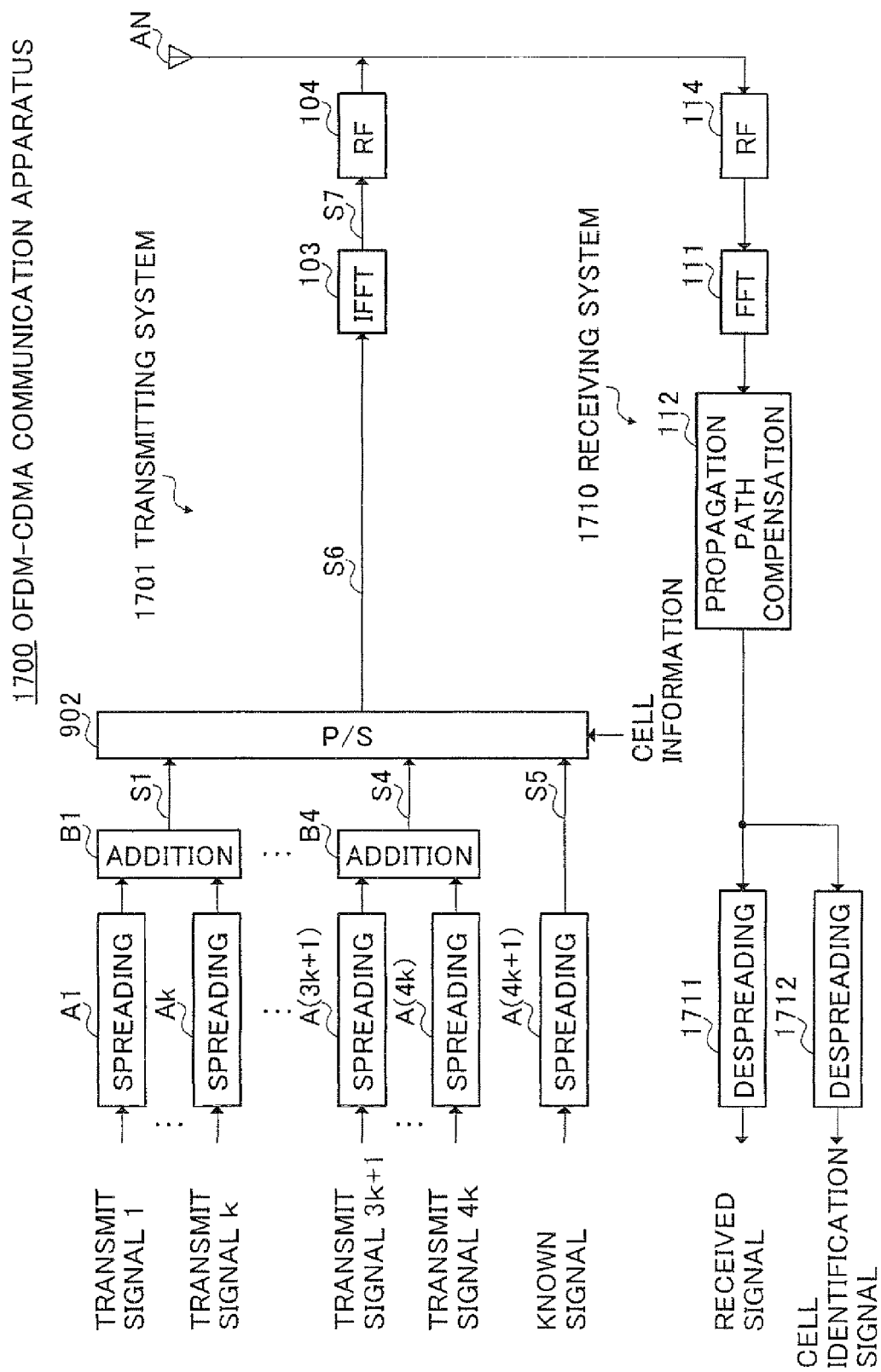
FIG. 30 is a block diagram showing the configuration of an OFDM-CDMA communication apparatus according to Embodiment 17.

FIG. 30 shows the configuration of an OFDM-CDMA communication apparatus according to this embodiment. In FIG. 30, in which parts corresponding to those in FIG. 19 are assigned the same codes as in FIG. 19, transmitting system 1701 of OFDM-CDMA communication apparatus 1700 has a similar configuration to that of transmitting system 901 in FIG. 19, but differs in that a known signal is input to parallel/serial converter (P/S) 902 without being multiplexed with other signals.

Based on information on the cell to which the far-end station belongs, parallel/serial converter 902 sends signal S5 in which a known signal is spread in an order such that spread signal S5 is allocated to subcarriers at positions corresponding to the cell to which the far-end station belongs.

In receiving system 1710, a transmit signal is obtained by having despreading processing executed by despreader 1711, and a known signal is obtained by having despreading processing executed by despreader 1712. Also, a cell identification signal is obtained based on the subcarrier positions of the known signal obtained by despreader 1712 (these positions can easily be determined by the position at which the known signal is arrayed after despreading). By this means, the cell to which this station belongs can easily be identified by receiving system 1710.

In FIG. 30, a case in which only a known signal is transmitted by specific subcarriers (that is, a case in which the degree of multiplexing of a known signal is 1) has been described, but the present invention is not limited to this, and it is also possible to perform transmission with a known signal multiplexed with other transmit signals by means of the same subcarriers. The essential point is for the subcarriers to which the known signal is allocated to be changed according to the cell to which the communicating station belongs.

According to the above configuration, by changing the subcarriers to which a known signal is allocated according to the cell, it is possible for the receiving side to easily identify the cell to which it belongs by detecting the positions of subcarriers by which the known signal was transmitted, even if a signal for cell identification is not transmitted. As a result, an OFDM-CDMA communication apparatus 1700 can be implemented that, in addition to achieving the effect obtained in Embodiment 1, improves transmission efficiency inasmuch as a signal for cell identification is not transmitted.

(Embodiment 18)

A special feature of an OFDM-CDMA communication apparatus according to Embodiment 18 of the present invention is that the number of cells that can be identified can be further increased, compared with Embodiment 17, by changing the kind of known signal of subcarriers that transmit only a known signal, according to the cell.

When the number of subcarriers used is small, there are not many choices available for subcarriers in which pilot carriers are inserted, and therefore the number of cells that can be identified is small. In consideration of this point, in this embodiment the number of cells that can be identified is increased by changing the kind of known signal superimposed on pilot carriers according to the cell.

Figure 31:
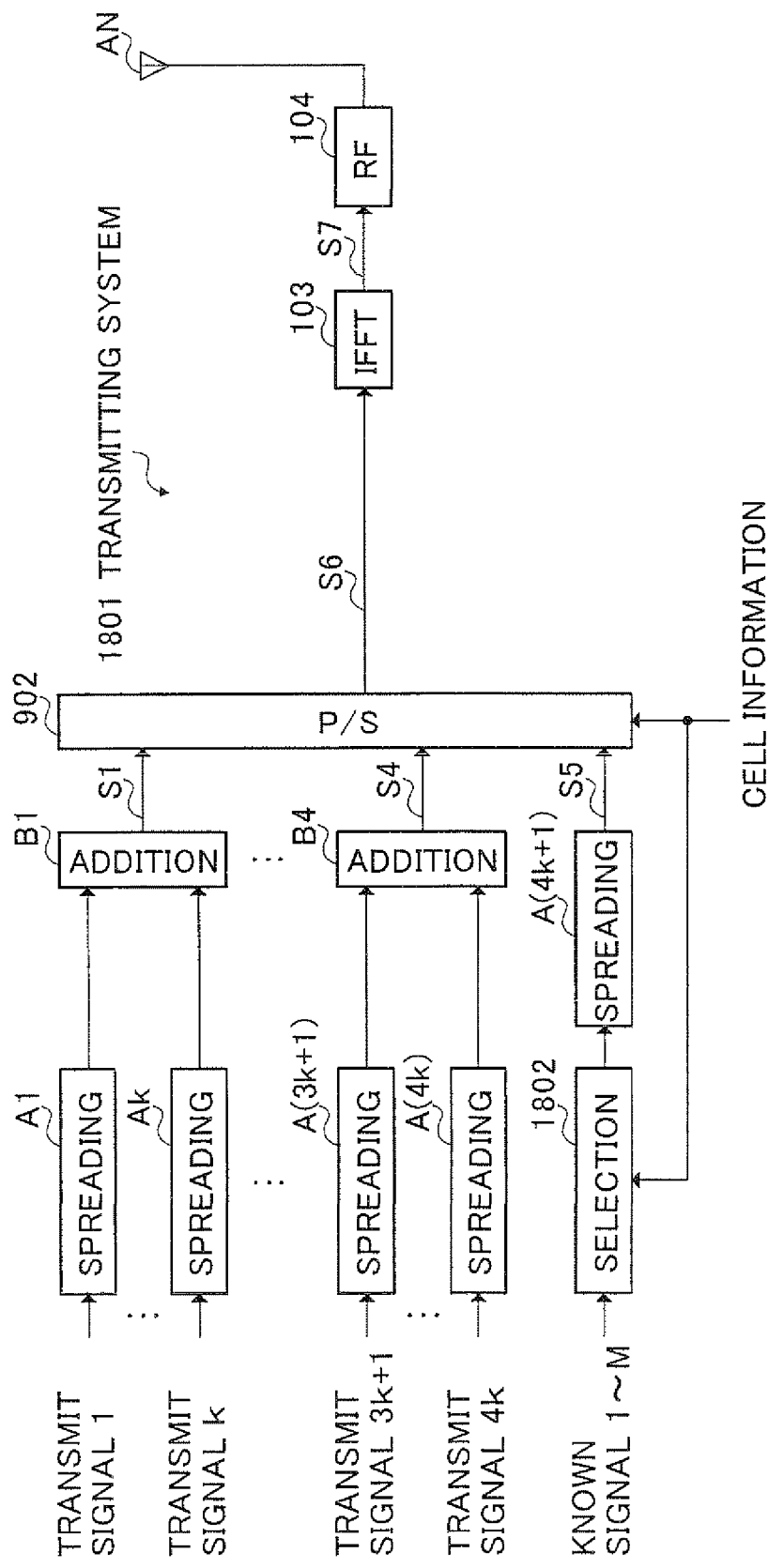
FIG. 31 is a block diagram showing the configuration of the transmitting system of an OFDM-CDMA communication apparatus according to Embodiment 18.

FIG. 31 shows the configuration of an OFDM-CDMA communication apparatus according to this embodiment. In FIG. 31, in which parts corresponding to those in FIG. 30 are assigned the same codes as in FIG. 30, transmitting system 1801 of OFDM-CDMA communication apparatus 1800 has a similar configuration to that of transmitting system 1701 in FIG. 30, but differs in having a selecting section 1802 that selects and outputs one of a plurality of known signals 1 through M.

Selecting section 1802 selects and outputs one of a plurality of known signals 1 through M, based on cell information. By this means, transmitting system 1801 can form a number of cell identification information items equivalent to the combinations of kinds of known signal and subcarrier positions, making this embodiment extremely effective when used in an OFDM-CDMA apparatus that has a small number of subcarriers relative to the number of cells.

FIG. 31 shows an OFDM-CDMA communication apparatus 1800 that has both the special feature of changing the kind of known signal of subcarriers that transmit only a known signal according to the cell, in accordance with this embodiment, and the special feature of changing the subcarriers that transmit only a known signal according to the cell, in accordance with Embodiment 17. However, it is of course also possible to have only a configuration that changes the kind of known signal of subcarriers that transmit only a known signal according to the cell.

(Embodiment 19)

A special feature of an OFDM-CDMA communication apparatus according to Embodiment 19 of the present invention is that, in addition to providing the configuration of Embodiment 17 or Embodiment 18, the signal level of a known signal is made higher than the signal level of other signals. By this means, the signal-to-noise ratio of a known signal superimposed on pilot carriers can be increased, enabling cell identification characteristics to be significantly improved.

Figure 32:
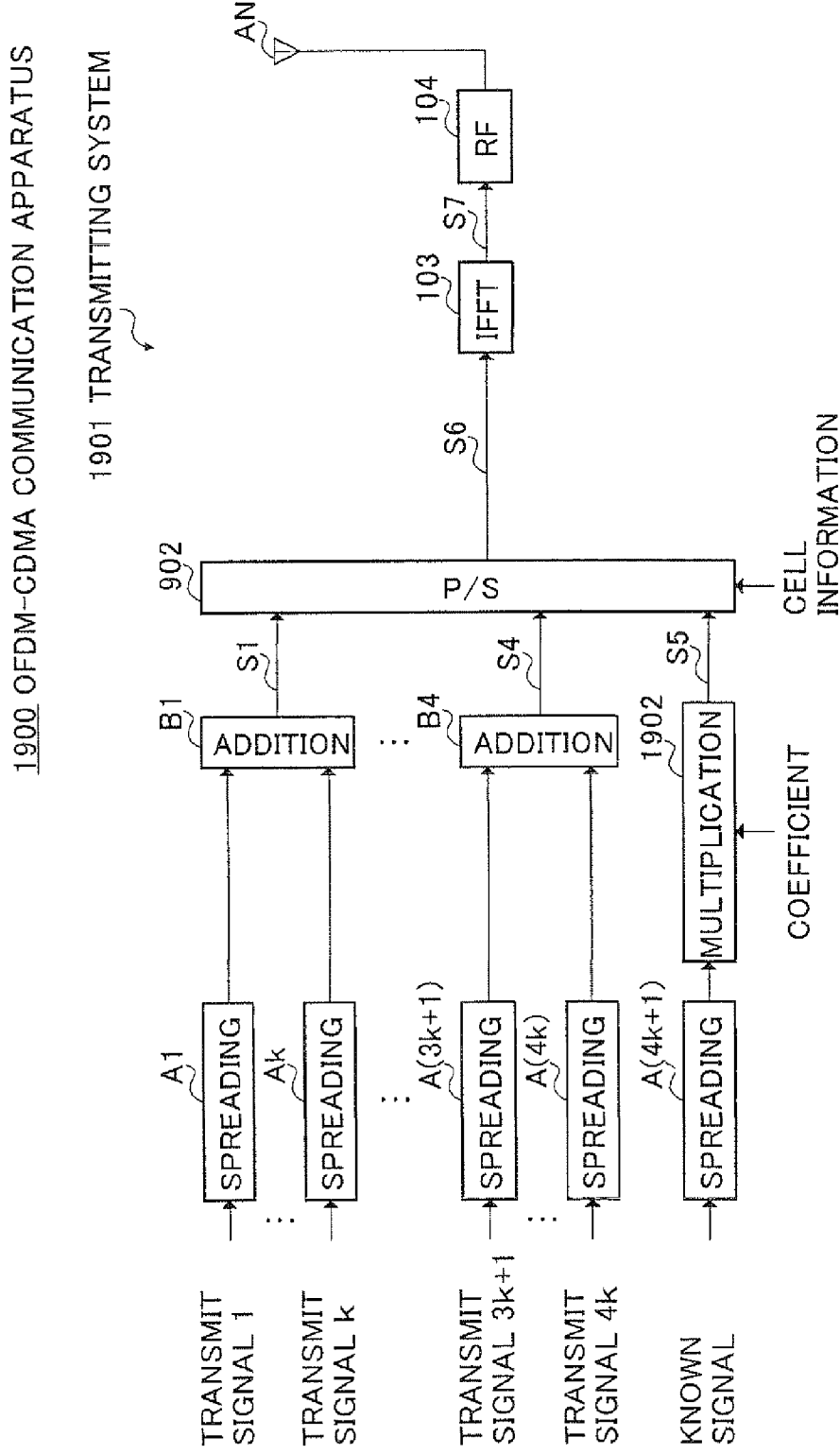
FIG. 32 is a block diagram showing the configuration of the transmitting system of an OFDM-CDMA communication apparatus according to Embodiment 19.

FIG. 32 shows the configuration of an OFDM-CDMA communication apparatus according to this embodiment. In FIG. 32, in which parts corresponding to those in FIG. 30 are assigned the same codes as in FIG. 30, transmitting system 1901 of OFDM-CDMA communication apparatus 1900 has a similar configuration to that of transmitting system 1701 in FIG. 30, but differs in having a multiplier 1902 that multiplies a spread known signal by a multiplication coefficient (>1).

Multiplier 1902 raises the transmission level of pilot carriers by performing amplification weighting on a spread known signal. By this means, the receiving side can perform cell identification based on pilot carriers with a high signal level, enabling the reliability of cell identification to be improved.

(Embodiment 20)

A special feature of an OFDM-CDMA communication apparatus according to Embodiment 20 of the present invention is that a bit shifting circuit is provided instead of the multiplier 1902 in Embodiment 19 (FIG. 32). By this means, processing to make the signal level of a spread known signal higher than the signal level of other subcarriers can be implemented with a simple configuration.

Figure 33:
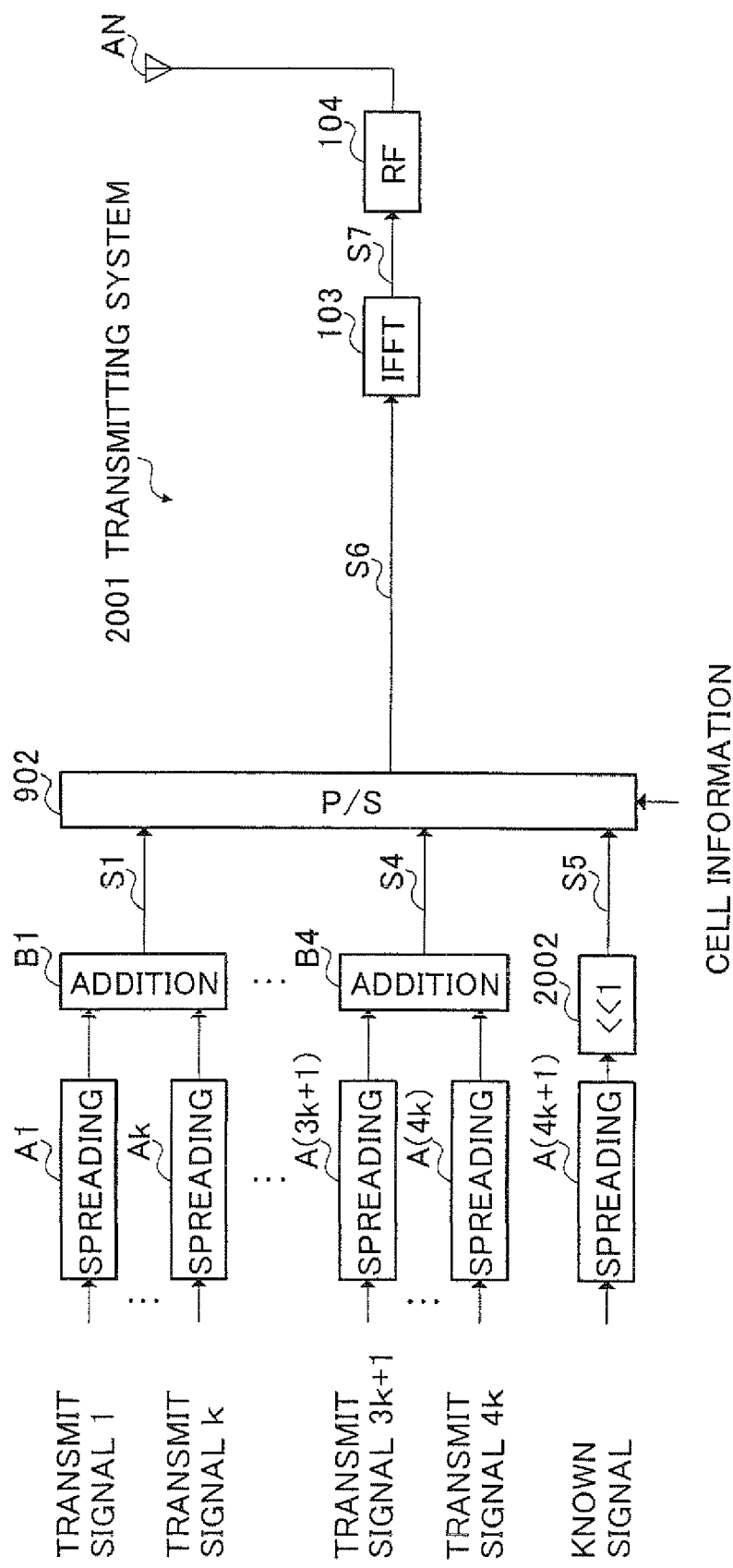
FIG. 33 is a block diagram showing the configuration of the transmitting system of an OFDM-CDMA communication apparatus according to Embodiment 20.

FIG. 33 shows the configuration of an OFDM-CDMA communication apparatus according to this embodiment. In FIG. 33, in which parts corresponding to those in FIG. 32 are assigned the same codes as in FIG. 32, in transmitting system 2001 of OFDM-CDMA communication apparatus 2000 a spread known signal is input to a one-bit shifting circuit 2002 that performs a one-bit tip-shift.

By this means, a signal with twice the signal level of the input signal is output from one-bit shifting circuit 2002. Thus, weighting processing equivalent to that of a multiplier can be performed with a simple configuration comprising one-bit shifting circuit 2002.

In this embodiment, a case has been described in which the transmission level is doubled, but doubling is not a limitation, and any value that can be realized with only a bit shifting circuit and adder/subtracter can be set.

According to the above configuration, by using a bit shifting circuit to perform processing that makes the transmission level of subcarriers that transmit only a known signal higher than the transmission level of other subcarriers, the same effect as in Embodiment 19 can be achieved with a simple configuration.

(Embodiment 21)

A special feature of an OFDM-CDMA communication apparatus according to Embodiment 21 of the present invention is that, in addition to providing the configuration of Embodiment 17, subcarriers that transmit only a known signal are changed to different subcarriers only at the start of a frame. By this means, frame synchronization characteristics can be improved on the receiving side since frame synchronization acquisition can be performed using both pilot carriers and a pilot channel.

Figure 34:
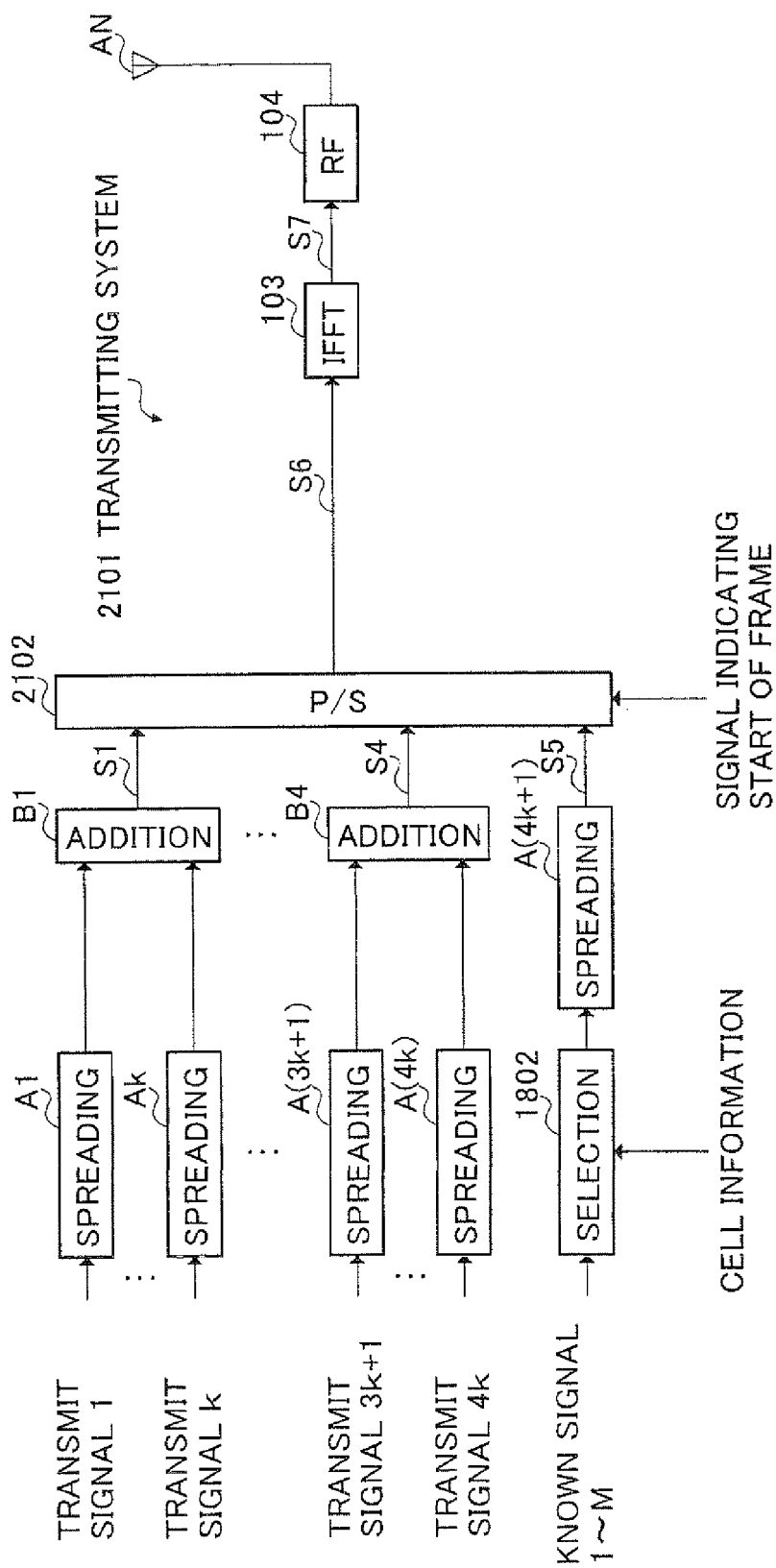
FIG. 34 is a block diagram showing the configuration of the transmitting system of an OFDM-CDMA communication apparatus according to Embodiment 21.

FIG. 34 shows the configuration of an OFDM-CDMA communication apparatus according to this embodiment. In FIG. 34, in which parts corresponding to those in FIG. 31 are assigned the same codes as in FIG. 31, transmitting system 2101 of OFDM-CDMA communication apparatus 2100 has a similar configuration to that of transmitting system 1801 in FIG. 31 except for the configuration of parallel/serial converter (P/S) 2102.

A signal indicating the start of a frame is input to parallel/serial converter 2102. Parallel/serial converter 2102 performs spread known signal output in an order such that spread known signals 1 through M are allocated to specific subcarriers. In addition, at the start of a frame only, parallel/serial converter 2102 outputs spread known signal S5 in an order such that signal S5 is allocated to different subcarriers from those during other signal periods. By this means, pilot carriers are changed to other subcarriers only at the start of a frame.

A receiving system for performing frame synchronization based on these pilot carriers may have a similar configuration to that of receiving system 1210 shown in FIG. 22 described in Embodiment 12.

According to the above configuration, frame synchronization detection characteristics can be improved by changing the pilot carrier positions only at the start of a frame.

(Embodiment 22)

A special feature of an OFDM-CDMA communication apparatus according to Embodiment 22 of the present invention is that, as compared with Embodiment 17, in subcarriers that transmit only a known signal, the kind of known signal is changed only at the start of a frame.

When the number of subcarriers used is small, there are not many choices available for subcarriers in which pilot carriers are inserted, and therefore when cell identification is performed by means of the pilot carrier insertion positions, as in Embodiment 17, the number of cells that can be identified is also small. In addition, when subcarriers in which pilot carriers are inserted are changed only at the start of a frame, as in Embodiment 21, the number of cells that can be identified is further reduced.

In consideration of this point, in this embodiment the number of cells that can be used is increased by fixing the subcarriers that transmit only a known signal, and also changing the kind of known signal only at the start of a frame.

Figure 35:
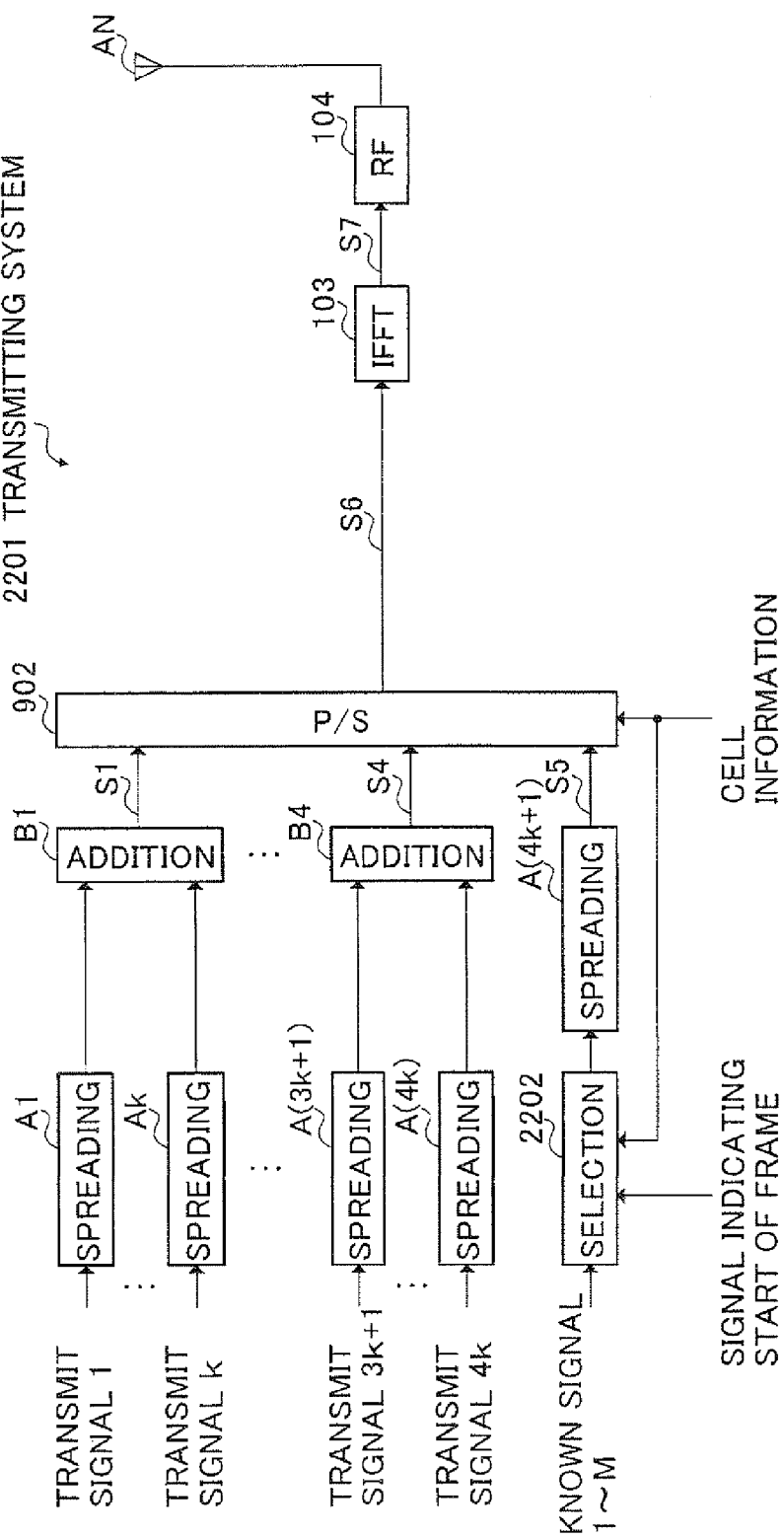
FIG. 35 is a block diagram showing the configuration of the transmitting system of an OFDM-CDMA communication apparatus according to Embodiment 22.

FIG. 35 shows the configuration of an OFDM-CDMA communication apparatus according to this embodiment. In FIG. 35, in which parts corresponding to those in FIG. 31 are assigned the same codes as in FIG. 31, transmitting system 2201 of OFDM-CDMA communication apparatus 2200 has a similar configuration to that of transmitting system 1801 of Embodiment 18, but differs in that a signal indicating the start of a frame is input to selecting section 2202 in addition to cell information.

By this means, the operation in transmitting system 2201 is the same as in transmitting system 1801 (FIG. 31) described in Embodiment 18, but differs in that, in addition to the operation of above-described transmitting system 1801, the kind of known signal is changed only at the start of a frame.

Frame synchronization acquisition is also possible by combining changing of pilot carrier data at the start of a frame, which is a special feature of this embodiment, with changing of the pilot carrier positions at the start of a frame, which is a special feature of Embodiment 21.

According to the above configuration, by changing the kind of known signal only at the start of a frame in subcarriers that transmit only a known signal, it is possible to have the receiving side identify the cell to which the station itself belongs from among many cells, and also perform frame synchronization, without adding information for cell identification or frame synchronization.

(Embodiment 23)

A special feature of an OFDM-CDMA communication apparatus according to Embodiment 23 of the present invention is that, in addition to providing the configuration of Embodiments 1 through 22, the signal level is lowered for code division multiplexed signals other than code division multiplexed signals for which the degree of multiplexing is set low. That is to say, the signal levels of other code division multiplexed signals are made relatively lower than the signal levels of code division multiplexed signals for which the degree of multiplexing is set low.

If the signal levels of code division multiplexed signals for which the degree of multiplexing is set low are made higher, it is possible to significantly improve the quality of data for which better quality is required than for other data, but when the proportion of subcarriers accounted for by subcarriers to which code division multiplexed signals for which the degree of multiplexing is set low are allocated increases, peak power also increases.

In consideration of this point, in this embodiment, when the proportion of subcarriers for which the degree of multiplexing is set low is large, the signal power of other subcarriers is decreased. By this means, peak power can be reduced.

Figure 36:
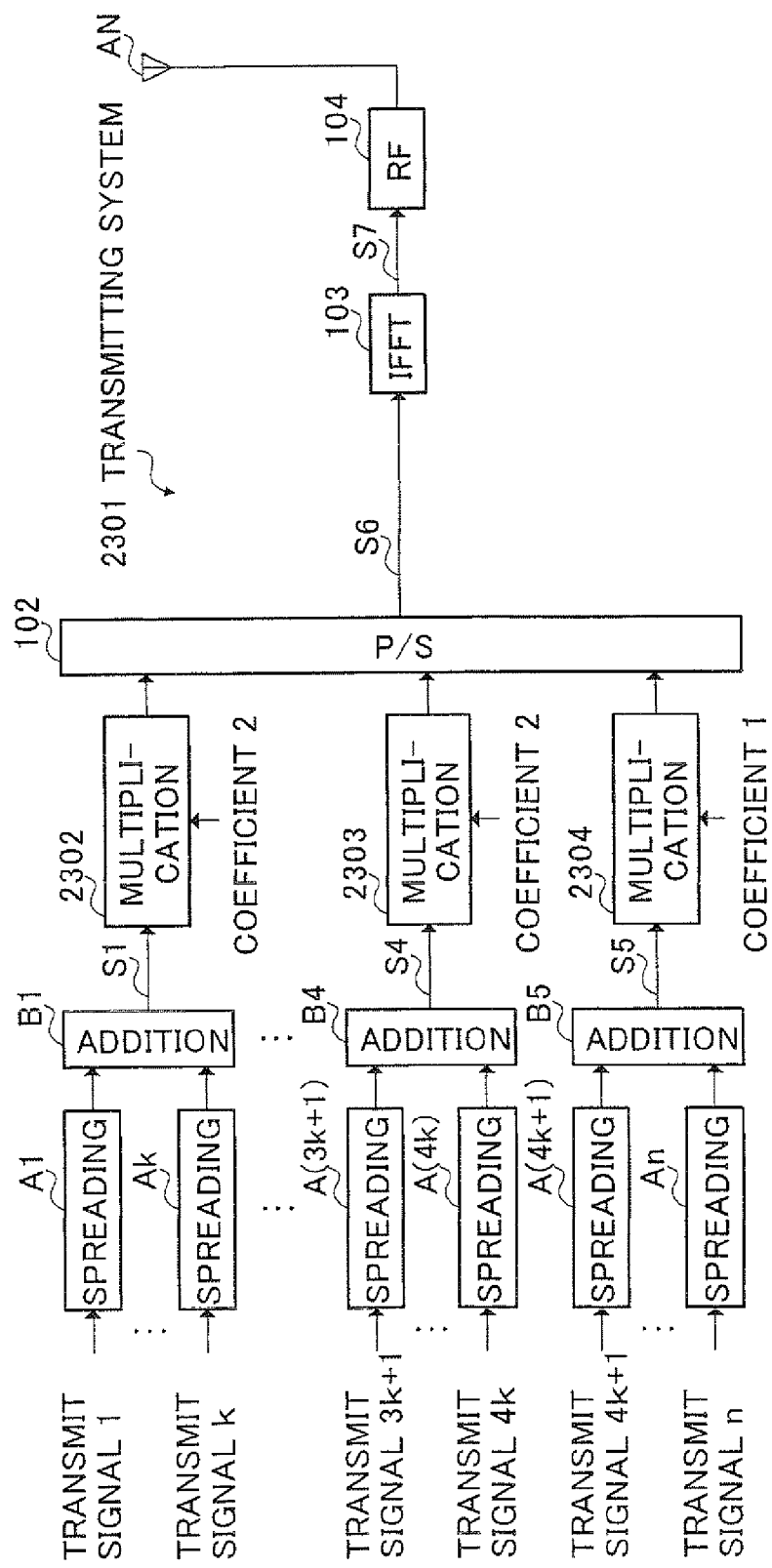
FIG. 36 is a block diagram showing the configuration of the transmitting system of an OFDM-CDMA communication apparatus according to Embodiment 23.

FIG. 36 shows the configuration of an OFDM-CDMA communication apparatus according to this embodiment. In FIG. 36, in which parts corresponding to those in FIG. 6 are assigned the same codes as in FIG. 6, transmitting system 2301 of OFDM-CDMA communication apparatus 2300 has a similar configuration to that of transmitting system 101 in FIG. 6, but differs in having multipliers 2302, ..., 2303, 2304 that execute weighting processing on code division multiplexed signals S1, ..., S4, S5.

The value selected as the multiplication coefficient (coefficient 2) of multipliers 2302, ..., 2303 provided for code division multiplexed signals with a high degree of signal multiplexing S1, ..., S4 is smaller than the value of the multiplication coefficient (coefficient 1) of multiplier 2304 provided for code division multiplexed signal S5. That is to say, the relationship "coefficient 2<coefficient 1" holds true.

In this embodiment, the signal level of code division multiplexed signal S5 for which the degree of multiplexing is set low is decreased by also providing a multiplier 2304 for code division multiplexed signal S5 for which the degree of multiplexing is set low, and selecting a value smaller than "1" for coefficient 1.

According to the above configuration, peak power—which is a problem in OFDM-CDMA transmission—is reduced satisfactorily by lowering signal levels taking into consideration the proportion of all subcarriers accounted for by subcarriers for which the degree of signal multiplexing is set low.

(Embodiment 24)

A special feature of an OFDM-CDMA communication apparatus according to Embodiment 24 of the present invention is that, as compared with Embodiment 23, the signal power of code division multiplexed signals allocated to subcarriers is controlled by means of bit shifting circuits instead of multipliers. By this means, the same effect as in Embodiment 23 can be achieved with a significantly simpler configuration.

Figure 37:
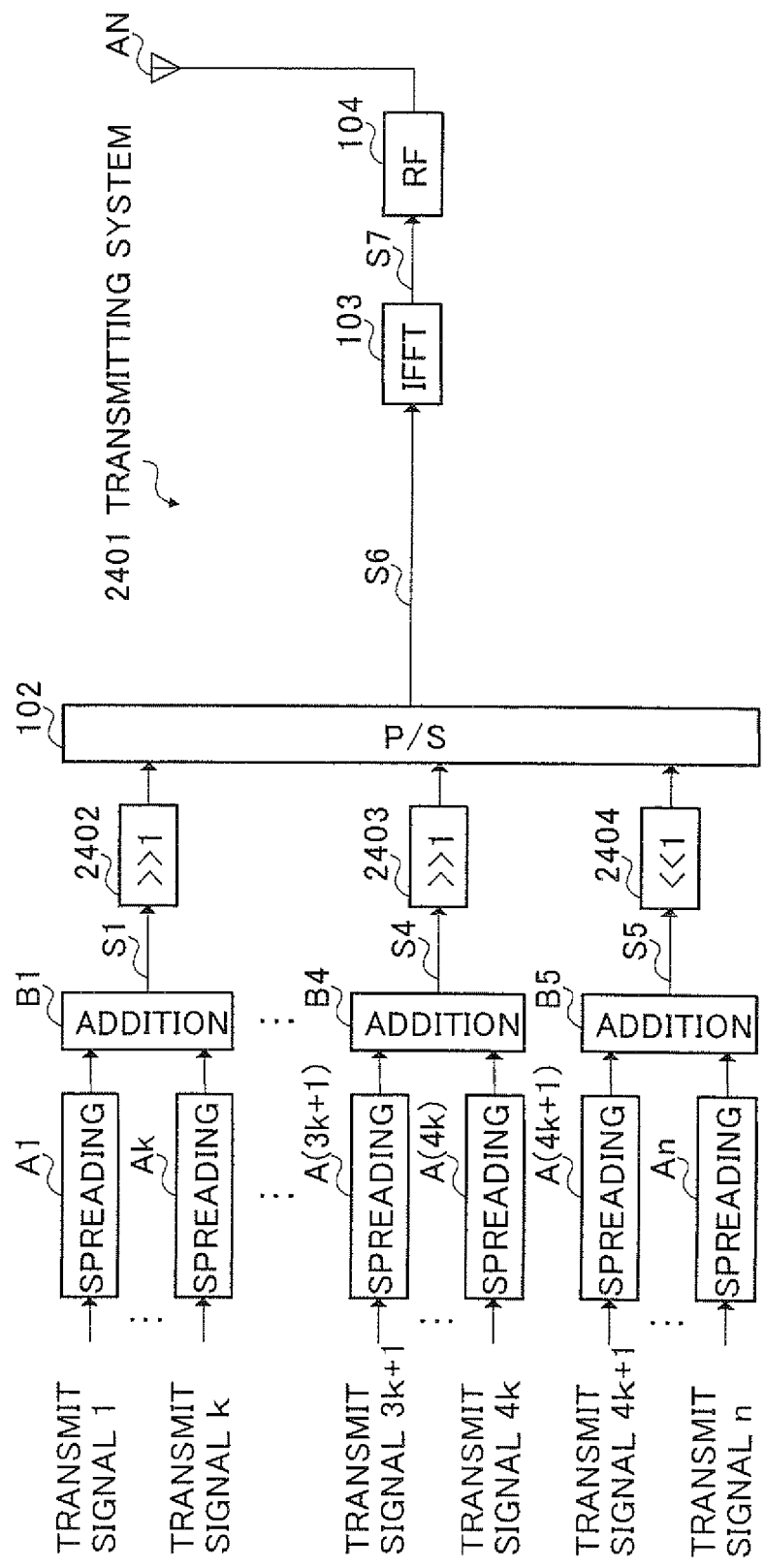
FIG. 37 is a block diagram showing the configuration of the transmitting system of an OFDM-CDMA communication apparatus according to Embodiment 24.

FIG. 37 shows the configuration of an OFDM-CDMA communication apparatus according to this embodiment. In FIG. 37, in which parts corresponding to those in FIG. 36 are assigned the same codes as in FIG. 36, transmitting system 2401 of OFDM-CDMA communication apparatus 2400 has a similar configuration to that of transmitting system 2301 in FIG. 36, except for being provided with one-bit shifting circuits 2402, ..., 2403, 2404 instead of multipliers 2302, ..., 2303, 2304.

One-bit shifting circuits 2402, ..., 2403 that perform a one-hit down-shift are provided for code division multiplexed signals S1, ..., S4 with a high degree of multiplexing, while one-bit shifting circuit 2401 that performs a one-bit up-shift is provided for code division multiplexed signal S5 with a low degree of multiplexing. By this means, one-bit shifting circuits 2402, ..., 2403 halve the signal level of code division multiplexed signals S1, ..., S4 with a high degree of signal multiplexing, and one-bit shifting circuit 2404 doubles the signal level of code division multiplexed signal S5 with a low degree of signal multiplexing.

In this embodiment, a case has been described in which signal levels are doubled or halved by providing one-bit shifting circuits, but amplification levels are not limited to these, and any value that can be realized with only a bit shifting circuit and adder/subtracter can be set.

According to the above configuration, peak power—which is a problem in OFDM-CDMA transmission—is reduced satisfactorily and with a simple configuration by performing processing to increase or decrease signal levels using bit shifting circuits, taking into consideration the proportion of all subcarriers accounted for by subcarriers for which the degree of signal multiplexing is set low.

(Embodiment 25)

A special feature of an OFDM-CDMA communication apparatus according to Embodiment 25 of the present invention is that, in addition to the provisions of Embodiment 1, the signal level is made variable for each subcarrier according to the channel quality.

With regard to the transmission output of each subcarrier, quality is naturally better the higher the transmission output, but a drawback is that, conversely, when transmission power increases, peak power and power consumption also increase. In this embodiment this point is taken into consideration, and error rate characteristics and peak power are made compatible by adaptively changing the signal level of each subcarrier according to the channel quality.

In the case of this embodiment, received field level information (generally called "RSSI" (Received Signal Strength Indicator)) is used as an indicator for changing signal levels. By this means, it is possible to improve error rate characteristics and also suppress an undesired increase in peak power by increasing the signal level proportionally the lower the received field level.

Figure 38:
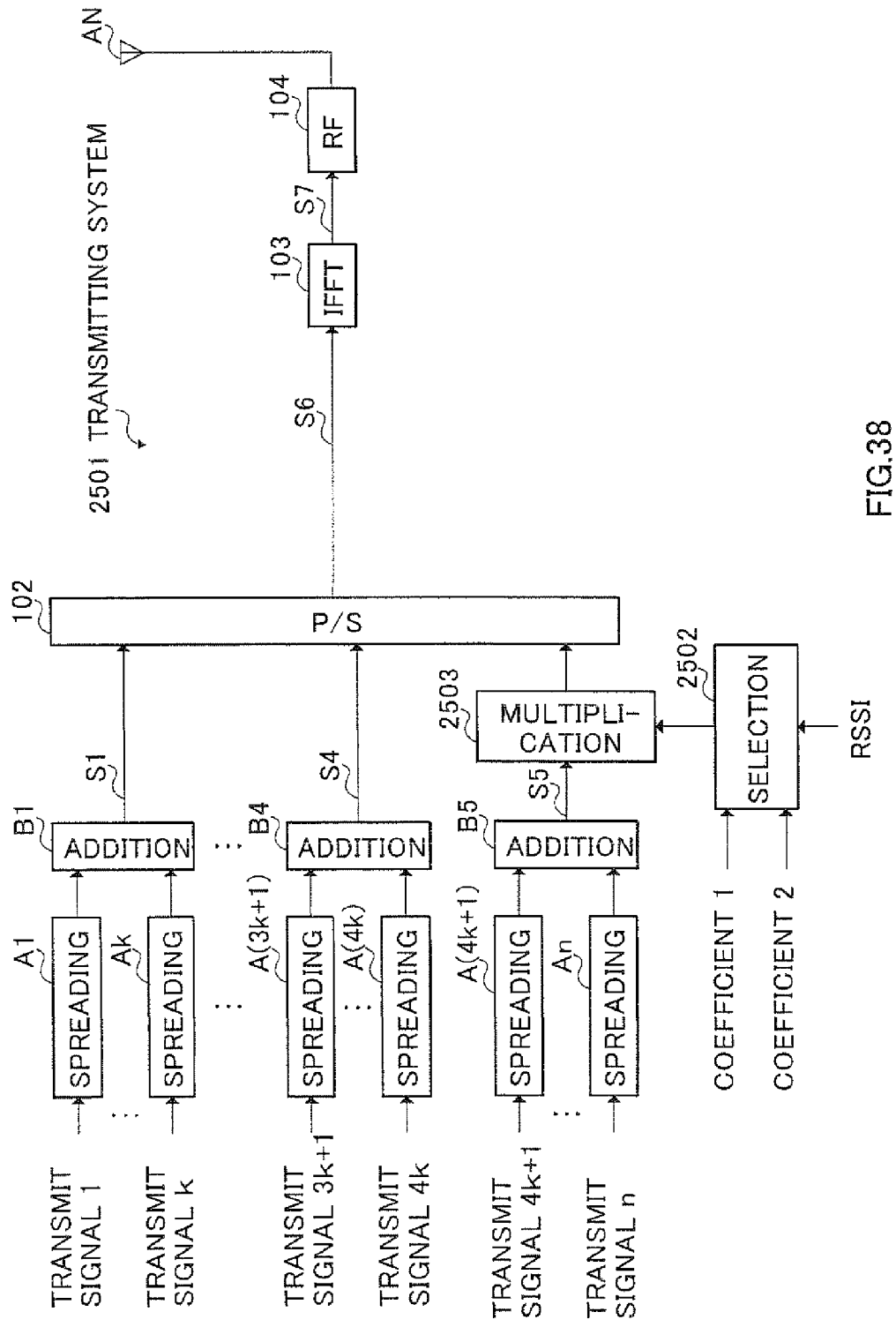
FIG. 38 is a block diagram showing the configuration of the transmitting system of an OFDM-CDMA communication apparatus according to Embodiment 25.

FIG. 38 shows the configuration of an OFDM-CDMA communication apparatus according to this embodiment. In FIG. 38, in which parts corresponding to those in FIG. 6 are assigned the same codes as in FIG. 6, transmitting system 2501 of OFDM-CDMA communication apparatus 2500 has a similar configuration to that of transmitting system 101 in FIG. 6, but differs in having a selecting section 2502 that selects either coefficient 1 or coefficient 2 according to RSSI, and a multiplier 2503 that changes the signal level of code division multiplexed signal S5 with a low degree of signal multiplexing by multiplying code division multiplexed signal S5 by the selected coefficient.

The relationship between coefficient 1 and coefficient 2 is "coefficient 1<coefficient 2", Selecting section 2502 selects and outputs smaller coefficient 1 when RSSI is greater than a predetermined threshold value, and selects larger coefficient 2 when RSSI is less than or equal to the threshold value. As a result, the signal level of code division multiplexed signal S5 with a low degree of multiplexing is increased in a propagation environment in which the received field level is low, and conversely, is decreased in a propagation environment in which the received field level is high. By this means, it is possible to for an undesired increase in peak power to be suppressed and error rate characteristics to be improved in transmitting system 2501.

In the sample configuration shown in FIG. 38, a case is illustrated in which only the signal level of subcarriers with a low degree of signal multiplexing is changed adaptively, but the present invention is not limited to this, and it is also possible to change adaptively the signal level of subcarriers with a high degree of signal multiplexing. Also, a case has been described in which there are two choices of signal level, but the present invention is not limited to this, and any selections are possible. Moreover, a case has been described in which RSSI is used as an indicator for changing signal levels, but a parameter other than RSSI, such as delay distribution, for example, can also be used, as long as that parameter serves as an indicator of channel quality.

According to the above configuration, by adaptively changing the signal level of a code division multiplexed signal allocated to subcarriers according to channel quality, in addition to offering the provisions of Embodiment 1, it is possible to suppress an undesired increase in peak power and improve error rate characteristics, in addition to achieving the effect of Embodiment 1.

(Embodiment 26)

A special feature of an OFDM-CDMA communication apparatus according to Embodiment 26 of the present invention is that, as compared with Embodiment 1, subcarriers for which the degree of signal multiplexing is set low, and other subcarriers, are transmitted from different antennas.

By this means, the transmission power of the amplifier in each transmitting section can be reduced, enabling peak power to be reduced. Also, as a result of this, the transmission power of subcarriers for which the degree of signal multiplexing is set low can be increased, making it possible to further improve the quality of data for which better quality is required than for other data, allocated to sub carriers for which the degree of signal multiplexing is reduced.

Figure 39:
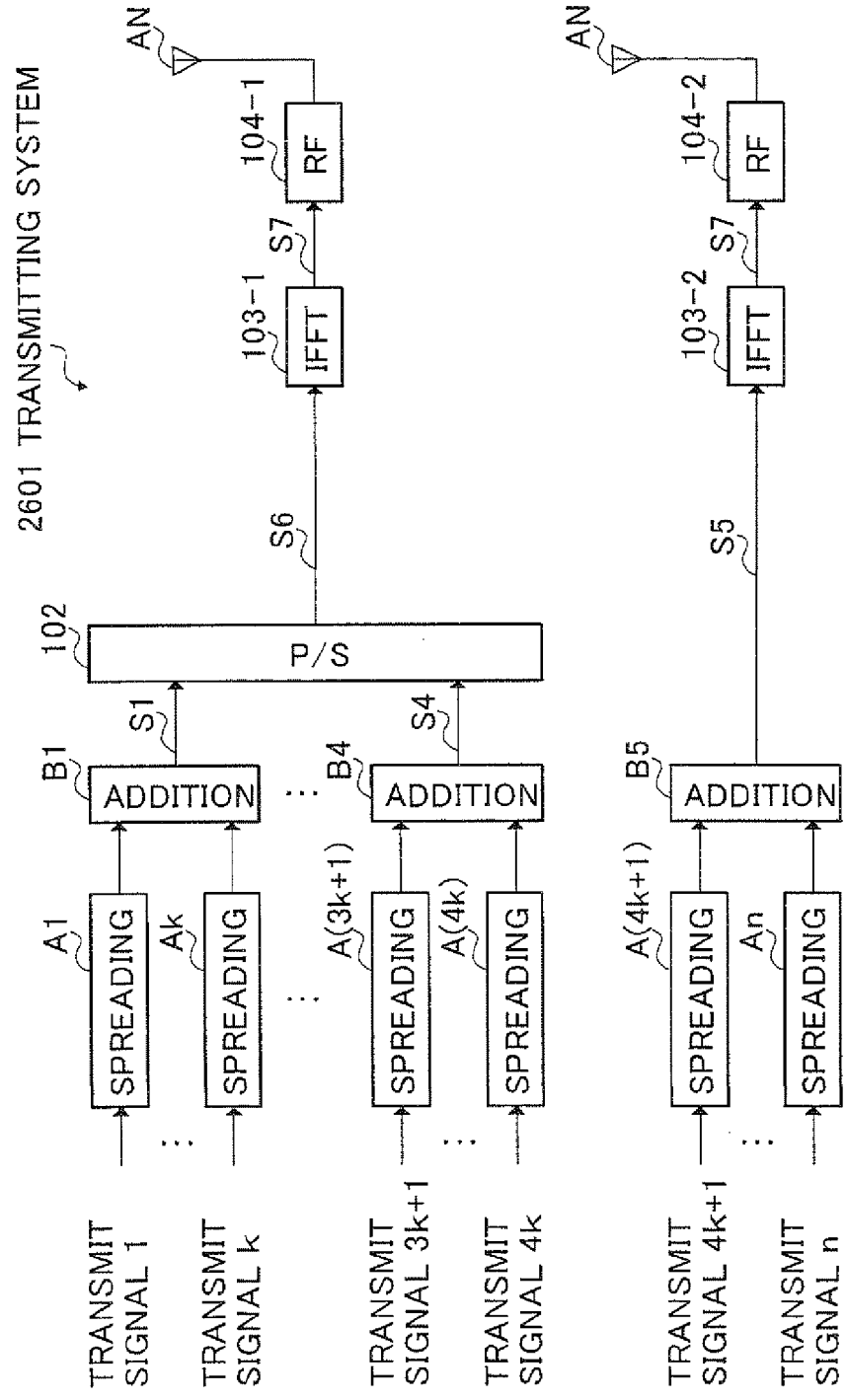
FIG. 39 is a block diagram showing the configuration of the transmitting system of an OFDM-CDMA communication apparatus according to Embodiment 26.

FIG. 39 shows the configuration of an OFDM-CDMA communication apparatus according to this embodiment. In FIG. 39, in which parts corresponding to those in FIG. 6 are assigned the same codes as in FIG. 6, transmitting system 2601 of OFDM-CDMA communication apparatus 2600 has a similar configuration to that of transmitting system 101 in FIG. 6, but differs in having two antennas AN1 and AN2, and two transmission processing sections corresponding thereto.

Transmitting system 2601 transmits code division multiplexed signals S1 through S4 with a high degree of signal multiplexing from antenna AN1 via parallel/serial converter 102, inverse fast Fourier transform circuit 103-1, and radio transmitting section 104-1. On the other hand, transmitting system 2601 transmits code division multiplexed signal S5 with a low degree of multiplexing from antenna AN2 via inverse fast Fourier transform circuit 103-2 and radio transmitting section 104-2.

According to the above configuration, by transmitting subcarriers for which the degree of signal multiplexing is set low, and other subcarriers, from different antennas, the signal level of subcarriers for which the degree of signal multiplexing is set low can be increased, and as a result, important information can be transmitted with significantly higher quality.

(Embodiment 27)

A special feature of an OFDM-CDMA communication apparatus according to Embodiment 27 of the present invention is that, in addition to the provisions of Embodiment 1, the degree of signal multiplexing of subcarriers for which the degree of signal multiplexing is set low is made variable.

The higher the degree of signal multiplexing, the higher, naturally, is transmission efficiency, but conversely, the poorer are error rate characteristics. Thus, the fact that the optimal value of degree of signal multiplexing differs according to channel quality was considered, and it was thought that an improvement in error rate characteristics and an improvement in transmission efficiency could be made compatible to a significantly greater extent by changing the degree of signal multiplexing according to a parameter such as RSSI, for example.

Figure 40:
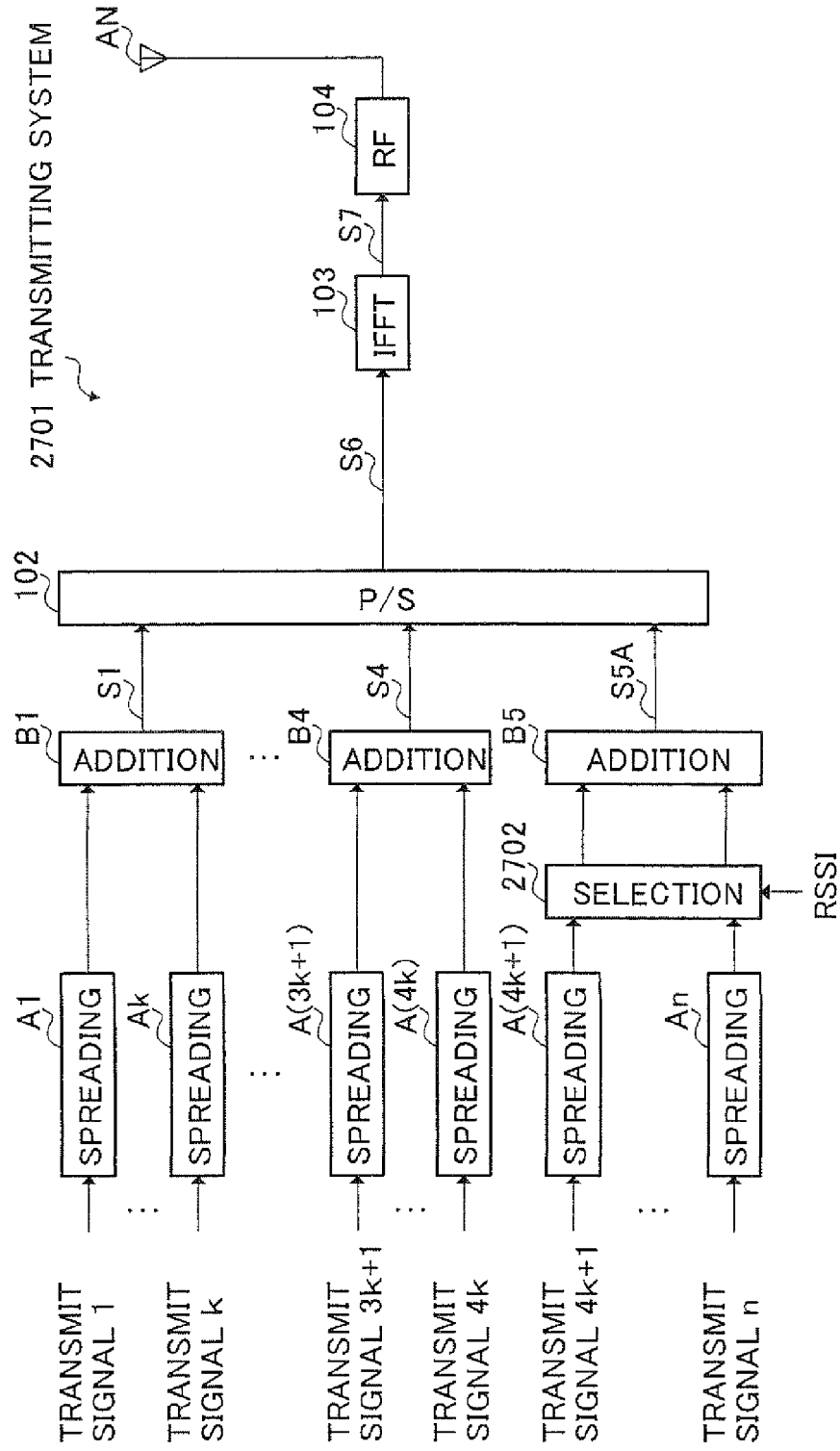
FIG. 40 is a block diagram showing the configuration of the transmitting system of an OFDM-CDMA communication apparatus according to Embodiment 27.

FIG. 40 shows the configuration of an OFDM-CDMA communication apparatus according to this embodiment. In FIG. 40, in which parts corresponding to those in FIG. 6 are assigned the same codes as in FIG. 6, transmitting system 2701 of OFDM-CDMA communication apparatus 2700 has a similar configuration to that of transmitting system 101 in FIG. 6, but differs in that a selecting section 2702 that selects signals to be multiplexed is provided in the processing system that forms multiplexed signals of subcarriers with a low degree of signal multiplexing.

Selecting section 2702 changes the number of spread transmit signals to be output to next-stage adder B5 according to the size of RSSI. Specifically, the larger RSSI, the better the channel quality can be considered to be, and therefore when RSSI is large, transmission efficiency is raised by increasing the number of spread transmit signals to be output. Conversely, the smaller RSSI, the poorer the channel quality can be considered to be, and therefore when RSSI is small, degradation of error rate characteristics is prevented by decreasing the number of spread transmit signals to be output.

In this embodiment, a case has been described in which RSSI is used as an indicator for selecting the degree of signal multiplexing of subcarriers for which the degree of signal multiplexing is set low, but it is also possible to use a parameter other than RSSI, such as delay distribution, for example, as long as that parameter serves as an indicator of channel quality.

According to the above configuration, by adaptively changing the degree of signal multiplexing of subcarriers for which the degree of signal multiplexing is set low according to channel quality, in addition to offering the provisions of Embodiment 1, it is possible to make an improvement in error rate characteristics compatible with an improvement in transmission efficiency to a significantly greater extent, in addition to achieving the effect of Embodiment 1.

(Embodiment 28)

A special feature of an OFDM-CDMA communication apparatus according to Embodiment 28 of the present invention is that, in addition to provision of the configuration according to Embodiment 12, the accuracy of frame synchronization detection is improved by making the degree of multiplexing smaller for a symbol at the start of a frame than for other symbols, for subcarriers for which the degree of signal multiplexing is set low.

As the degree of signal multiplexing increases, the accuracy of frame synchronization detection naturally falls. However, the lower the degree of signal multiplexing is made, the greater is the fall in transmission efficiency. In consideration of this point, in this embodiment the accuracy of frame synchronization detection is improved without greatly decreasing transmission efficiency by reducing the degree of signal multiplexing only at the start of a frame.

Figure 41:
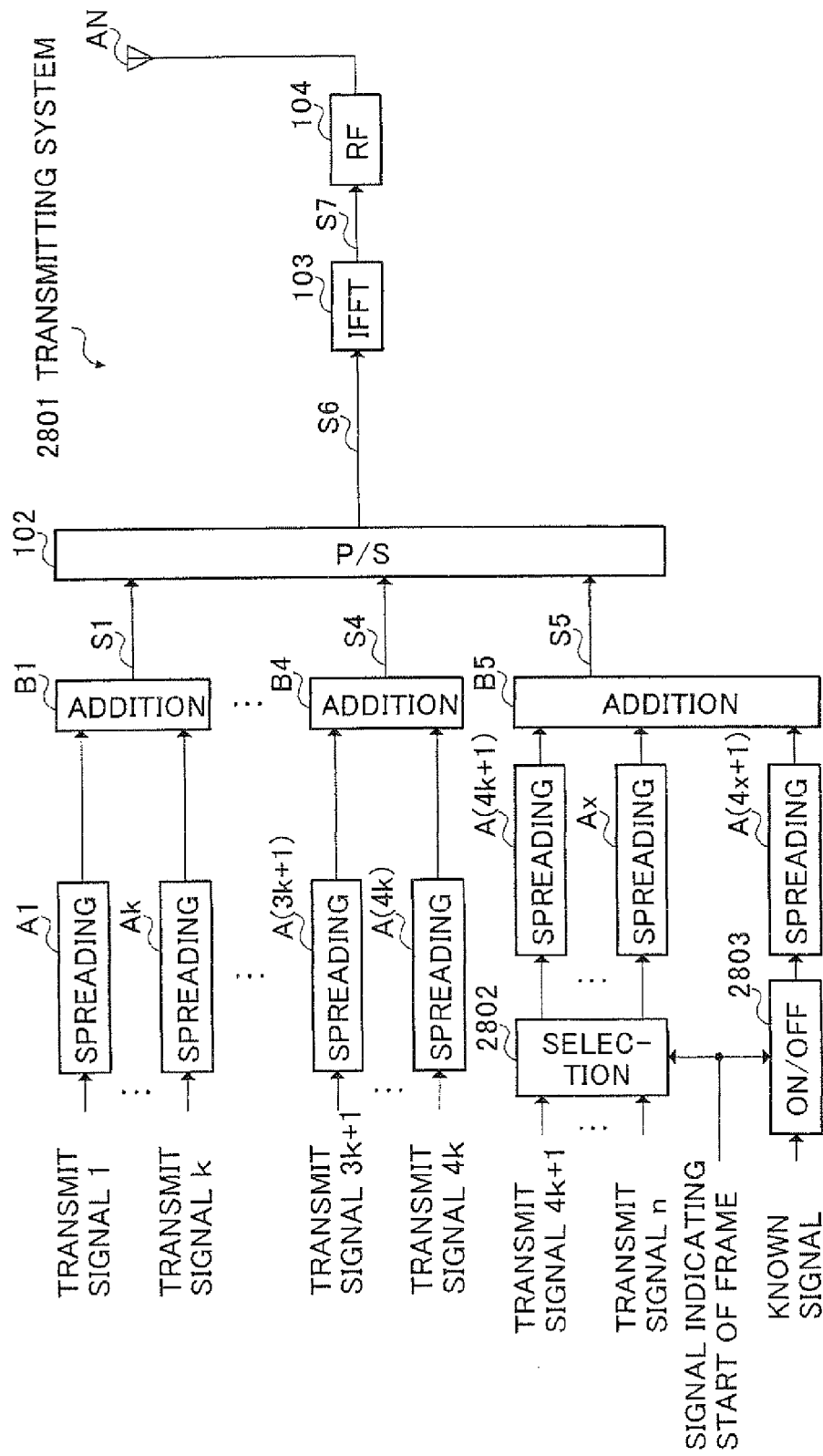
FIG. 41 is a block diagram showing the configuration of the transmitting system of an OFDM-CDMA communication apparatus according to Embodiment 28.

FIG. 41 shows the configuration of an OFDM-CDMA communication apparatus according to this embodiment. In FIG. 41, in which parts corresponding to those in FIG. 6 are assigned the same codes as in FIG. 6, transmitting system 2801 of OFDM-CDMA communication apparatus 2800 has a similar configuration to that of transmitting system 101 in FIG. 6, but differs in that a known signal is input to spreader A(x+1) via an on/off switch (ON/OFF) 2803, and that a selecting section 2802 is provided that selects transmit signals.

On/off switch 2803 outputs a known signal only at the start of a frame. At the start of a frame, selecting section 2802 does not output all the input plurality of transmit signals, but outputs only a predetermined number thereof. It is here assumed that the number of signals multiplexed by adder B5 is smaller than the number of signals multiplexed by other adders B1 through B4, in the same way as in other above-described embodiments.

By this means, in transmitting system 2801, a known signal is transmitted only at the start of a frame by subcarriers for which the degree of signal multiplexing is set low, and also, the degree of signal multiplexing of those subcarriers is significantly reduced at the start of that frame. As a result, frame synchronization can be performed with a high degree of accuracy on the receiving side, where frame synchronization is performed at the timing at which a known signal is detected.

According to the above configuration, by reducing the number of signals multiplexed with a known signal at the start of a frame, in addition to multiplexing signals in which that known signal is spread only at the start of that frame, as described in Embodiment 12, it is possible to improve the accuracy of frame synchronization detection by the receiving side while suppressing a fall in transmission efficiency, in addition to achieving the effect of Embodiment 12.

(Embodiment 29)

A special feature of an OFDM-CDMA communication apparatus according to Embodiment 29 of the present invention is that a user for which there are a large number of retransmissions is allocated preferentially to subcarriers for which the degree of signal multiplexing is set low. By this means, the number of retransmissions can be reduced, making it possible to prevent a drop in throughput and transmission delay time.

As the number of retransmissions increases, the drop in throughput and transmission delay time also increases, and therefore it is necessary to minimize the number of retransmissions. In consideration of this point, in this embodiment a retransmission signal is allocated preferentially to subcarriers with a low degree of signal multiplexing. By this means, retransmission signal quality can be improved, and thus the number of retransmissions can be reduced.

In this embodiment, also, note is taken of the fact that when the number of users is large and there are many retransmission bursts, it is not always possible to allocate a retransmission burst to subcarriers for which the degree of signal multiplexing is set low. Taking such a case into consideration, a user with more retransmissions than other users is allocated preferentially to subcarriers for which the degree of signal multiplexing is set low. By this means, a further increase in the number of retransmissions can be prevented.

Figure 42:
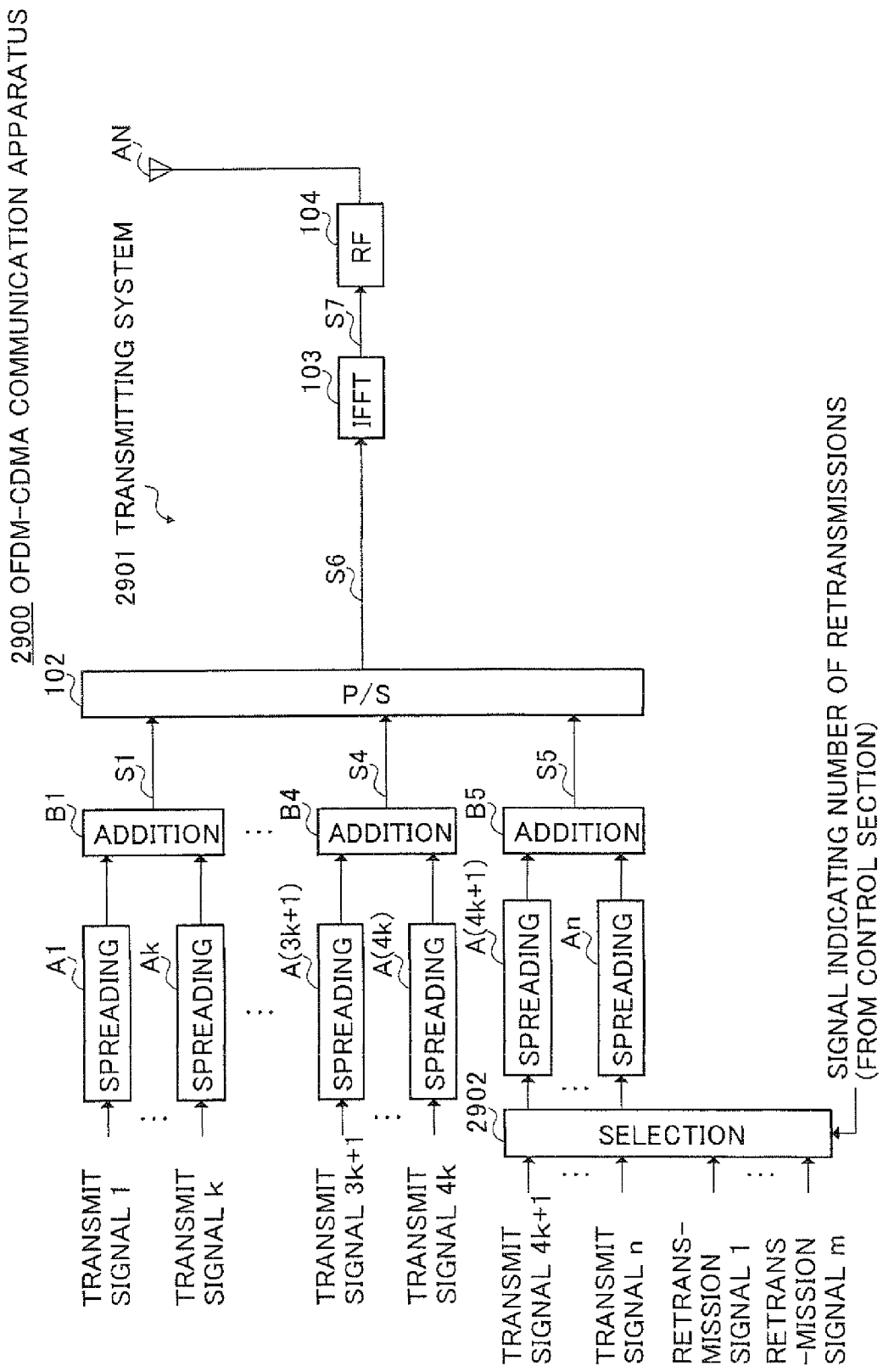
FIG. 42 is a block diagram showing the configuration of the transmitting system of an OFDM-CDMA communication apparatus according to Embodiment 29.

FIG. 42 shows the configuration of an OFDM-CDMA communication apparatus according to this embodiment. In FIG. 42, in which parts corresponding to those in FIG. 6 are assigned the same codes as in FIG. 6, transmitting system 2901 of OFDM-CDMA communication apparatus 2900 has a similar configuration to that of transmitting system 101 in FIG. 6, but differs in that a selecting section 2902 is provided in the processing system that forms code division multiplexed signal S5 with a low degree of signal multiplexing, and retransmission signals 1 through m are input to this selecting section 2902 in addition to transmit signals 4k+1 through n.

Based on a signal indicating the number of retransmissions from a control section (not shown), selecting section 2902 selects from retransmission signals 1 through m a signal for which the number of retransmissions is large (for example, a user performing at least a third retransmission) in preference to transmit signals 4k+1 through n. By this means, a user for which the number of retransmissions is large is allocated preferentially to subcarriers for which the degree of signal multiplexing is set low.

According to the above configuration, by preferentially allocating a user for which there are a large number of retransmissions to subcarriers for which the degree of signal multiplexing is set low, the number of retransmissions can be reduced, and a drop in throughput and transmission delay time can be prevented.

(Embodiment 30)

A special feature of an OFDM-CDMA communication apparatus according to Embodiment 30 of the present invention is that a null signal is transmitted by subcarriers on either side of a subcarrier group for which the degree of multiplexing is set low. By this means, it is possible to prevent degradation of error rate characteristics when the speed of movement is high.

When the speed of movement is high, interference between subcarriers increases. The degree of multiplexing of subcarriers on either side of a subcarrier group for which the degree of multiplexing is set low is set higher than for the aforementioned subcarrier group, and therefore interference between subcarriers increases and there is greater degradation of error rate characteristics. Interference between subcarriers is especially great when the subcarriers on either side of a subcarrier group for which the degree of multiplexing is set low use a modulation method with a high modulation M-ary value, such as 16QAM (Quadrature Amplitude Modulation) or 64QAM.

Figure 43:
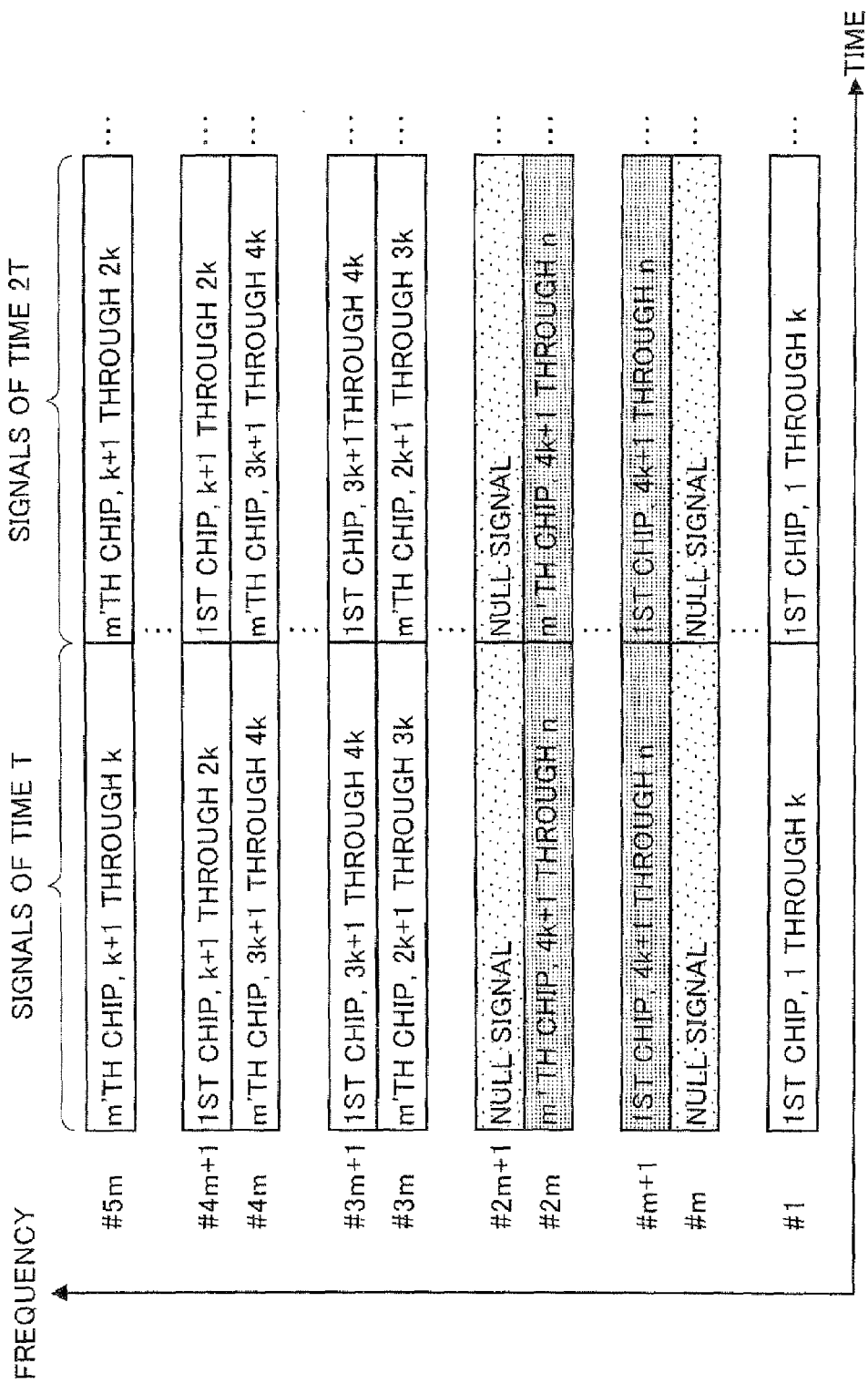
FIG. 43 is a drawing provided in order to explain an OFDM-CDMA signal according to Embodiment 30.

In this embodiment this point is taken into consideration, and by transmitting a null signal in subcarriers #m and #2m+1 on either side of subcarrier group #m+1 through #2m for which the degree of multiplexing is set low, as shown in FIG. 43, reception by subcarrier group #m+1 through #2m for which the degree of multiplexing is set low of interference from adjacent subcarriers #m and #2m+1 is prevented, and degradation of the error rate characteristics of that subcarrier group by which important information is transmitted is also prevented.

Figure 44:
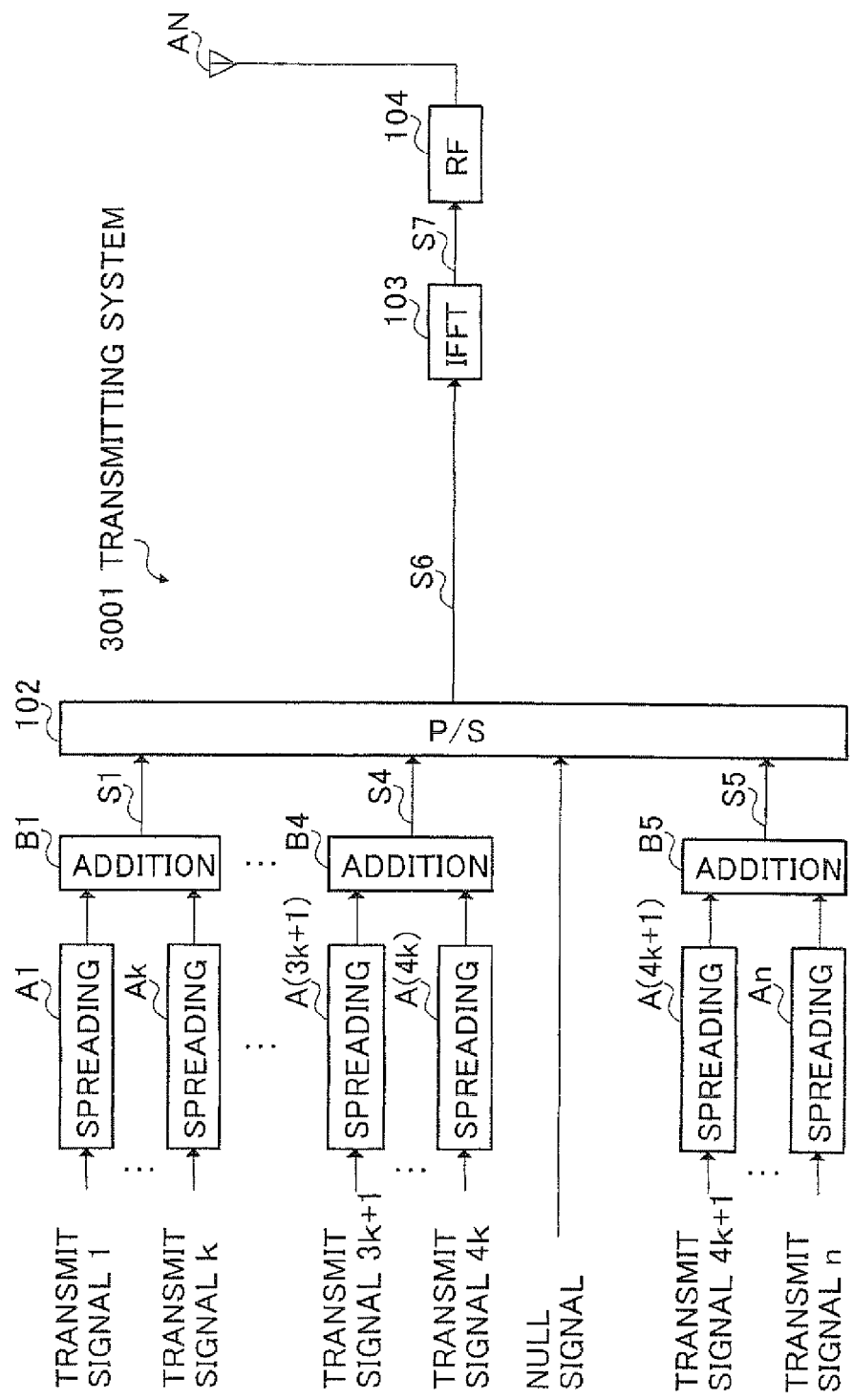
FIG. 44 is a block diagram showing the configuration of the transmitting system of an OFDM-CDMA communication apparatus according to Embodiment 30.

FIG. 44 shows the configuration of an OFDM-CDMA communication apparatus according to this embodiment. In FIG. 44, in which parts corresponding to those in FIG. 6 are assigned the same codes as in FIG. 6, transmitting system 3001 of OFDM-CDMA communication apparatus 3000 has a similar configuration to that of transmitting system 101 in FIG. 6, but differs in that a null signal is input to parallel/serial converter 102.

Parallel/serial converter 102 outputs code division multiplexed signal S5 and null signals in an arrangement whereby a null signal is transmitted by subcarriers on either side of a subcarrier group for which the degree of multiplexing is set low.

According to the above configuration, by transmitting a null signal in subcarriers on either side of a subcarrier group for which the degree of multiplexing is set low, the error rate characteristics of that subcarrier group can be significantly improved.

(Embodiment 31)

A special feature of an OFDM-CDMA communication apparatus according to Embodiment 30 of the present invention is that subcarriers for which the degree of multiplexing is set low are located at intervals of a plurality of subcarriers, and also a null signal is transmitted by subcarriers between subcarriers for which the degree of multiplexing is set low. By this means, it is possible to prevent degradation of error rate characteristics to a greater extent that in Embodiment 30 when the speed of movement is high.

When the speed of movement is extremely high, interference also occurs between subcarriers for which the degree of multiplexing is set low. In consideration of this point, in this embodiment subcarriers for which the degree of multiplexing is set low are located at intervals of a plurality of subcarriers, and a null signal is transmitted by subcarriers between subcarriers for which the degree of multiplexing is set low. By this means, it is possible to decrease interference between subcarriers for which the degree of multiplexing is set low. As a result, in comparison with above-described Embodiment 30, it is possible to further prevent degradation of error rate characteristics when the speed of movement is high.

Figure 45:
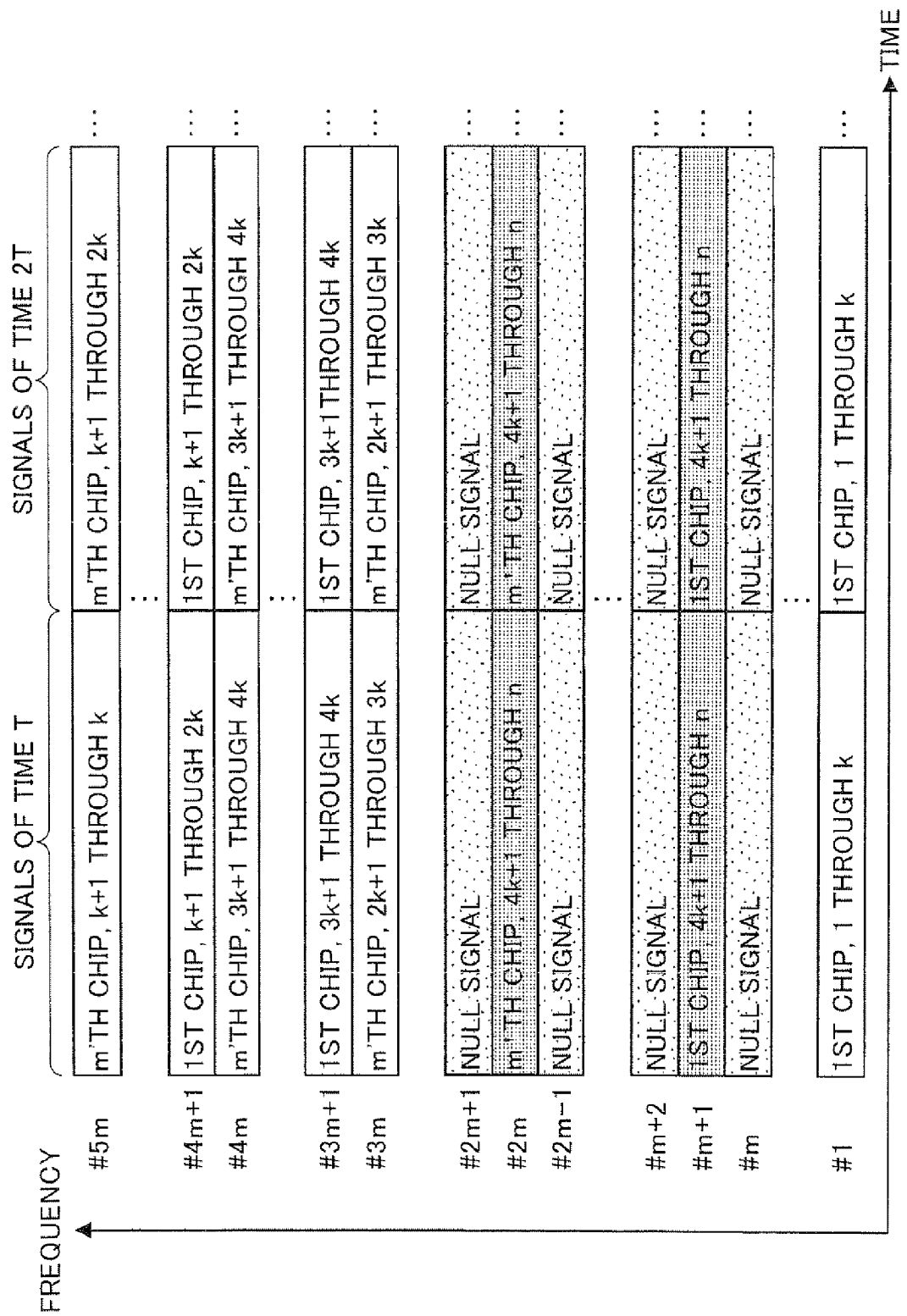
FIG. 45 is a drawing provided in order to explain an OFDM-CDMA signal according to Embodiment 31.

FIG. 45 shows the configuration of an OFDM-CDMA signal according to this embodiment. As shown in FIG. 45, subcarriers #m+1 and #2m for which the degree of multiplexing is set low are arranged non-adjacently, and a null signal is transmitted by subcarriers #m+2, . . . , #2m−1 between these subcarriers #m+1 and #2m.

Figure 46:
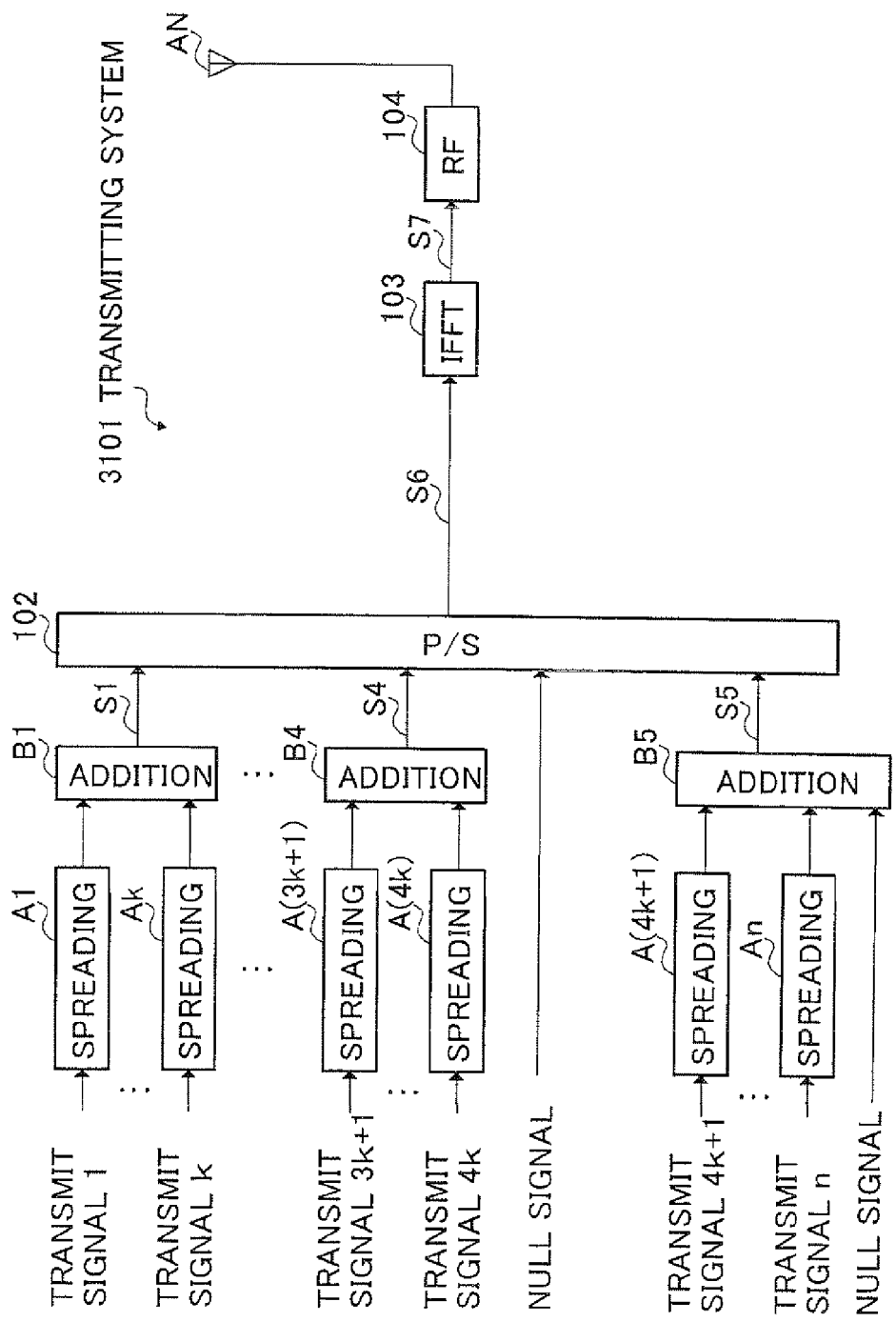
FIG. 46 is a block diagram showing the configuration of the transmitting system of an OFDM-CDMA communication apparatus according to Embodiment 31.

FIG. 46 shows the configuration of an OFDM-CDMA communication apparatus according to this embodiment. In FIG. 46, in which parts corresponding to those in FIG. 44 are assigned the same codes as in FIG. 44, transmitting system 3101 of OFDM-CDMA communication apparatus 3100 has a similar configuration to that of transmitting system 3001 in FIG. 44, but differs in that a null signal is input to adder B5 that forms code division multiplexed signal S5 with a low degree of signal multiplexing.

Adder B5 forms code division multiplexed signal S5 by input signals so that a null signal is input between spread transmit signals $4k+1$, . . . , n. As in Embodiment 30, parallel/serial converter 102 outputs code division multiplexed signal S5 and null signals in an arrangement whereby a null signal is transmitted by subcarriers on either side of a subcarrier for which the degree of multiplexing is set low.

According to the above configuration, by locating subcarriers for which the degree of multiplexing is set low at intervals of a plurality of subcarriers, and also transmitting a null signal by subcarriers between subcarriers for which the degree of multiplexing is set low, it is possible to prevent degradation of error rate characteristics to a significantly greater extent that in Embodiment 30 when the speed of movement is high.

(Embodiment 32)

A special feature of an OFDM-CDMA communication apparatus according to Embodiment 32 of the present invention is that amplitude limiting is performed independently for subcarriers for which the degree of multiplexing is set low and for other subcarriers. For example, amplitude limiting may be performed for subcarriers with a high degree of multiplexing, while amplitude limiting is not performed for subcarriers for which the degree of multiplexing is set low. By this means, it is possible to make an improvement in error rate characteristics compatible with a reduction of peak power for subcarriers for which the degree of multiplexing is set low, to a greater extent than in other embodiments described above.

Peak power is a problem when transmitting an OFDM-CDMA signal. Therefore, processing is generally carried out to reduce peak power by performing amplitude limiting. However, a drawback of amplitude limiting is that it results in degradation of error rate characteristics.

In consideration of this point, in this embodiment the error rate characteristics of subcarriers for which the degree of multiplexing is set low are significantly improved by not performing amplitude limiting on subcarriers for which the degree of multiplexing is set low. Amplitude limiting is performed for other subcarriers.

As the number of subcarriers for which the degree of multiplexing is set low represents a small proportion of the total number of subcarriers, and a low degree of multiplexing implies proportionally low peak power, the effect of reducing peak power is scarcely lessened by not performing amplitude limiting on subcarriers for which the degree of multiplexing is set low.

Thus, by not performing amplitude limiting on subcarriers for which the degree of multiplexing is set low, compatibility between error rate characteristics and peak power reduction for subcarriers for which the degree of multiplexing is set low can be achieved to a significantly greater extent than in other embodiments described above.

Figure 47:
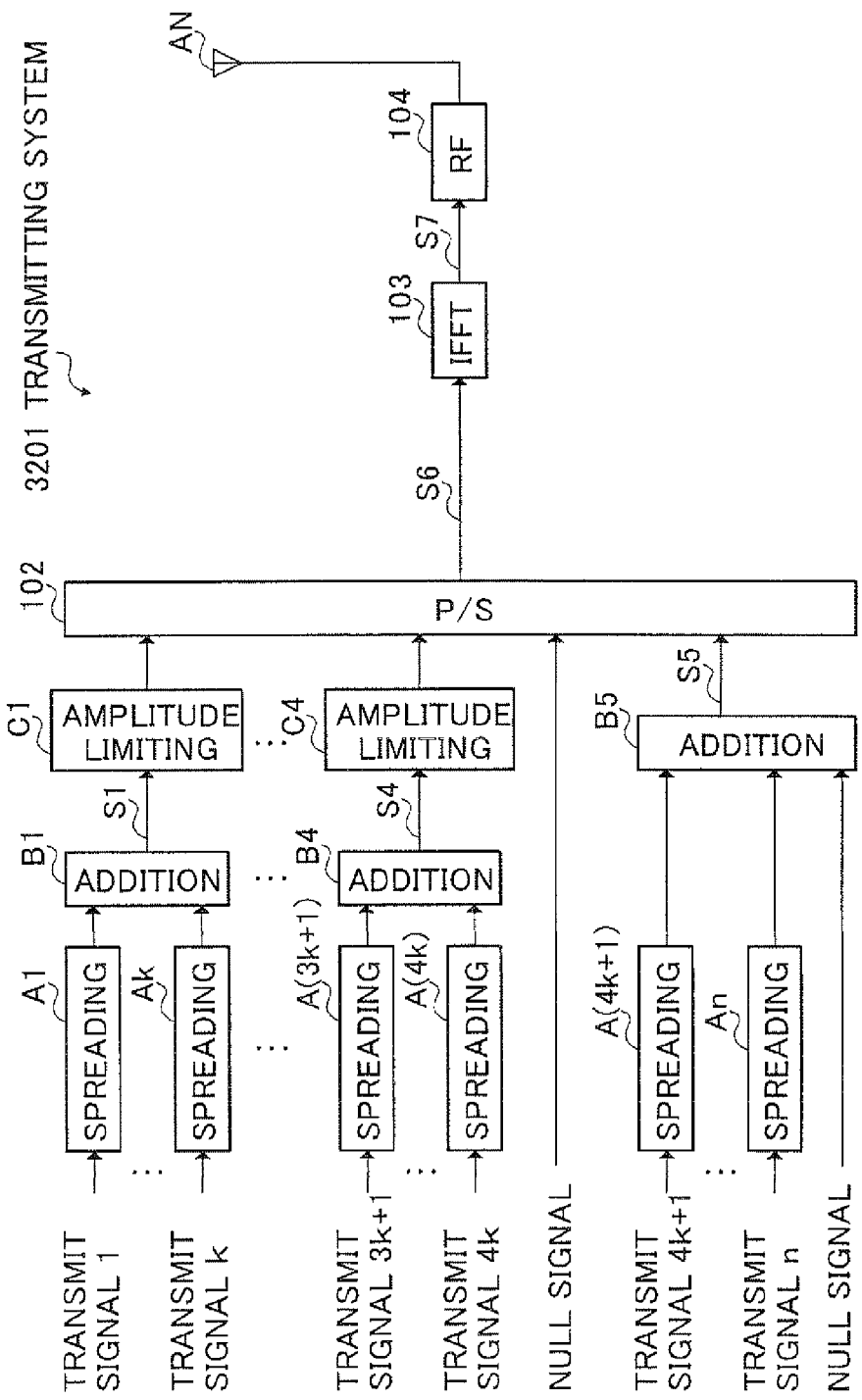
FIG. 47 is a block diagram showing the configuration of the transmitting system of an OFDM-CDMA communication apparatus according to Embodiment 32.

FIG. 47 shows the configuration of an OFDM-CDMA communication apparatus according to this embodiment. In FIG. 47, in which parts corresponding to those in FIG. 46 are assigned the same codes as in FIG. 46, transmitting system 3201 of OFDM-CDMA communication apparatus 3200 has a similar configuration to that of transmitting system 3101 in FIG. 46, but differs in being provided with amplitude limiting sections C1 through C4 that limit the signal amplitude of code division multiplexed signals S1 through S4 with a high degree of signal multiplexing. Amplitude limiting is not performed on code division multiplexed signal S5 with a low degree of signal multiplexing.

In FIG. 47, a case is illustrated in which amplitude limiting is not performed on code division multiplexed signal S5 for which the degree of multiplexing is set low, but the present invention is not limited to this, and virtually the same effect as in the case illustrated in FIG. 47 can be achieved, for example, by making the amplitude limiting for code division multiplexed signal S5 allocated to subcarriers for which the degree of multiplexing is set low less stringent than the amplitude limiting applied to code division multiplexed signals S1 through S4 allocated to subcarriers for which the degree of multiplexing is made high; the essential point being to perform amplitude limiting independently for subcarriers for which the degree of multiplexing is set low and for other subcarriers.

According to the above configuration, by performing amplitude limiting independently for subcarriers for which the degree of multiplexing is set low and for other subcarriers, the adverse effects of peak power are kept to a minimum, and the error rate characteristics of subcarriers for which the degree of multiplexing is set low can be significantly improved.

(Embodiment 33)

A special feature of an OFDM-CDMA communication apparatus according to Embodiment 33 of the present invention is that, in contrast to the above-described embodiments, the number of a preamble for propagation path estimation is set independently for each subcarrier. In the case of this embodiment, a large number of propagation path estimation preamble is inserted for subcarriers for which the degree of multiplexing is set low than for other subcarriers. By this means, the error rate characteristics of transmit signals superimposed on subcarriers for which the degree of multiplexing is set low can be significantly improved.

The more numerous the propagation path estimation preamble inserted, the better are the error rate characteristics. However, as the number of the propagation path estimation preamble inserted increases, transmission efficiency decreases, as correspondingly fewer other signals can be transmitted. In the case of channel conditions in which adequate error rate characteristics can be obtained even if a low propagation path estimation preamble is set, in particular, transmission efficiency will only fall even if a large number of propagation path estimation preamble is set, and the effect will be small.

In consideration of these points, in this embodiment a large number of propagation path estimation preamble is set only for subcarriers for which a low degree of multiplexing is set. As a result, compatibility can be achieved to a significant extent between an improvement in the error rate and transmission efficiency.

Figure 48:
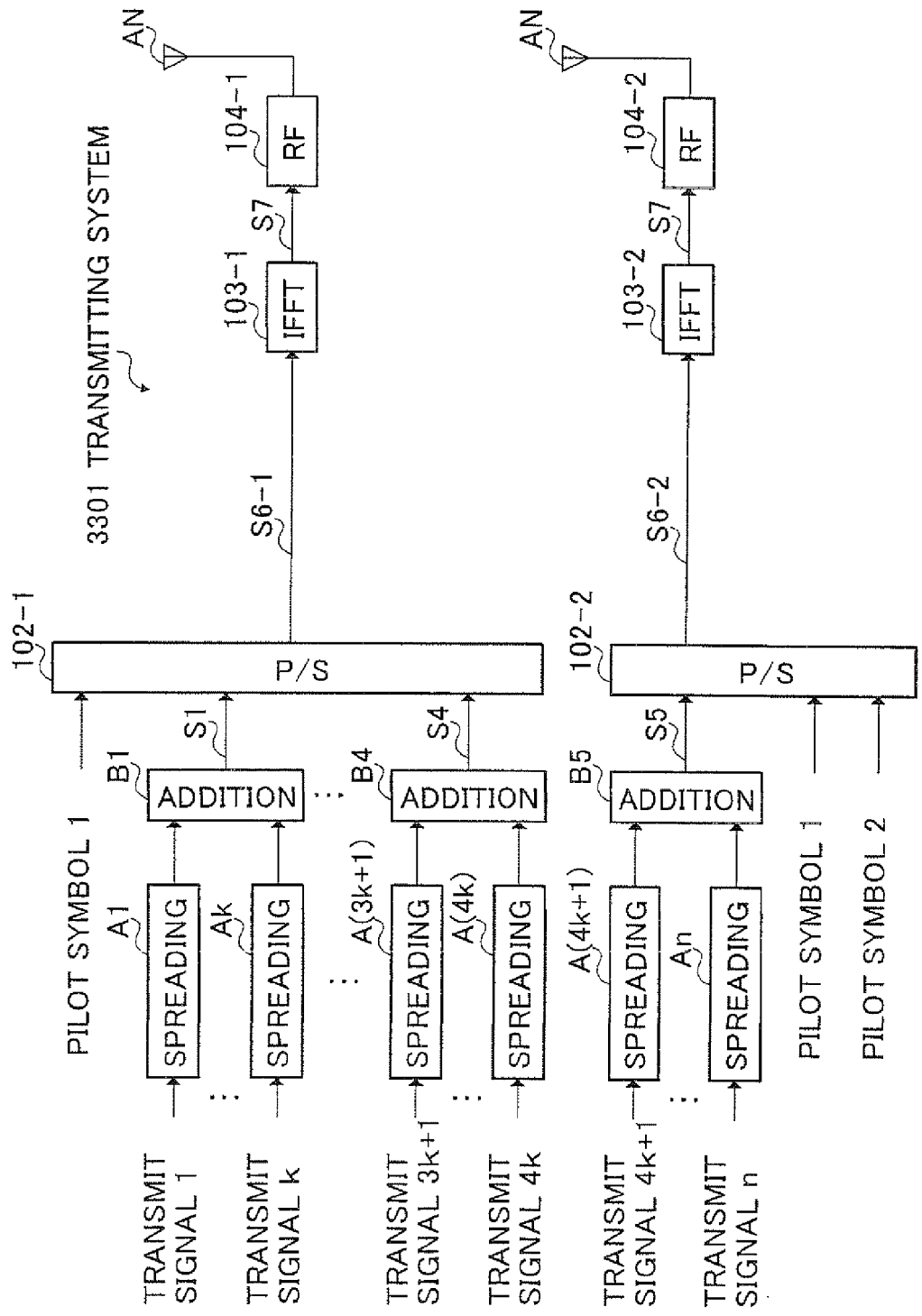
FIG. 48 is a block diagram showing the configuration of the transmitting system of an OFDM-CDMA communication apparatus according to Embodiment 33.

FIG. 48 shows the configuration of an OFDM-CDMA communication apparatus according to this embodiment. In FIG. 48, in which parts corresponding to those in FIG. 39 are assigned the same codes as in FIG. 39, in transmitting system 3301 of OFDM-CDMA communication apparatus 3300 one kind of pilot symbol 1 is input to parallel/serial converter 102-1, into which code division multiplexed signals S1 through S4 with a high degree of signal multiplexing are input. On the other hand, two kinds of pilot symbols 1 and 2 are input to parallel/serial converter 102-2, into which code division multiplexed signal S5 with a low degree of signal multiplexing is input.

Parallel/serial converter 102-1 rearranges code division multiplexed signals S1 through S4 into a predetermined order, inserts pilot symbol 1 at a predetermined position, and outputs serial signal S6-1. Meanwhile, parallel/serial converter 102-2 inserts pilot symbol 1 and pilot symbol 2 at predetermined positions in the code division multiplexed signal, and outputs serial signal S6-2. Serial signals S6-1 and S6-2 are then transmitted from antenna AN1 via IFFT 103-1 and RE 104-1, and from antenna AN2 via IFFT 103-2 and RF 104-2, respectively.

Figure 49:
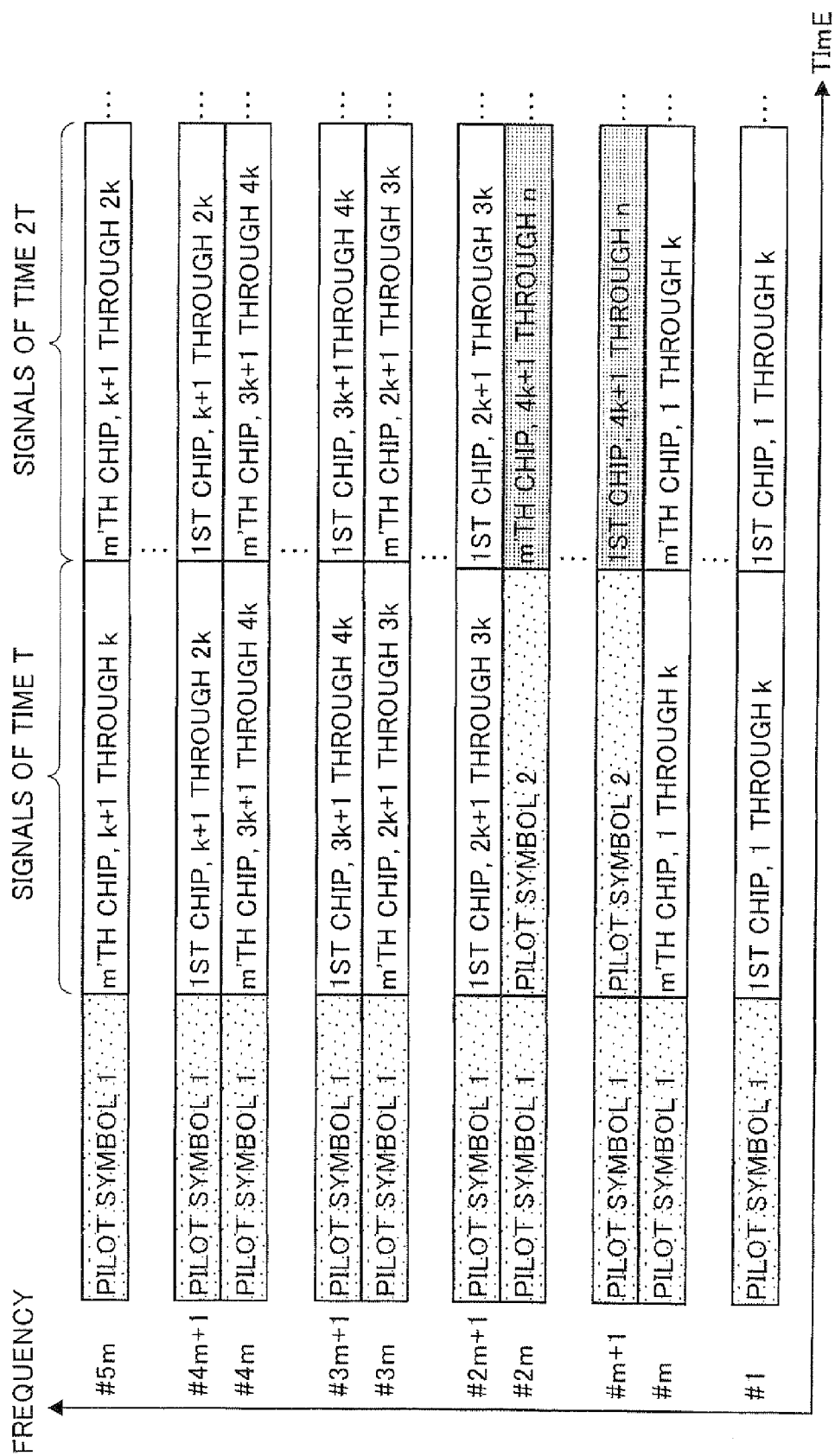
FIG. 49 is a drawing provided in order to explain an OFDM-CDMA signal according to Embodiment 33.

As a result, as shown in FIG. 49, subcarriers #1 through #m, #2m+1 through #3m, #3m+1 through #4m, and #4m+1 through #5m with a high degree of signal multiplexing, in which only pilot symbol 1 is inserted as a propagation path estimation preamble, are transmitted from antenna AN1, while subcarriers #m+1 through #2m with a low degree of signal multiplexing, in which pilot symbol 1 and pilot symbol 2 are inserted as a propagation path estimation preamble, are transmitted from antenna AN2.

In this embodiment, a case has been described in which the number of a propagation path estimation preamble is set as one symbol or two symbols according to the subcarrier, but the present invention is not limited to this, and any number can be set for the propagation path estimation preamble. It is also possible for the number of the propagation path estimation preamble not to be set as a fixed value, but to be varied adaptively according to channel quality, etc.

According to the above configuration, by setting a large number of propagation path estimation preamble for subcarriers for which the degree of multiplexing is set low than for other subcarriers, it is possible to significantly improve the error rate of a signal transmitted by subcarriers for which the degree of multiplexing is set low, while suppressing a drop in transmission efficiency.

(Embodiment 34)

A special feature of an OFDM-CDMA communication apparatus according to Embodiment 34 of the present invention is that a code-divided signal, and that code-divided signal shifted by one or more chips, are multiplexed. This multiplexed signal is then transmitted assigned to a plurality of subcarriers. By this means, error rate characteristics can be improved when subcarriers are subjected to fluctuations independently.

In a multipath environment, each subcarrier is subjected to amplitude fluctuations independently, and therefore amplitude deviation occurs between chips, and orthogonality between spreading codes is disrupted. Thus, depending on the propagation environment, disruption of orthogonality may be severe. For example, disruption of orthogonality will be severe in the event of either +1 code or −1 code bias in subcarriers whose reception level has declined.

Focusing on this points a code division multiplexed signal is multiplexed with a code division multiplexed signal representing the first-mentioned code division multiplexed signal shifted by one or more chips before being transmitted. The receiving side is provided with a first despreading section that despreads the code division multiplexed signal that is not shifted, and a second despreading section that despreads the code division multiplexed signal that is shifted. These two despreading sections can have a configuration whereby a correlator coefficient is shifted by the number of chips by which the spreading code was shifted on the transmitting side.

Since the probability of disruption of orthogonality being severe for both the unshifted code division signal and the shifted code division signal is low, a received signal with good error rate characteristics can be obtained by selecting the despread value of one or other of these code division multiplexed signals.

In this embodiment, a code division multiplexed signal, and that code division multiplexed signal shifted by one or more chips, are multiplexed for subcarriers for which the degree of signal multiplexing is set lower than for other subcarriers. By this means, the error rate characteristics of subcarriers for which the degree of multiplexing is set low can be significantly improved.

Figure 50:
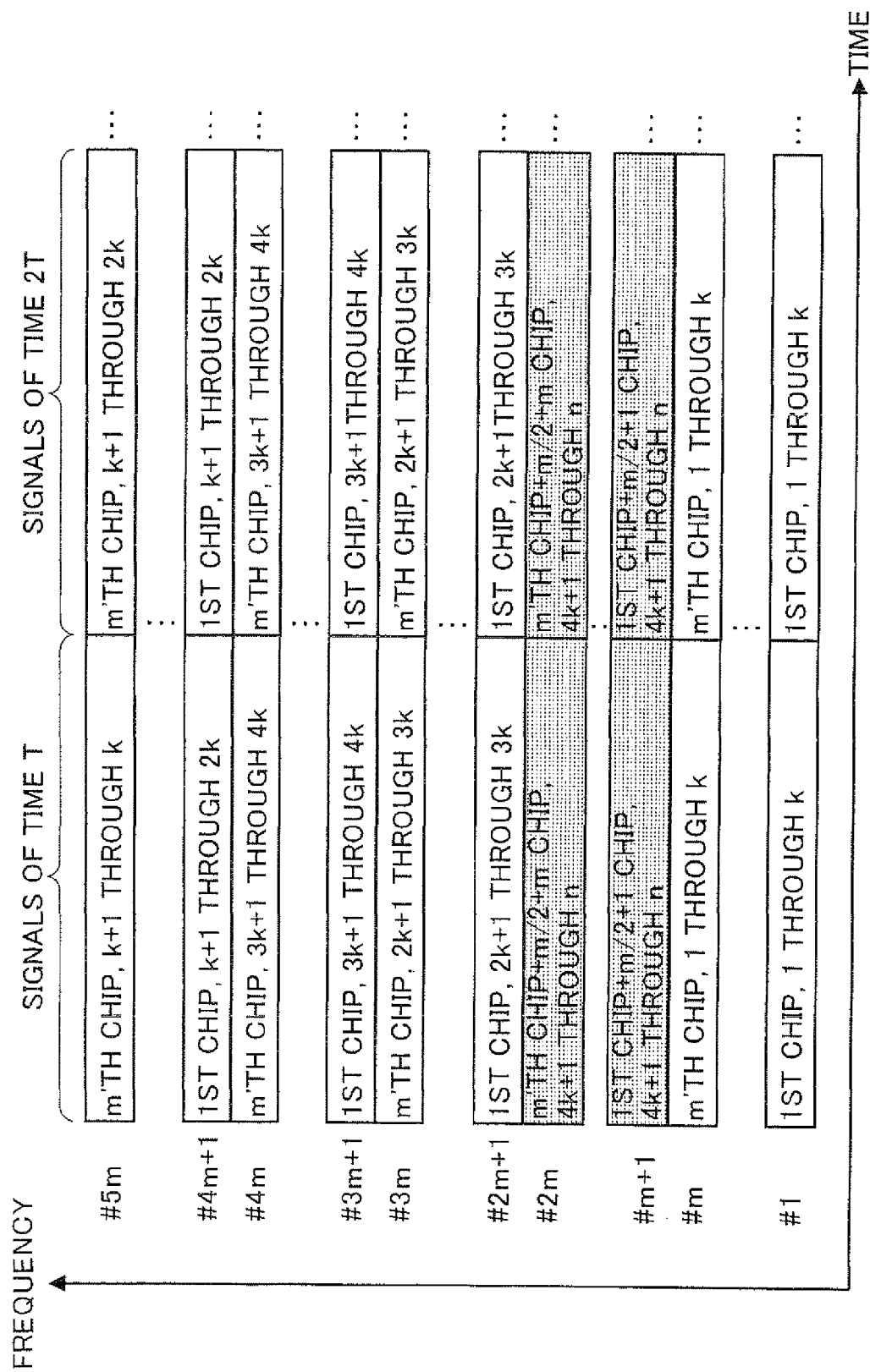
FIG. 50 is a drawing provided in order to explain an OFDM-CDMA signal according to Embodiment 34.

FIG. 50 shows an example in which a code division multiplexed signal, and that code division multiplexed signal shifted by (subcarrier/2) chips, are multiplexed in subcarriers #m+1 through #2m for which the degree of signal multiplexing is set lower than for other subcarriers. As can be seen from FIG. 50, in the (m+1)'th subcarrier, for example, the first chip of plurality of transmit signals 4k+1 through n in time T is code division multiplexed, and a code division multiplexed signal representing the first chip of plurality of transmit signals 4k+1 through n in time T shifted by m/2 chips is multiplexed. Similarly, in the 2m'th subcarrier, the m'th chip of plurality of transmit signals 4k+1 through n in time T is code division multiplexed, and a code division multiplexed signal representing the m'th chip of plurality of transmit signals 4k+1 through n in time T shifted by m/2 chips is multiplexed.

Figure 51:
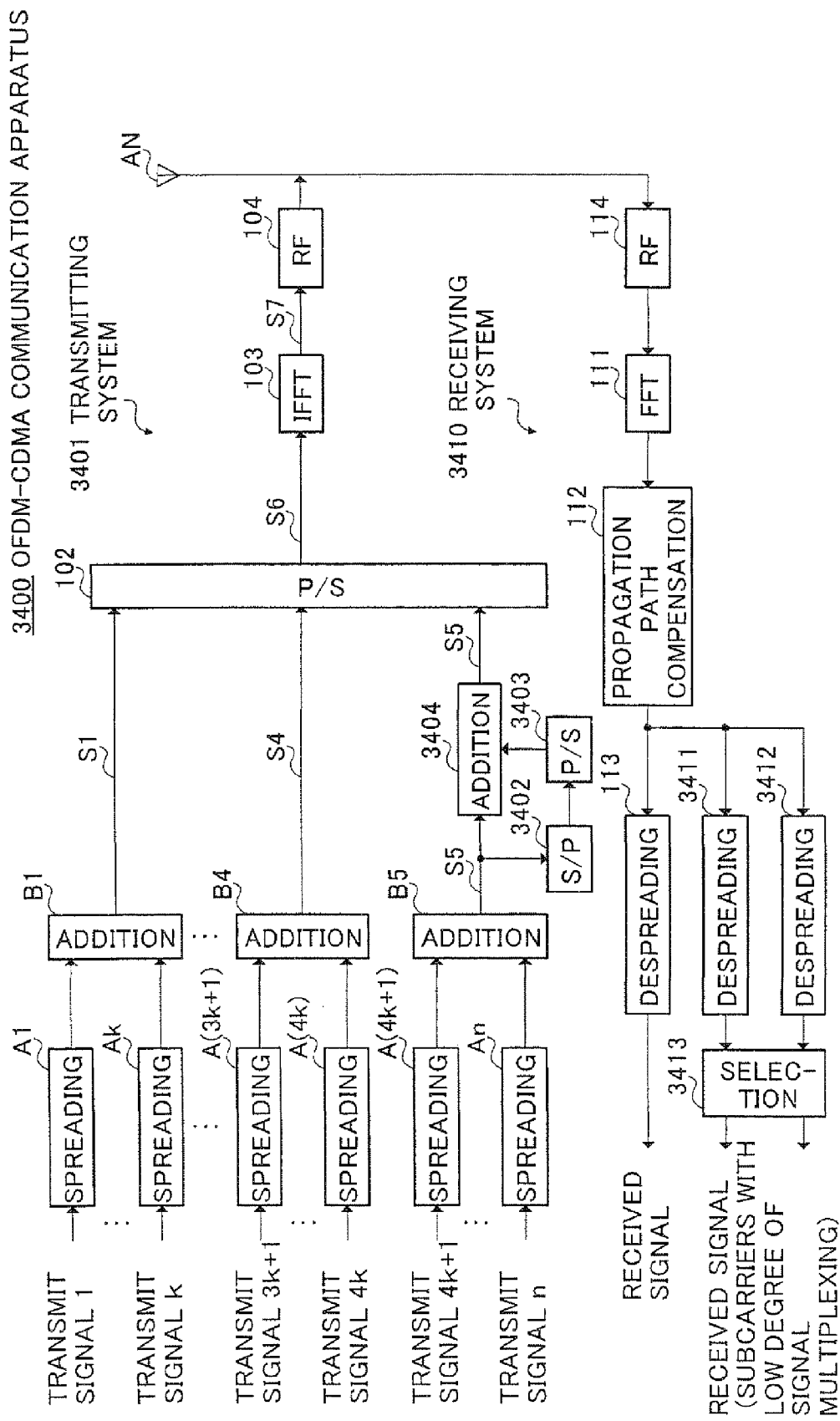
FIG. 51 is a block diagram showing the configuration of an OFDM-CDMA communication apparatus according to Embodiment 34.

FIG. 51 shows the configuration of an OFDM-CDMA communication apparatus according to this embodiment. In FIG. 51, in which parts corresponding to those in FIG. 6 are assigned the same codes as in FIG. 6, transmitting system 3401 of OFDM-CDMA communication apparatus 3400 is provided with a serial/parallel converter (S/P) 3402 and parallel/serial converter (P/S) 3403 as an example of a section for shifting code division multiplexed signal S5 with a low degree of signal multiplexing by one or more chips. Transmitting system 3401 is also provided with an adder 3405 as a multiplexing section that multiplexes original code division multiplexed signal S5 with the code division multiplexed signal shifted by one or more chips.

Code division multiplexed signal S5 is converted to parallel form by serial/parallel converter 3402, and the spread signal is shifted by (subcarrier/2) chips by means of signal rearrangement performed by parallel/serial converter 3403.

Next, receiving system 3410 of OFDM-CDMA communication apparatus 3400 will be described. In OFDM-CDMA communication apparatus 3400, an OFDM-CDMA signal transmitted from an OFDM-CDMA communication apparatus with a similar configuration is input to fast Fourier transform circuit (FFT) 111 via antenna AN and radio receiving section (RF) 114 that performs radio reception processing such as analog/digital conversion. FFT 111 executes fast Fourier transform processing on the input signal. By this means, a code division multiplexed signal superimposed on a plurality of subcarriers is obtained.

Propagation path compensation circuit 112 compensates for phase fluctuations, etc., occurring in the propagation path, based on a known signal such as a propagation path estimation preamble included in the signal. After propagation path compensation, the signal is despread by despreader 113, and the received signal for that station is extracted from the plurality of transmit signals.

Receiving system 3410 is also provided with a first despreading section 3411 that despreads the code division multiplexed signal from the signal in which a code division multiplexed signal, and that code division multiplexed signal shifted by one or more chips, are multiplexed, and obtains a received signal, and a second despreading section 3412 that despreads the signal shifted by one or more chips, and obtains a received signal.

That is to say, first despreading section 3411 performs despreading processing using the same spreading code as spreading sections A(4k+1) . . . An of transmitting system 3401, while second despreading section 3412 performs despreading processing using a spreading code shifted by (subcarrier/2) with respect to spreading sections A(4k+1) . . . An.

Of the two despreading results, selecting section 3413 selects and outputs the one with the larger correlation level. By this means, the code division multiplexed signal with the lesser disruption of orthogonality can be extracted selectively. The selection method is not limited to correlation level, and selection based on the well-known phase likelihood technique or the like may also be used, for example.

According to the above configuration, error rate characteristics can be improved when subcarriers are subjected to fluctuations independently, by multiplexing a code division multiplexed signal, and that code division multiplexed signal shifted by one or more chips, and transmitting this multiplexed code-division signal assigned to a plurality of subcarriers.

In this embodiment, a case has been described in which a code-divided signal, and that code-divided signal shifted by one or more chips, are multiplexed in subcarriers for which the degree of signal multiplexing is set lower than for other subcarriers, but the present invention is not limited to this. For example, the error rate of subcarriers with poor channel quality can be improved by multiplexing a code-divided signal, and that code-divided signal shifted by one or more chips, in subcarriers with poor channel quality. Moreover, it is also possible to multiplex a code-divided signal, and that code division multiplexed signal shifted by one or more chips, in all subcarriers, and perform multicarrier transmission.

Also, in this embodiment a case has been described in which shifting by (subcarrier/2) chips is performed, but this is not a limitation, and a shift of any number of chips may be set. Moreover, the degree of multiplexing is not limited to two signals, and any degree of multiplexing may be set. For example, it is possible to multiplex a code-division signal that is not shifted, the code-division signal shifted by (subcarrier/3) chips, and the code-division signal shifted by 2×(subcarrier/3) chips.

(Embodiment 35)

A special feature of an OFDM-CDMA communication apparatus according to Embodiment 35 of the present invention is that the processing that multiplexes a code-division signal shifted by one or more chips in Embodiment 34 is performed only for a specific transmit signal. By this means, error rate characteristics can be improved when the degree of signal multiplexing is comparatively high.

Here, a spreading code and a signal with that spreading code shifted are not necessarily in an orthogonal relationship (having a mutual correlation of 0). Therefore, as the degree of signal multiplexing increases, when code division signals shifted by one or more chips are multiplexed, it may happen that the interference component increases and, conversely, error rate characteristics degrade.

In consideration of this point, in this embodiment multiplexing of a code division signal shifted by one or more chips is restricted to a transmit signal to a specific user. A user far from a base station, or a user with a low reception level, for example, may be selected as this specific user. By this means, it is possible to improve the error rate characteristics of a transmit signal to a specific user without degrading error rate characteristics when transmit signals are viewed as a whole.

Figure 52:
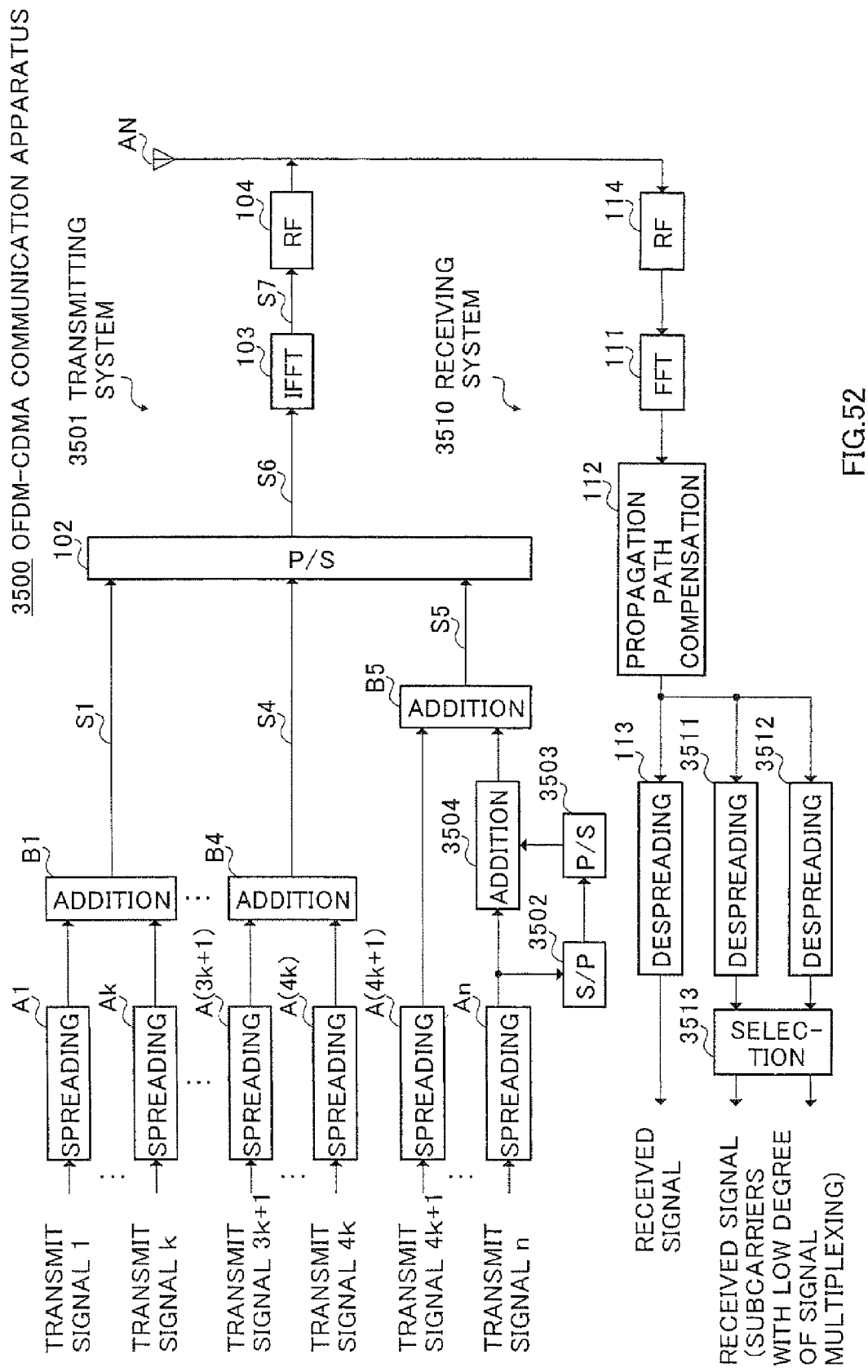
FIG. 52 is a block diagram showing the configuration of an OFDM-CDMA communication apparatus according to Embodiment 35.

FIG. 52 shows the configuration of an OFDM-CDMA communication apparatus according to this embodiment. In transmitting system 3501 of OFDM-CDMA communication apparatus 3500, a code division signal is shifted by one or more chips by serial/parallel converter (S/P) 3502 and parallel/serial converter (P/S) 3503 for transmit signal n only, and the pre-shift code division signal and post-shift code division signal are multiplexed by adder 3504.

Receiving system 3510 is also provided with a first despreading section 3511 that despreads the code-divided signal from the signal in which a code-divided signal, and that code-divided signal shifted by one or more chips, are multiplexed, and obtains a received signal, and a second despreading section 3512 that despreads the signal shifted by one or more chips, and obtains a received signal.

That is to say, first despreading section 3511 performs despreading processing using the same spreading code as spreading section An of transmitting system 3501, while second despreading section 3512 performs despreading processing using a spreading code shifted by a predetermined number of chips (for example, subcarrier/2) with respect to spreading section An.

Of the two despreading results, selecting section 3513 selects the one with the larger correlation level. By this means, the code division multiplexed signal with the lesser disruption of orthogonality can be extracted selectively. The selection method is not limited to correlation level, and selection based on the well-known phase likelihood technique or the like may also be used, for example.

According to the above configuration, by performing processing that multiplexes a code-division signal shifted by one or more chips only for a specific transmit signal, it is possible to improve the error rate characteristics of a specific transmit signal while suppressing degradation of error rate characteristics when transmit signals are viewed as a whole.

In this embodiment, a case has been described in which processing that multiplexes a code-division signal shifted by one or more chips is performed only for one specific transmit signal n, but this is not a limitation, and any setting may be made. It is also possible to set a higher degree of multiplexing for a code division signal shifted by one or more chips for a specific transmit signal than for other transmit signals. For example, it is possible to multiplex four code division signals with different numbers of shift chips for a specific transmit signal, and to multiplex two code division signals with different numbers of shift chips for other transmit signals.

(Embodiment 36)

A special feature of an OFDM-CDMA communication apparatus according to Embodiment 36 of the present invention is that a received signal is obtained by combining a signal in which a code division multiplexed signal is despread, and a signal in which a code division multiplexed signal shifted by one or more chips is despread, in reception in Embodiments 34 and 35. By this means, error rate characteristics can be improved to a greater extent than in Embodiments 34 and 35.

That is to say, in Embodiments 34 and 35 a case has been described in which selection diversity is obtained by providing a selecting section 3413 (FIG. 51) or selecting section 3513 (FIG. 52) in the receiving system, but in this embodiment, a received signal is obtained by performing combining diversity. By this means, a received signal with improved error rate characteristics can be obtained, since combining diversity offers a 1 dB to 1.5 dB error rate characteristics improvement compared with selection diversity.

Figure 53:
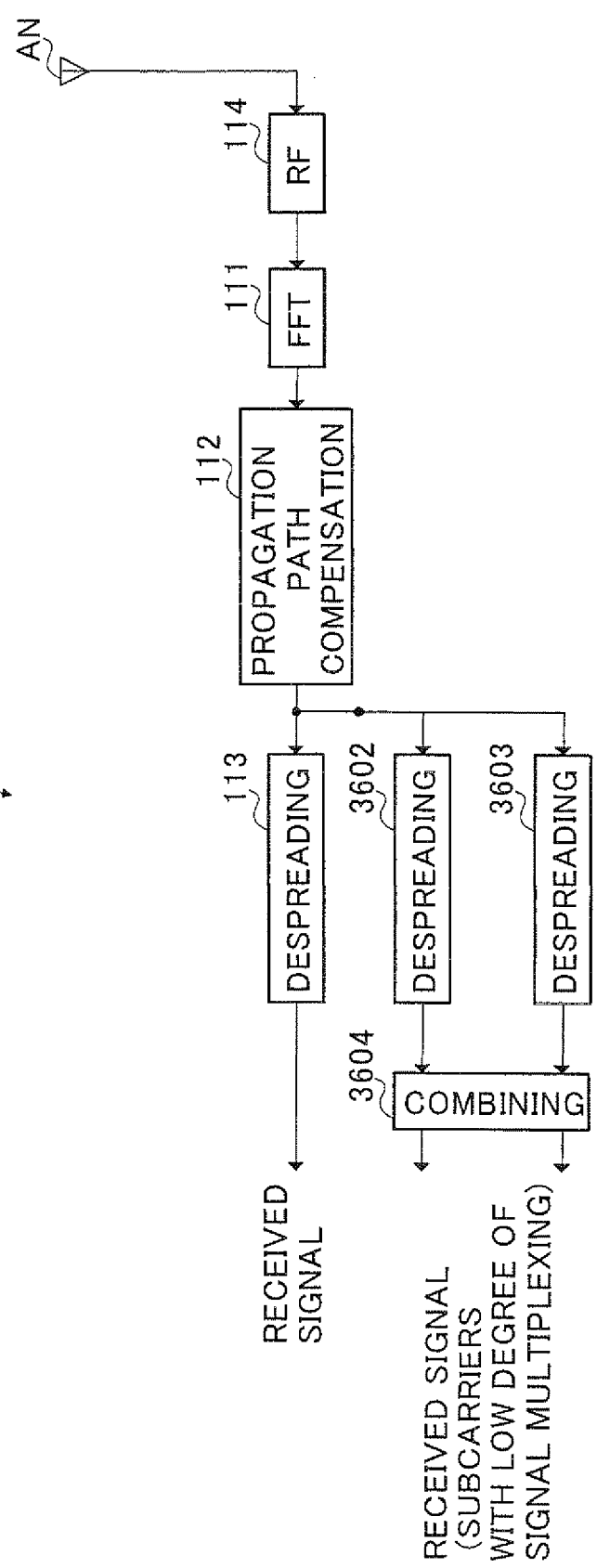
FIG. 53 is a block diagram showing the configuration of the receiving system of an OFDM-CDMA communication apparatus according to Embodiment 36.

FIG. 53 shows the configuration of the receiving system of an OFDM-CDMA communication apparatus according to this embodiment. In FIG. 53, in which parts corresponding to those in FIG. 52 are assigned the same codes as in FIG. 52, receiving system 3601 of OFDM-CDMA communication apparatus 3600 is provided with a first despreading section 3602 that despreads a code division multiplexed signal and obtains a received signal, and a second despreading section 3603 that despreads a signal shifted by one or more chips and obtains a received signal.

In addition, receiving system 3601 is provided with a combining section 3604 that combines correlation output from the two despreading sections 3602 and 3603. Any combining method, such as equal-gain combining or maximal-ratio combining, can be used by combining section 3604.

According to the above configuration, by combining a signal in which a code division multiplexed signal is despread and a signal in which a code division multiplexed signal shifted by one or more chips is despread, it is possible to obtain a received signal that has better error rate characteristics than in Embodiments 34 and 35.

(Embodiment 37)

A special feature of an OFDM-CDMA communication apparatus according to Embodiment 37 of the present invention is that a code division signal shifted by one or more chips and the original code division signal are multiplexed only for a known signal. By this means, it is possible to improve the error rate characteristics of a known signal without degrading the error rate characteristics of other transmit signals code division multiplexed with the known signal. The known signal may be used for cell identification as described in Embodiment 9, for example, or for propagation path estimation, or for various other purposes. In this embodiment, by performing multiplexing of a code division signal shifted by one or more chips with the original code division signal for a known signal used for various purposes in this way, it is possible to improve the error rate characteristics of the known signal, and to improve cell identification accuracy and received signal quality.

Here, as also explained in Embodiment 35, a spreading code and a signal with that spreading code shifted are not necessarily in an orthogonal relationship (having a mutual correlation of 0). Therefore, as the degree of signal multiplexing increases, when code division signals shifted by one or more chips are multiplexed, it may happen that the interference component increases and, conversely, error rate characteristics degrade.

In consideration of this point, in this embodiment multiplexing of a code division signal shifted by one or more chips is restricted to a known signal (this processing is not performed on transmit signals $4k+1 \ldots n$). By this means, it is possible to improve the error rate characteristics of a known signal without degrading error rate characteristics when transmit signals are viewed as a whole. As a result, when, for example, a known signal is used for cell identification, the accuracy of cell identification can be improved.

Figure 54:
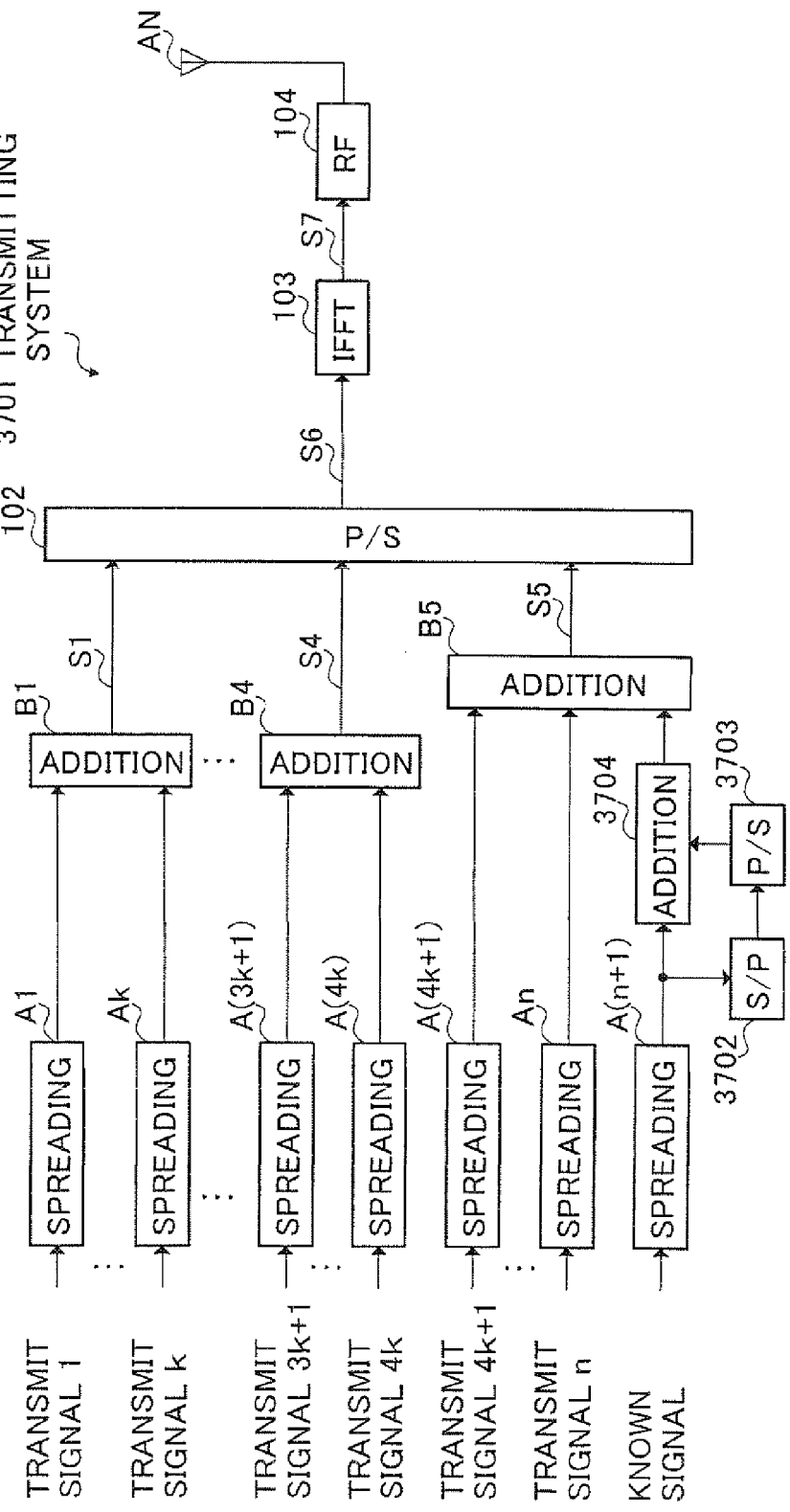
FIG. 54 is a block diagram showing the configuration of the transmitting system of an OFDM-CDMA communication apparatus according to Embodiment 37.

FIG. 54 shows the configuration of the transmitting system of an OFDM-CDMA communication apparatus according to this embodiment. In FIG. 54, in which parts corresponding to those in FIG. 52 are assigned the same codes as in FIG. 52, in transmitting system 3701 of OFDM-CDMA communication apparatus 3700, a code division signal is shifted by one or more chips by serial/parallel converter (S/P) 3702 and parallel/serial converter (P/S) 3703 for a known signal only, and the pre-shift code division signal and post-shift code division signal are multiplexed by adder 3704.

According to the above configuration, by multiplexing a code division signal shifted by one or more chips and the original code division signal only for a known signal, it is possible to improve the error rate characteristics of a known signal without degrading the error rate characteristics of other transmit signals $4k+1 \ldots n$ code division multiplexed with the known signal.

In this embodiment, a case has been described in which a code division signal shifted by one or more chips and the original code division signal are multiplexed only for a known signal, but it is also possible to set a higher degree of multiplexing for a code division signal shifted by one or more chips than for other transmit signals $4k+1 \ldots n$ for a known signal. For example, it is possible to multiplex four code division signals with different numbers of shift chips for a known signal, and to multiplex two code division signals with different numbers of shift chips for other transmit signals $4k+1 \ldots n$.

(Embodiment 38)

A special feature of an OFDM-CDMA communication apparatus according to Embodiment 38 of the present invention is that a code division signal shifted by one or more chips and the original code division signal are multiplexed only at the start of a frame. By this means, it is possible for frame synchronization detection processing to be performed on the receiving side without increasing the number of spreading codes or increasing the number of known signals.

As the number of spreading codes is limited, the kinds of known signals to be inserted must be minimized. In consideration of this point, in this embodiment a code division signal shifted by one or more chips and the original code division signal are multiplexed only at the start of a frame. This enables frame synchronization detection to be performed on the receiving side based on the number of correlation peaks.

Specifically, as a code division signal shifted by one or more chips and the original code division signal are multiplexed only at the start of a frame, a plurality of peaks appear only at the start of a frame in a signal that has undergone despreading. Frame synchronization detection can be performed on the receiving side by detecting the timing at which this plurality of peaks appears.

Figure 55:
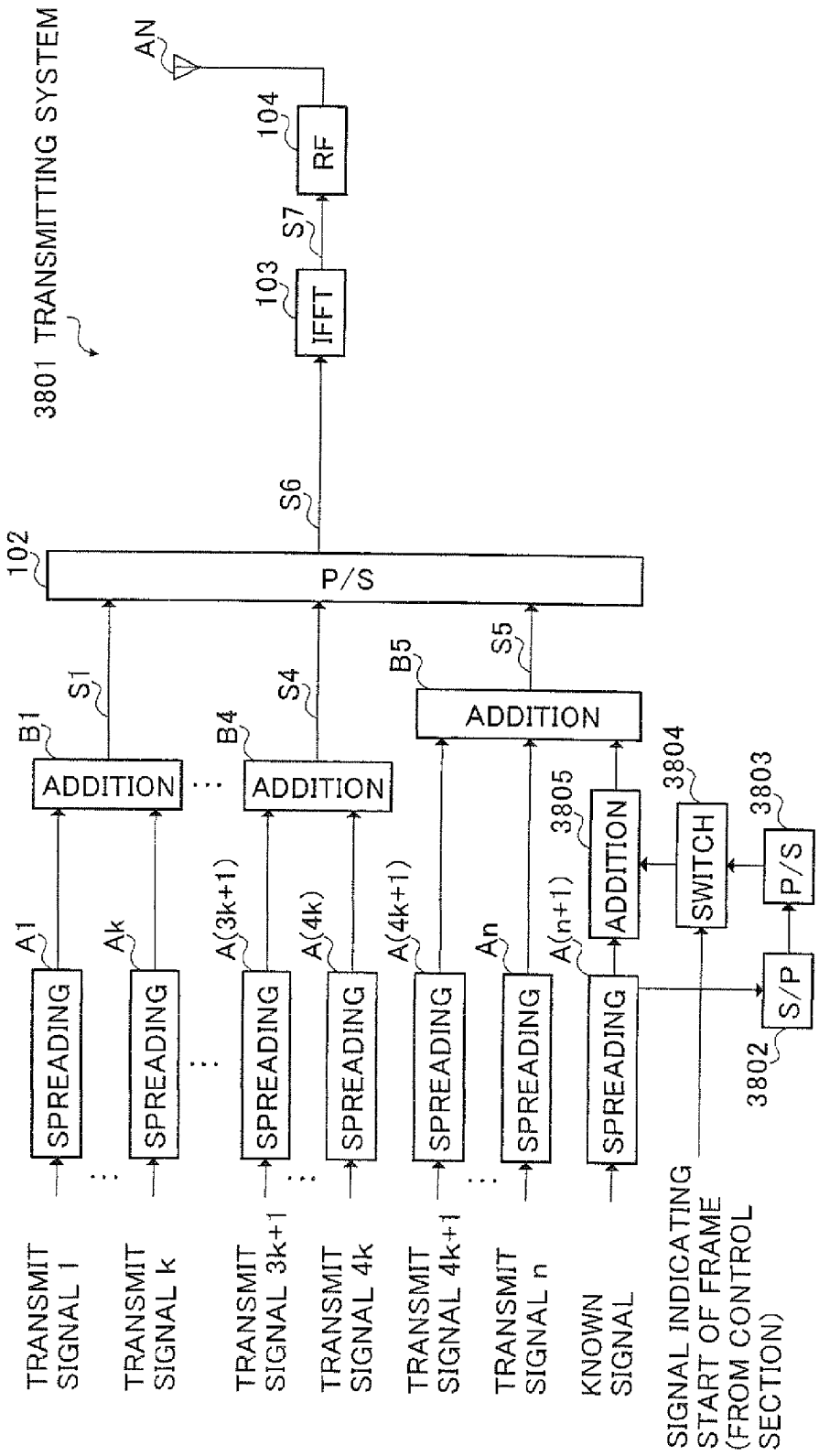
FIG. 55 is a block diagram showing the configuration of the transmitting system of an OFDM-CDMA communication apparatus according to Embodiment 38.

FIG. 55 shows the configuration of the transmitting system of an OFDM-CDMA communication apparatus according to this embodiment. In FIG. 55, in which parts corresponding to those in FIG. 54 are assigned the same codes as in FIG. 54, in transmitting system 3801 of OFDM-CDMA communication apparatus 3800 according to this embodiment, a known signal code division signal is shifted by one or more chips by serial/parallel converter (S/P) 3802 and parallel/serial converter (P/S) 3803, and this is supplied via switch 3804 to adder 3805 only at the start of a frame. By this means, a signal is obtained in which a code division signal shifted by one or more chips and the original code division signal are multiplexed only at the start of a frame.

(Embodiment 39)

A special feature of an OFDM-CDMA communication apparatus according to Embodiment 39 of the present invention is that, in addition to multiplexing a code-divided signal and that code-divided signal shifted by one or more chips, and transmitting this code division multiplexed signal assigned to a plurality of subcarriers, the number of chips by which the signal is shifted is made variable. By this means, it is possible to prevent burst errors in addition to achieving the effect of Embodiment 34.

Here, a case will be considered in which processing that multiplexes a code division signal shifted by one or more chips is performed only for a specific transmit signal (hereinafter referred to as "user"), as described in Embodiment 35. In a multipath environment, there are users for which disruption of orthogonality between spreading codes is severe. There are also users for which severe disruption of orthogonality between spreading codes continues for a long period when the fluctuation speed of the propagation environment is slow, and errors may occur continuously (generally referred to "burst errors") for such users.

In consideration of this point, in this embodiment the number of chips by which a signal is shifted is changed for every symbol transmitted, for example. By this means, it is possible to prevent the occurrence of users for which severe disruption of orthogonality between spreading codes continues for a long period. As a result, the possibility of burst errors occurring can be greatly reduced.

Figure 56:
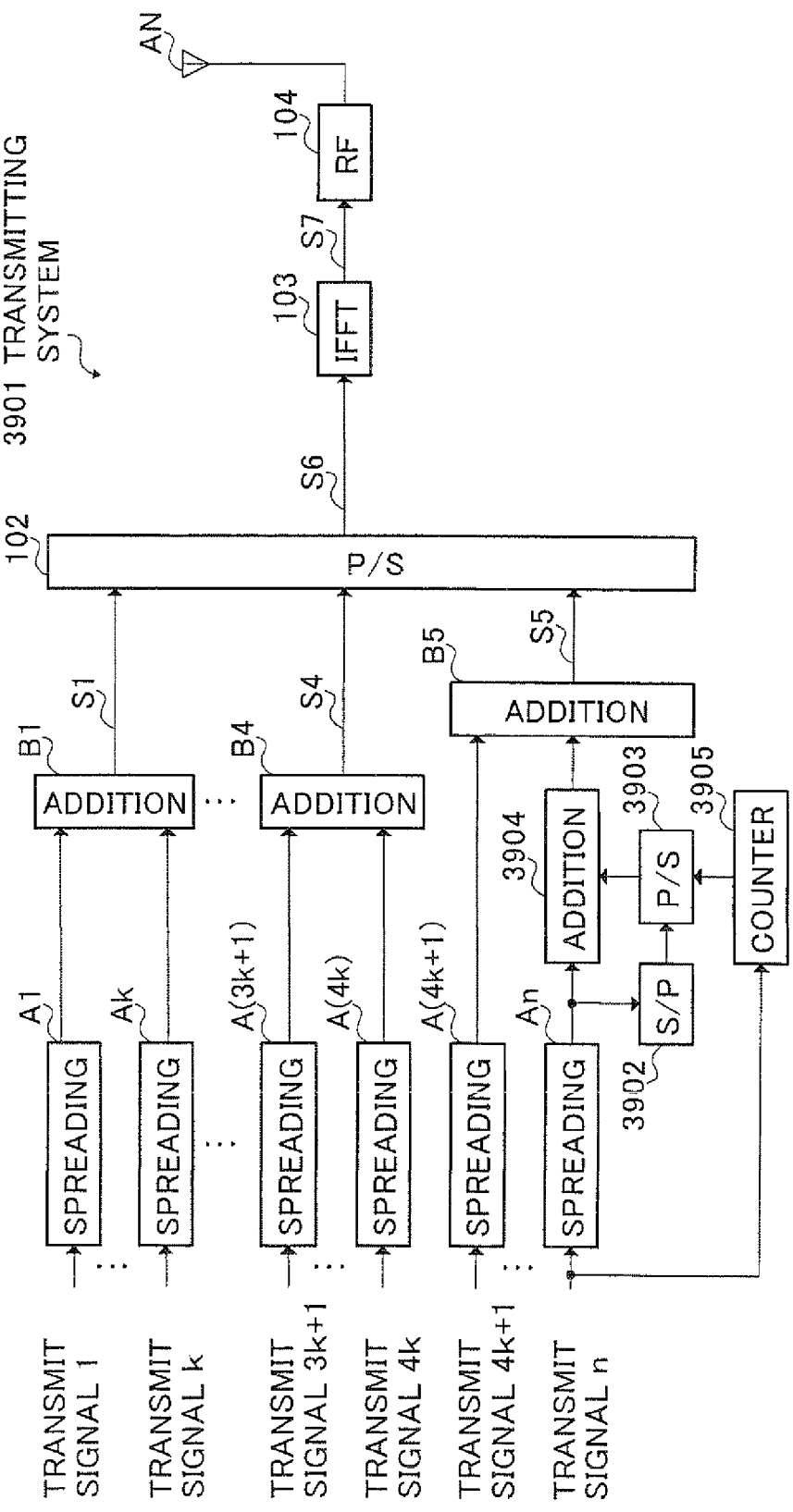
FIG. 56 is a block diagram showing the configuration of the transmitting system of an OFDM-CDMA communication apparatus according to Embodiment 39.

FIG. 56 shows the configuration of the transmitting system of an OFDM-CDMA communication apparatus according to this embodiment. In FIG. 56, in which parts corresponding to those in FIG. 52 are assigned the same codes as in FIG. 52, in transmitting system 3901 of OFDM-CDMA communication apparatus 3900, a transmit signal n code division signal is shifted by one or more chips by serial/parallel converter (S/P) 3902 and parallel/serial converter (P/S) 3903, and the pre-shift code division signal and post-shift code division signal are multiplexed by adder 3904.

In addition, transmitting system 3901 is provided with a counter 3905 that counts the number of symbols of transmit signal n, and parallel/serial converter 3903 shifts the spread signal in accordance with the count value of counter 3905 by performing signal rearrangement in accordance with that count value. If, for example, a counter is used that counts up to four symbols, and is reset when the number of symbols reaches 5, four kinds of shift amounts can be set.

According to the above configuration, by making the number of chips by which a signal is shifted variable, in addition to multiplexing a code-divided signal and that code-divided signal shifted by one or more chips, and transmitting this code division multiplexed signal assigned to a plurality of subcarriers, it is possible to reduce the probability of burst errors occurring, in addition to enabling error rate characteristics to be improved.

In this embodiment, a case has been described in which processing that multiplexes a code-divided signal, and that code-divided signal shifted by one or more chips according to a symbol, and transmits this code division multiplexed signal assigned to a plurality of subcarriers, is performed only for a specific transmit signal n, but the present invention is not limited to this, and the same kind of processing may also be performed, for example, for a known signal or for a plurality of signals. Also, the period for changing the shift amount is not limited to once every symbol, and the period for changing the shift amount may be selected according to the Doppler frequency, for example. Moreover, various methods may be applied, such as changing the shift amount at predetermined intervals, for example.

(Embodiment 40)

A special feature of an OFDM-CDMA communication apparatus according to Embodiment 40 of the present invention is that the degree of multiplexing of a signal obtained by shifting a code-divided signal by one or more chips, to be multiplexed with the code-divided signal, is made variable. By this means, it is possible to effectively improve the error rate characteristics of a specific user, while suppressing a decline of the error rate characteristics of other users.

The higher the degree of multiplexing of a signal obtained by shifting a code-divided signal by one or more chips, to be multiplexed with the code-divided signal, the greater is the effect of quality improvement for a poor-quality user (a user for which it is difficult to obtain the necessary quality unless multiplexing is performed (for example, a user that receives transmit signal n in FIG. 57)).

However, for other users (users for which the necessary quality can be adequately obtained without multiplexing (for example, users that receive transmit signals $4k+1 \ldots n-1$)), it is better not to increase the degree of multiplexing more than necessary, since the interference component increases accordingly.

Focusing on this point, this embodiment enables the error rate characteristics of a specific user to be effectively improved, while suppressing a decline of the error rate characteristics of other users, by selecting an appropriate degree of multiplexing of a signal obtained by shifting a code-divided signal by one or more chips, according to the circumstances.

In this embodiment, the degree of multiplexing is changed in accordance with quality information (such as RSSI (Received Signal Strength Indicator)) for the poorest-quality user, for example.

Figure 57:
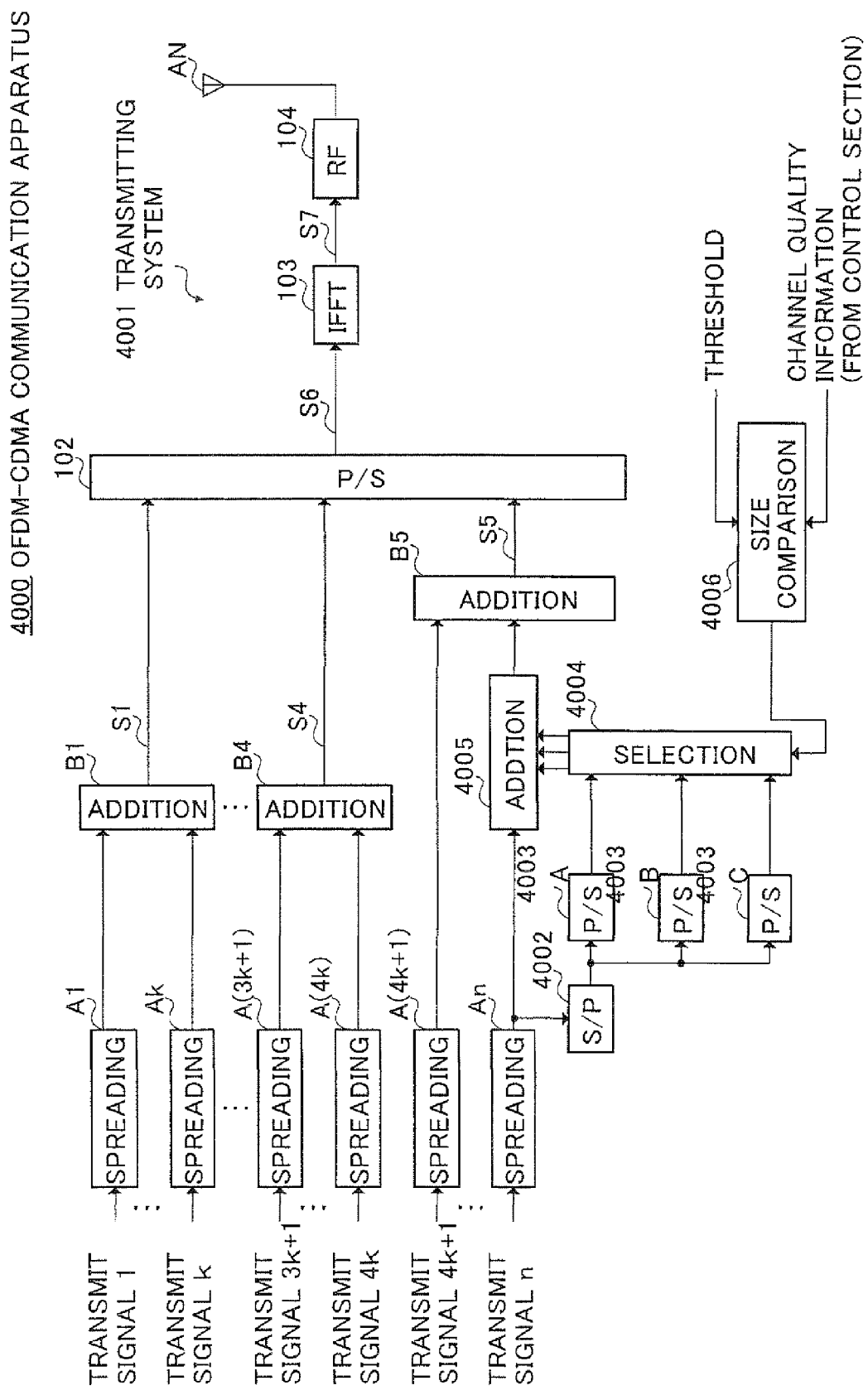
FIG. 57 is a block diagram showing the configuration of the transmitting system of an OFDM-CDMA communication apparatus according to Embodiment 40.

FIG. 57 shows the configuration of the transmitting system of an OFDM-CDMA communication apparatus according to this embodiment. In FIG. 57, in which parts corresponding to those in FIG. 52 described in Embodiment 35 are assigned the same codes as in FIG. 52, transmitting system 4001 of OFDM-CDMA communication apparatus 4000 is provided with a plurality of parallel/serial converters (P/S) 4003A through 4003C that shift by different numbers of chips as latter-stage sections with respect to serial/parallel converter (S/P) 4002. For example, parallel/serial converter 4003A may form a code division signal shifted by two chips, while parallel/serial converter 4003B forms a code division signal shifted by four chips, and parallel/serial converter 4003C forms a code division signal shifted by six chips.

The code division signals of different shift amounts formed by parallel/serial converters 4003A through 4003C are input to selecting section 4004. Also input to selecting section 4004 is a comparison result obtained by size comparison section 4006, which compares quality information (such as RSSI) for the user to which transmit signal n is transmitted with a predetermined threshold value.

Based on the result of this comparison, selecting section 4004 selects and outputs more code division signals the poorer the channel quality. For example, if the channel quality is very good, nothing is output; if the channel quality is rather poor, only input from parallel/serial converter 4003A is output; and if the channel quality is very poor, inputs from all of parallel/serial converters 4003A through 4003C are output.

By this means, a code division multiplexed signal is obtained from adder 4005 in which the degree of multiplexing of a signal shifted by one or more chips differs according to the channel quality. This code division multiplexed signal is then further code division multiplexed with code division signals for other users by adder 85.

According to the above configuration, by making the degree of multiplexing of a signal obtained by shifting a code-divided signal by one or more chips, to be multiplexed with the code-divided signal, variable, it is possible to effectively improve the error rate characteristics of a specific user, while suppressing a decline of the error rate characteristics of other users.

(Embodiment 41)

A special feature of an OFDM-CDMA communication apparatus according to Embodiment 41 of the present invention is that the degree of multiplexing of a signal obtained by shifting a code-divided signal by one or more chips, to be multiplexed with the code-divided signal, is changed adaptively according to the degree of code multiplexing of other signals code division multiplexed with this signal. By this means, it is possible to effectively improve the error rate characteristics of a specific user, while suppressing a decline of the error rate characteristics of other users.

As explained in Embodiment 35, a spreading code and a signal with that spreading code shifted are not necessarily in an orthogonal relationship (having a mutual correlation of 0). Therefore, as the degree of signal multiplexing increases, when code division signals shifted by one or more chips are multiplexed, it may happen that the interference component increases and, conversely, error rate characteristics degrade.

Figure 58:
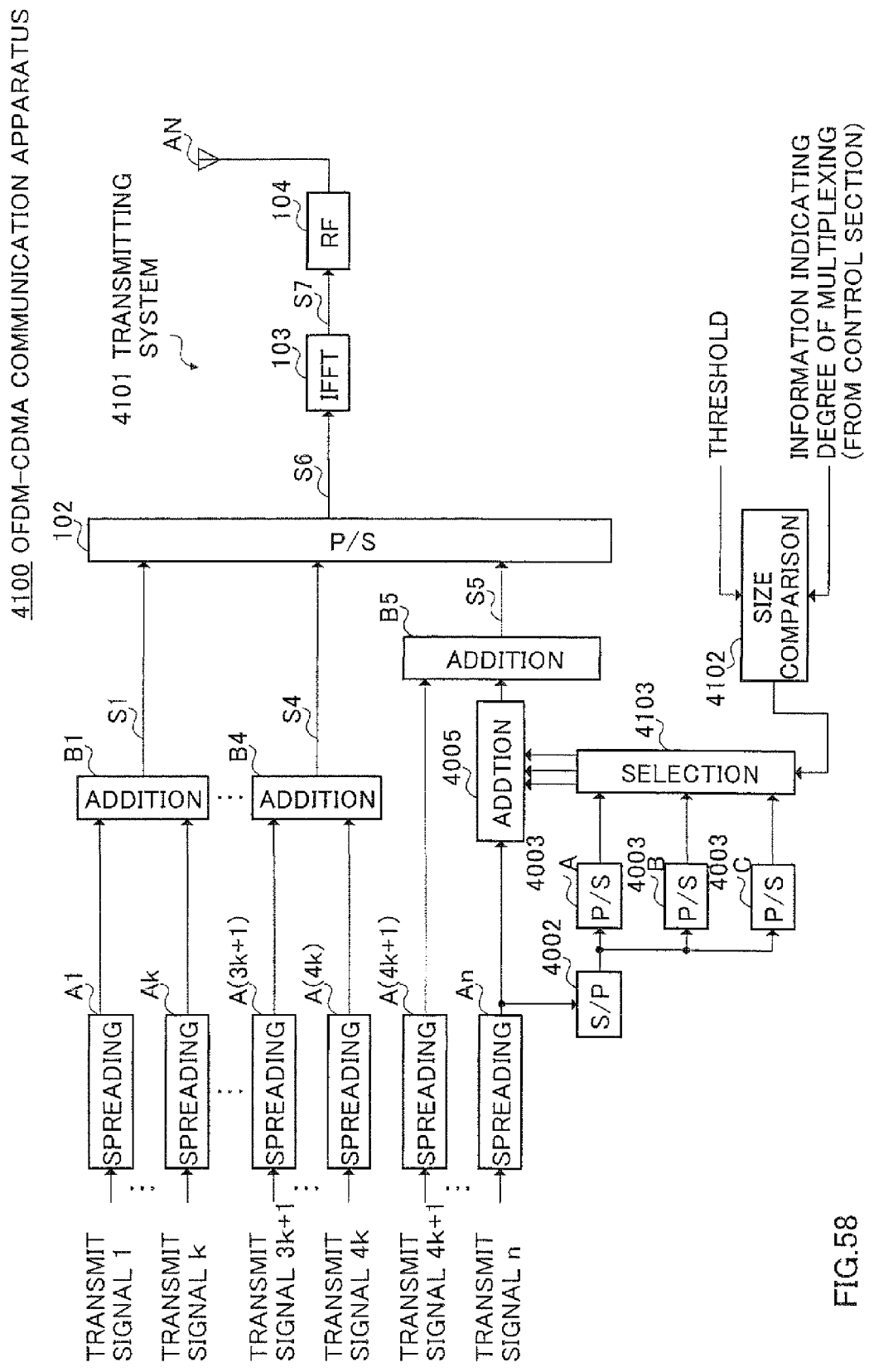
FIG. 58 is a block diagram showing the configuration of the transmitting system of an OFDM-CDMA communication apparatus according to Embodiment 41.

In consideration of this point, in this embodiment the degree of multiplexing of a signal obtained by shifting a code-divided signal by one or more chips, to be multiplexed with the code-divided signal, is changed adaptively according to the degree of code multiplexing (the number of transmit signals $4k+1$ through n code division multiplexed by adder B5 in FIG. 58). Specifically, when the degree of code multiplexing is low, the degree of multiplexing is made higher, and when the degree of code multiplexing is high, the degree of multiplexing is made lower. By this means, it is possible to effectively improve the error rate characteristics of transmit signal n to a specific user, while suppressing a decline of the error rate characteristics of transmit signals $4k+1$ ... n−1 to other users.

FIG. 58 shows the configuration of the transmitting system of an OFDM-CDMA communication apparatus according to this embodiment. In FIG. 58, in which parts corresponding to those in FIG. 57 are assigned the same codes as in FIG. 57, transmitting system 4101 of OFDM-CDMA communication apparatus 4100 is provided with a size comparison section 4102, which compares information indicating the degree of multiplexing (the number of transmit signals $4k+1$ through n code division multiplexed by adder B5) with a predetermined threshold value.

Based on the result of this comparison, selecting section 4103 selects and outputs more code division signals the lower the degree of multiplexing. For example, if the degree of multiplexing is high, only input from parallel/serial converter 4003A is output, and if the degree of multiplexing is low, inputs from all of parallel/serial converters 4003A through 4003C are output. By this means, a code division multiplexed signal is obtained from adder 4005 in which the degree of multiplexing of a signal shifted by one or more chips differs according to the degree of multiplexing performed by adder B5.

According to the above configuration, by adaptively changing the degree of multiplexing of a signal obtained by shifting a code-divided signal by one or more chips, to be multiplexed with the code-divided signal, according to the degree of code multiplexing of other signals (transmit signals $4k+1$ ... n−1) code division multiplexed with this signal (transmit signal n), it is possible to effectively improve the error rate characteristics of a specific user, while suppressing a decline of the error rate characteristics of other users.

(Embodiment 42)

A special feature of an OFDM-CDMA communication apparatus according to Embodiment 42 of the present invention is that, when multiplexing a code-divided signal with a signal obtained by shifting that code-divided signal by one or more chips, the number of chips by which the signal is shifted is changed according to the cell of the communicating party. By this means, it is possible for the communicating station to identify the cell to which the station itself belongs by detecting the number of chips by which a signal is shifted. As a result, the number of cells that can be identified can be significantly increased.

When the number of chips by which a signal is shifted is changed, the timing at which a correlation peak appears during reception (the correlator coefficient chip shift number) differs on the receiving side. Therefore, if the shifted number of chips is changed on the transmitting side according to the cell, cell identification can be performed on the receiving side using the correlation peak timing. By this means, the number of cells that can be identified can be increased.

Figure 59:
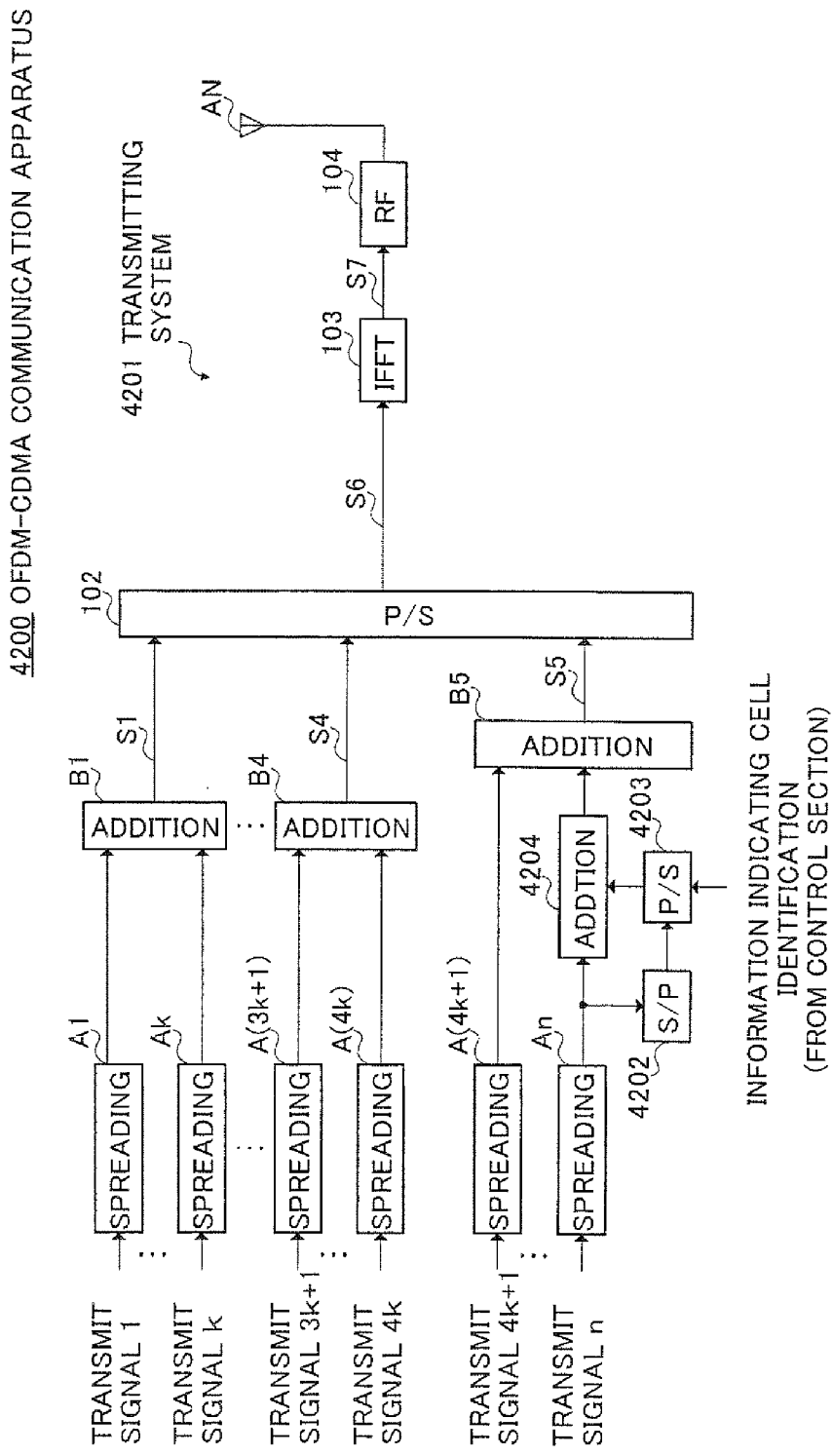
FIG. 59 is a block diagram showing the configuration of the transmitting system of an OFDM-CDMA communication apparatus according to Embodiment 42.

FIG. 59 shows the configuration of the transmitting system of an OFDM-CDMA communication apparatus according to this embodiment. In FIG. 59, in which parts corresponding to those in FIG. 52 are assigned the same codes as in FIG. 52, in transmitting system 4201 of OFDM-CDMA communication apparatus 4200, a code division signal is shifted by a number of chips in accordance with information indicating cell identification from a control section (not shown) by means of serial/parallel converter (S/P) 4202 and parallel/serial converter (P/S) 4203, and the pre-shift code division signal and post-shift code division signal are multiplexed by adder 4204.

By this means, the far-end station that receives transmit signal n detects the correlation peak timing when the received signal is despread using the same spreading code as spreading section An, and can perform cell identification based on this timing.

According to the above configuration, by changing the number of chips shifted according to the cell of the communicating party when multiplexing a code-divided signal with a signal obtained by shifting that code-divided signal by one or more chips, the number of cells that can be identified can be significantly increased.

(Embodiment 43)

A special feature of an OFDM-CDMA communication apparatus according to Embodiment 43 of the present invention is that, whereas in above-described Embodiment 38 a code division signal shifted by one or more chips and the original code division signal are multiplexed only at the start of a frame, in this embodiment a code division signal shifted by one or more chips and the original code division signal are multiplexed throughout an entire frame, and the number of chips shifted is changed only at the start of a frame. By this means, it is possible to significantly increase error rate characteristics in addition to achieving the effect of Embodiment 38.

In Embodiment 38, a code division signal shifted by one or more chips and the original code division signal are multiplexed only at the start of a frame, enabling frame synchronization detection processing to be performed on the receiving side without increasing the number of spreading codes or increasing the number of known signals. However, an effect of improvement in error rate characteristics due to multiplexing of a code division signal shifted by one or more chips with the original code division signal cannot be expected.

Thus, in this embodiment, a code division signal shifted by one or more chips and the original code division signal are multiplexed throughout an entire frame, and the number of chips shifted is changed only at the start of a frame, thereby enabling frame synchronization detection to be performed, and also enabling an effect of improvement in error rate characteristics to be obtained.

Figure 60:
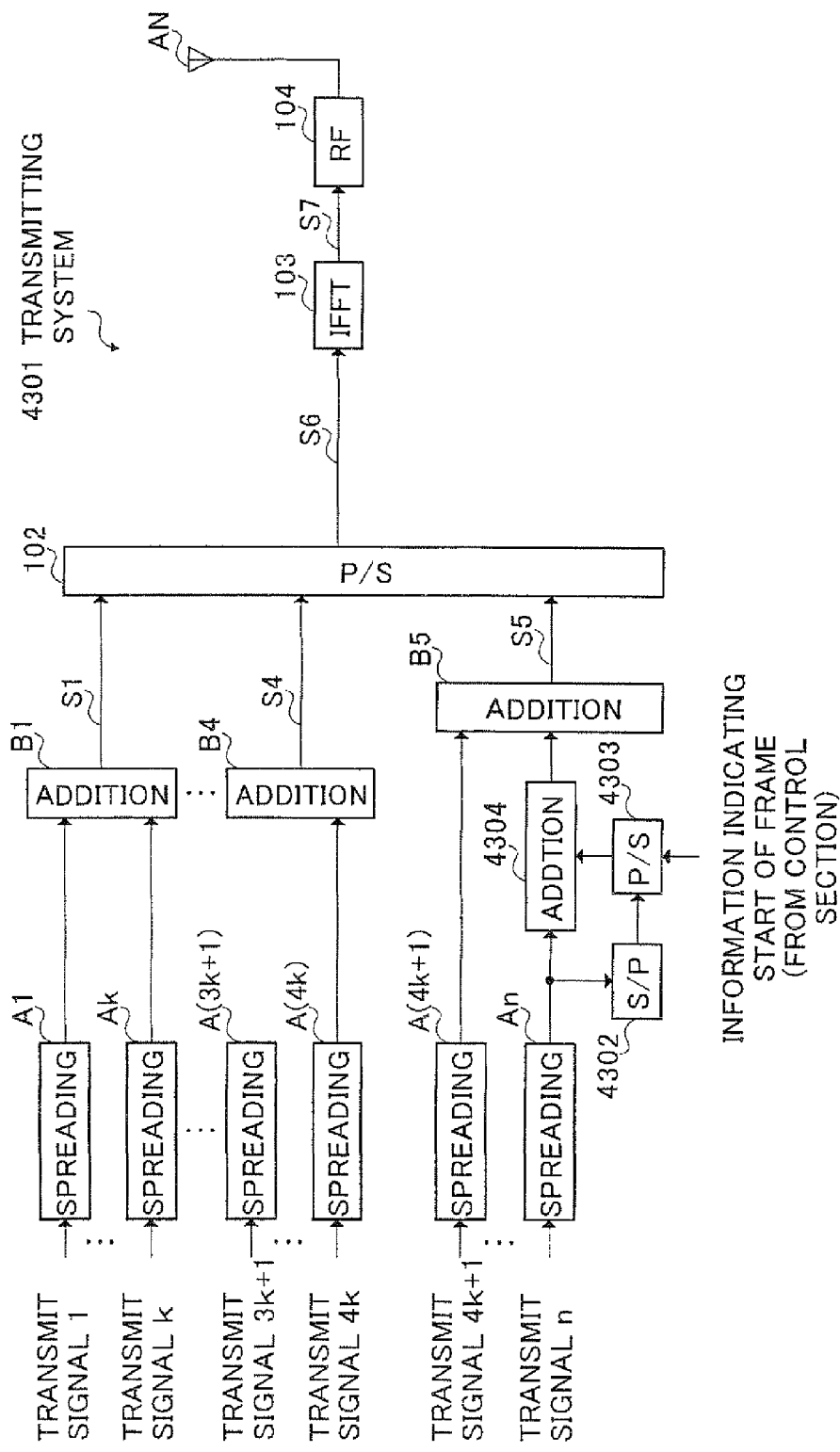
FIG. 60 is a block diagram showing the configuration of the transmitting system of an OFDM-CDMA communication apparatus according to Embodiment 43.

FIG. 60 shows the configuration of the transmitting system of an OFDM-CDMA communication apparatus according to this embodiment. In FIG. 60, in which parts corresponding to those in FIG. 59 described in Embodiment 42 are assigned the same codes as in FIG. 59, in transmitting system 4301 of OFDM-CDMA communication apparatus 4300, a code division signal is shifted adaptively in accordance with information indicating the start of a frame from a control section (not shown) by means of serial/parallel converter (S/P) 4302 and parallel/serial converter (P/S) 4303. Specifically, the number of chips shifted at the start of a frame and the number of chips shifted other than at the start of a frame are made to differ. The code division signal shifted in this way and the original code division signal are multiplexed by adder 4304.

According to the above configuration, by multiplexing a code division signal shifted by one or more chips and the original code division signal throughout an entire frame, and changing the number of chips shifted only at the start of a frame, it is possible to perform frame synchronization detection, and also to obtain an effect of improvement in error rate characteristics.

(Embodiment 44)

A special feature of an OFDM-CDMA communication apparatus according to Embodiment 44 of the present invention is that the interval for insertion of a propagation path estimation preamble is set independently for each subcarrier. By this means, it is possible to improve the error rate characteristics of a user with large propagation path fluctuations, such as a user moving at high speeds with almost no lowering of transmission efficiency.

As speed of movement increases, the speed of propagation path fluctuations also increases, and therefore degradation of error rate characteristics becomes greater. There is a method whereby the propagation path estimation preamble insertion period is shortened in order to prevent degradation of the error rate characteristics of a user moving at high speed. However, as a propagation path estimation preamble is not data, a problem arises of transmission efficiency falling in proportion as the number of insertions increases.

Figure 61:
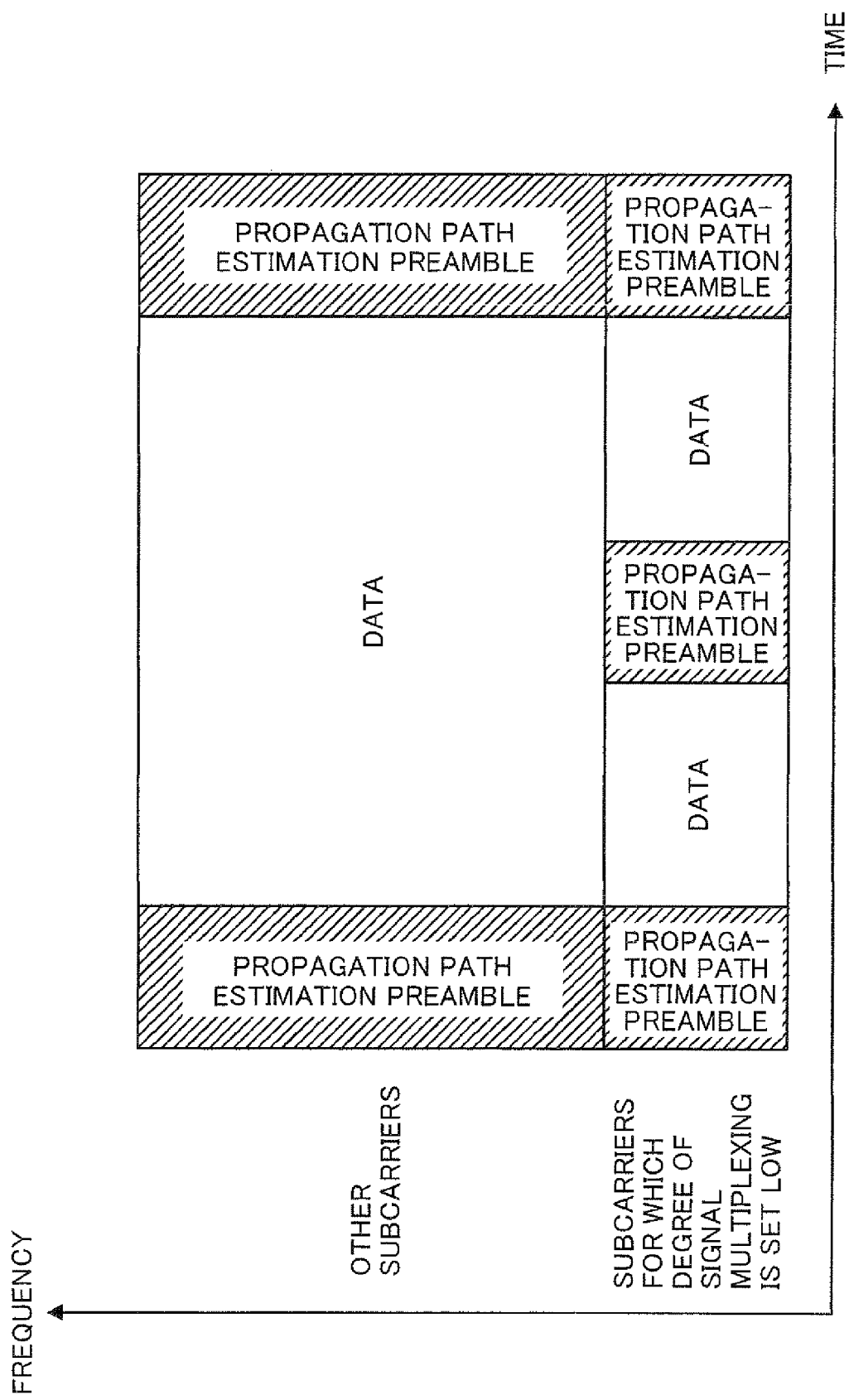
FIG. 61 is a drawing showing sample propagation path estimation preamble arrangements according to Embodiment 44.

In consideration of this point, in this embodiment the insertion interval for a propagation path estimation preamble is shortened for subcarriers for which the degree of signal multiplexing is set low, as shown in FIG. 61, and these subcarriers are assigned to a user moving at high speed. As the propagation path estimation preamble insertion interval is not shortened for subcarriers other than those for which the degree of signal multiplexing is set low, a fall in transmission efficiency can be prevented. By this means, it is possible to improve the error rate characteristics of a user moving at high speed, with almost no lowering of transmission efficiency.

Figure 62:
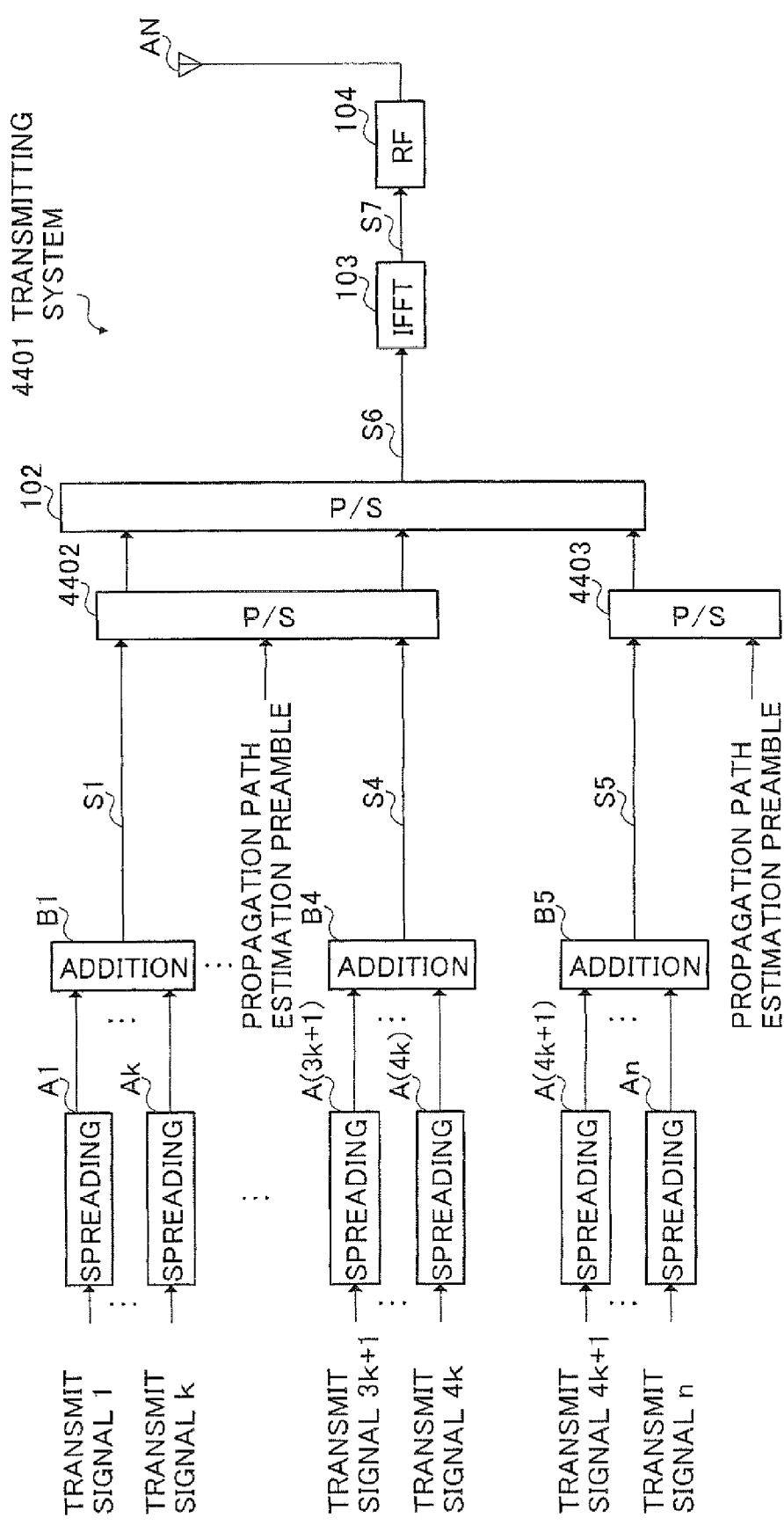
FIG. 62 is a block diagram showing the configuration of the transmitting system of an OFDM-CDMA communication apparatus according to Embodiment 44.

FIG. 62 shows the configuration of the transmitting system of an OFDM-CDMA communication apparatus according to this embodiment. In FIG. 62, in which parts corresponding to those in FIG. 5 described in Embodiment 1 are assigned the same codes as in FIG. 5, transmitting system 4401 of OFDM-CDMA communication apparatus 4400 according to this embodiment is provided with a parallel/serial converter (P/S) 4402 as a section for arranging propagation path estimation preambles for signals of subcarriers for which the degree of signal multiplexing is set high, and a parallel/serial converter (P/S) 4403 as a section for arranging propagation path estimation preambles for signals of subcarriers for which the degree of signal multiplexing is set low.

Parallel/serial converter (P/S) 4402 does not shorten the propagation path estimation preamble insertion interval, while parallel/serial converter (P/S) 4403 does shorten the propagation path estimation signal insertion interval—that is to say, they respectively arrange propagation path estimation preambles as shown in FIG. 61—and the signals for which propagation path estimation preamble arrangement has been performed are sent to next-stage parallel/serial converter (P/S) 102.

According to the above configuration, by setting the interval for insertion of a propagation path estimation preamble independently for each subcarrier, it is possible to improve the error rate characteristics of specific transmit signals, with almost no lowering of transmission efficiency.

In this embodiment, the error rate characteristics of signals transmitted by subcarriers for which the degree of signal multiplexing is set low are improved by shortening the propagation path estimation preamble insertion interval of subcarriers for which the degree of signal multiplexing is set low, but it is also possible for subcarriers whose propagation path estimation preamble insertion interval is shortened not to be limited to subcarriers for which the degree of signal multiplexing is set low, but to be changed as appropriate according to propagation path fluctuation conditions.

(Embodiment 45)

A special feature of an OFDM-CDMA communication apparatus according to Embodiment 45 of the present invention is that a differential modulation method is used as the modulation method for subcarriers for which the degree of signal multiplexing is set low. By this means, it is possible to improve the error rate characteristics of a user moving at high speed.

A modulation method that is tolerant of high-speed propagation path fluctuations is differentially coherent detection. In differentially coherent detection, the phase difference from data of the preceding symbol is taken as the modulation result, and therefore only channel fluctuation effects for one symbol are received. In order to perform differentially coherent detection, a differential modulation method such as DQPSK must be used as the modulation method, and therefore differentially coherent detection cannot be applied to an M ary modulation method such as 16QAM. There is thus a problem of a fall in transmission efficiency if differentially coherent detection is performed for all subcarriers.

However, if differential modulation is performed only for users moving at high speed, the error rate characteristics of users moving at high speed can be improved with almost no lowering of transmission efficiency.

Figure 63:
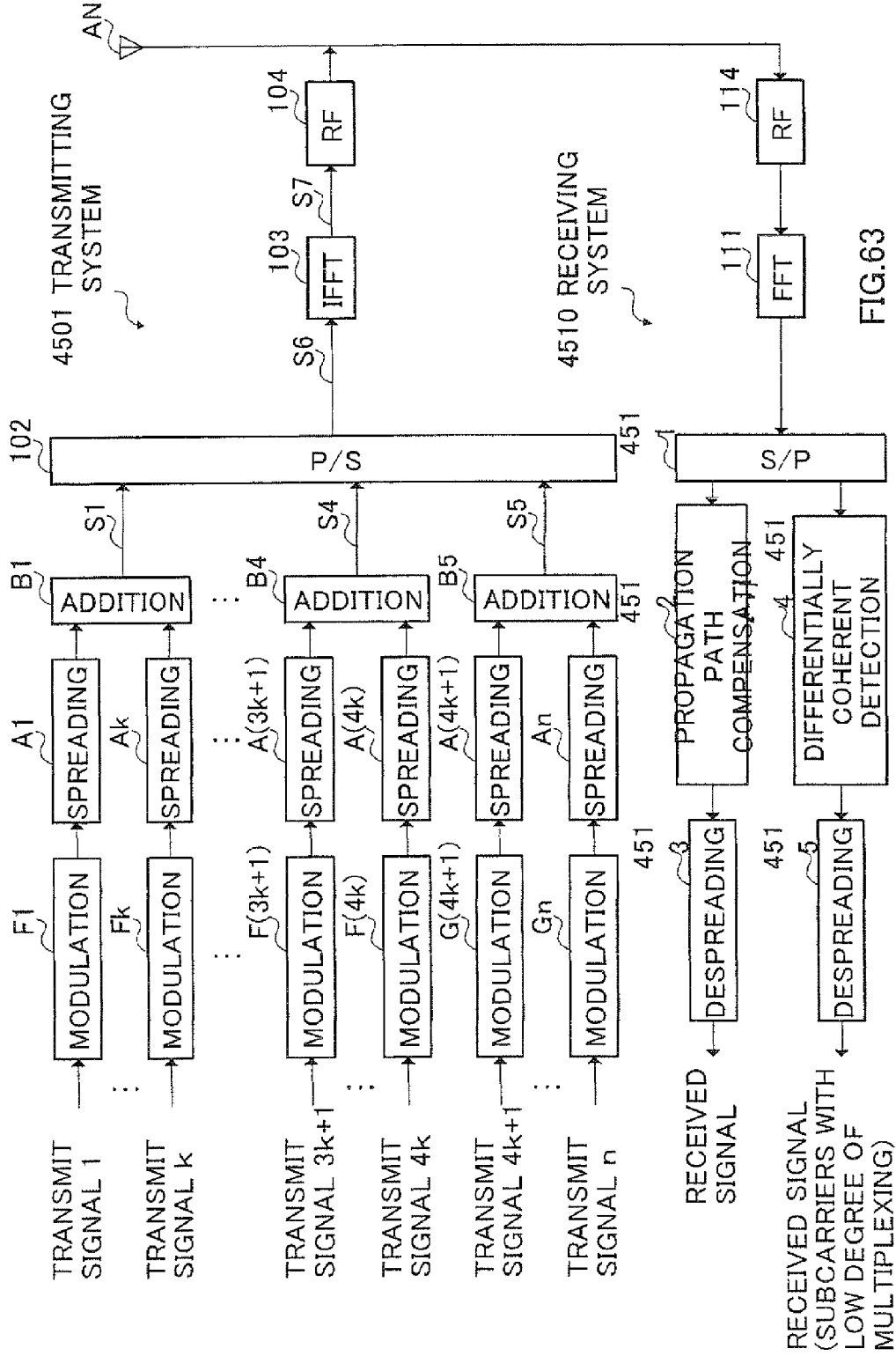
FIG. 63 is a block diagram showing the configuration of an OFDM-CDMA communication apparatus according to Embodiment 45.

FIG. 63 shows the configuration of the transmitting system of an OFDM-CDMA communication apparatus according to this embodiment. In FIG. 63, in which parts corresponding to those in FIG. 6 are assigned the same codes as in FIG. 6, transmitting system 4501 of OFDM-CDMA communication apparatus 4500 is provided with modulation circuits F1 through F(4*k*) and F(4*k*+1) through Gn, which perform modulation processing on transmit signals 1 through n.

Modulation circuits F(4*k*+1) through Gn corresponding to transmit signals 4*k*+1 through n with a low degree of signal multiplexing perform differential modulation (such as D8PSK or DQPSK), while modulation circuits F1 through F(4*k*) corresponding to transmit signals with a high degree of signal multiplexing perform modulation other than differential modulation, such as 16QAM.

In receiving system 4510, a signal that has undergone FFT processing is divided into a signal with a low degree of multiplexing and a signal with a high degree of multiplexing by serial/parallel converter (S/P) 4511, and the signal with a high degree of multiplexing is restored via propagation path compensation section 4512 and despreader 4513 and taken as a received signal. Meanwhile, the signal with a low degree of multiplexing is subjected to differentially coherent detection by differentially coherent detection section 4514, and is then restored by despreader 4515 and taken as a received signal. A description of differentially coherent detection itself is omitted here, as it is well-known technology.

Thus, by performing differential modulation only on a transmit signal assigned to subcarriers with a low degree of signal multiplexing, and executing differentially coherent detection processing on the receiving side, it is possible to improve the error rate characteristics of a user moving at high speed, with almost no lowering of transmission efficiency.

In this embodiment, a case has been illustrated in which differential modulation is used on a fixed basis for subcarriers for which the degree of multiplexing is set low, but the present invention is not limited to this, and it is also possible for the modulation method of subcarriers for which the degree of multiplexing is set low to be switched adaptively between differential modulation and another modulation method. For example, it is possible for the modulation method of subcarriers for which the degree of multiplexing is set low to be switched adaptively between differential modulation and another modulation method according to the speed of movement (for example, it is also possible to use the difference between the present channel estimation result and the previous channel estimation result).

(Embodiment 46)

A special feature of an OFDM-CDMA communication apparatus according to Embodiment 46 of the present invention is that, when transmission is performed using OFDM-CDMA, subcarriers to which spread signals are allocated only in the frequency axis direction, and subcarriers to which spread signals are allocated in both the frequency axis direction and the time axis direction, are formed.

In this embodiment, the degree of signal multiplexing is set individually for each subcarrier. Also, as shown in FIG. 5, the degree of signal multiplexing is set low for one subcarrier group G1 (indicated by shading in FIG. 5) of the five subcarrier groups.

In addition, in this embodiment, chips that have undergone spreading processing are allocated in both the frequency axis direction and the time axis direction for subcarrier group G1. On the other hand, chips that have undergone spreading processing are allocated only in the frequency axis direction for other subcarrier groups.

As a result, it is possible to significantly improve error rate characteristics for subcarrier group G1, with no decrease in spectral efficiency whatever for subcarrier groups other than subcarrier group G1 among the five subcarrier groups. By this means, it is possible to make spectral efficiency compatible with error rate characteristics.

In this embodiment, a signal for a communicating party whose channel quality is poor, such as a distant radio station or a radio station with a poor SIR (Signal to Interference Ratio), for example, is allocated to subcarrier group G1. By this means, it is possible to improve the error rate characteristics of a communicating party with poor channel quality, with almost no lowering of spectral efficiency.

As chips that have undergone spreading processing are allocated in both the frequency axis direction and the time axis direction for subcarrier group G1, even if the spreading ratio of a spread signal allocated to this subcarrier group G1 is made larger than the spreading ratio of spread signals allocated to other groups, it is possible to prevent the frequency band of other subcarrier groups from decreasing.

In this embodiment, the spreading ratio of subcarrier groups other than subcarrier group G1 is made 1/5, and the spreading ratio of subcarrier group G1 is set to twice that of other subcarrier groups. However, spreading ratios are not limited to these, and a spreading ratio can be set individually for each subcarrier group.

Figure 64:
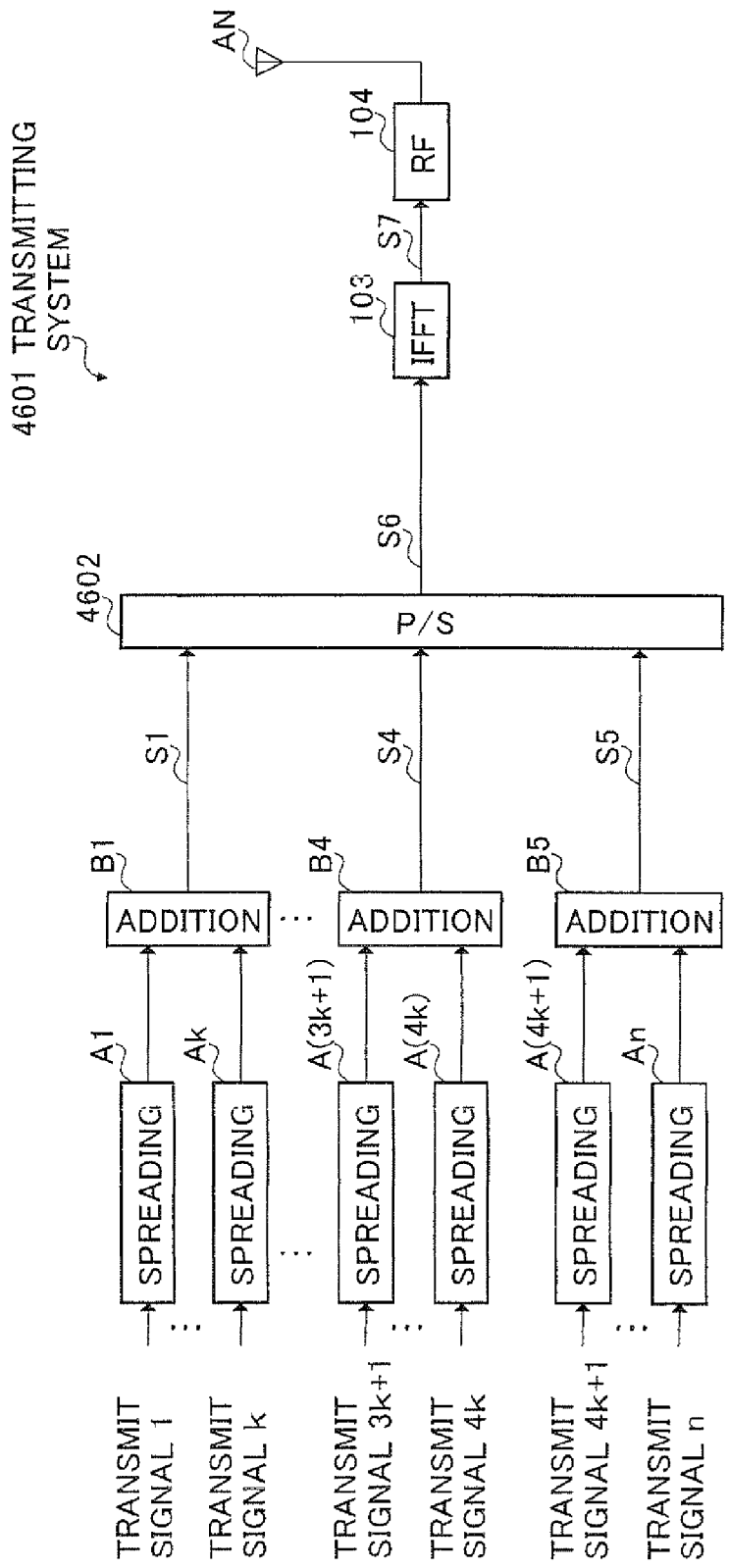
FIG. 64 is a block diagram showing the configuration of the transmitting system of an OFDM-CDMA communication apparatus according to Embodiment 46.

An actual sample configuration of an OFDM-CDMA communication apparatus according to this embodiment will now be described, using FIG. 64. Transmitting system 4601 of OFDM-CDMA communication apparatus 4600 divides n transmit signals 1 through n into 5 groups, and forms an OFDM-CDMA signal by spreading transmit signals in each group in the frequency axis direction only of a plurality of subcarriers, or in both the frequency axis direction and the time axis direction (so-called "two-dimensional spreading").

In actuality, in transmitting system 4601, transmit signals 1 through n are input to spreaders A1 through An, which perform spreading processing using different spreading codes. The spreading ratio of spreaders A(4*k*+1) through An is set to a higher value than the spreading ratio of the other spreaders A1 through A(4*k*). For example, the spreading ratio of spreaders A(4*k*+1) through An may be set to 1/5 the number of subcarriers while the spreading ratio of spreaders A1 through A(4*k*) is set to twice that value.

Spread signals are multiplexed by adders B1 through B5, one of which is provided for each group (in this embodiment, each of 5 groups), and by this means, code division multiplexed signals S1 through S5 corresponding to the predetermined number of groups are obtained.

Here, in transmitting system 4601, adders B1 through B4 form code division multiplexed signals S1 through S4 in each of which k transmit signals are multiplexed, whereas adder B5 forms code division multiplexed signal S5 in which fewer than k transmit signals are multiplexed. That is to say, the number of signals (n−4k) of transmit signals (4*k*+1) through n that are code division multiplexed by adder B5 is selected so that 1<(n−4k)<k.

Code division multiplexed signals S1 through S5 obtained by adders B1 through B5, respectively, are input to a parallel/serial converter (P/S) 4602 as a spread signal assigning section. Parallel/serial converter 4602, comprising memory and a flip-flop circuit, rearranges code division multiplexed signals S1 through S5 in a predetermined order, and outputs them as a serial signal S6. In this embodiment, this arrangement order determines which subcarrier groups in FIG. 5 code division multiplexed signals S1 through S5 are allocated to, and also determines whether allocation is performed only in the frequency axis direction or in both the frequency axis direction and the time axis direction.

In this embodiment, code division multiplexed signal S5 for which the degree of signal multiplexing is set low and the spreading ratio is set high is allocated spread in both the frequency axis direction and the time axis direction, and the other code division multiplexed signals S1 through S4 are allocated spread only in the frequency axis direction.

Serial signal S6 output from parallel/serial converter 4602 is input to inverse fast Fourier transform circuit (IFFT) 103. Inverse fast Fourier transform circuit 103 executes inverse fast Fourier transform processing on serial signal S6 for each of code division multiplexed signals S1 through S5, and thereby allocates spread chips by distributing them among a plurality of subcarriers that are in a mutually orthogonal relationship.

At this time, code division multiplexed signal S1 that was code division multiplexed by adder B1, for example, is allocated by frequency domain spreading to a certain subcarrier group, and code division multiplexed signal S5 that was code division multiplexed by adder B5 is allocated by spreading in both the frequency axis direction and the time axis direction to subcarrier group G1 in FIG. 5.

In this way, it is possible to form an OFDM-CDMA signal S7 in which a spread signal spread in both the frequency axis direction and the time axis direction is allocated to subcarrier group G1, and spread signals spread only in the frequency axis direction are allocated to other subcarrier groups. Obtained OFDM-CDMA signal S7 is then transmitted via radio transmitting section (RF) 104 that performs radio transmission processing such as digital/analog conversion and signal amplification, and antenna AN.

Figure 65:
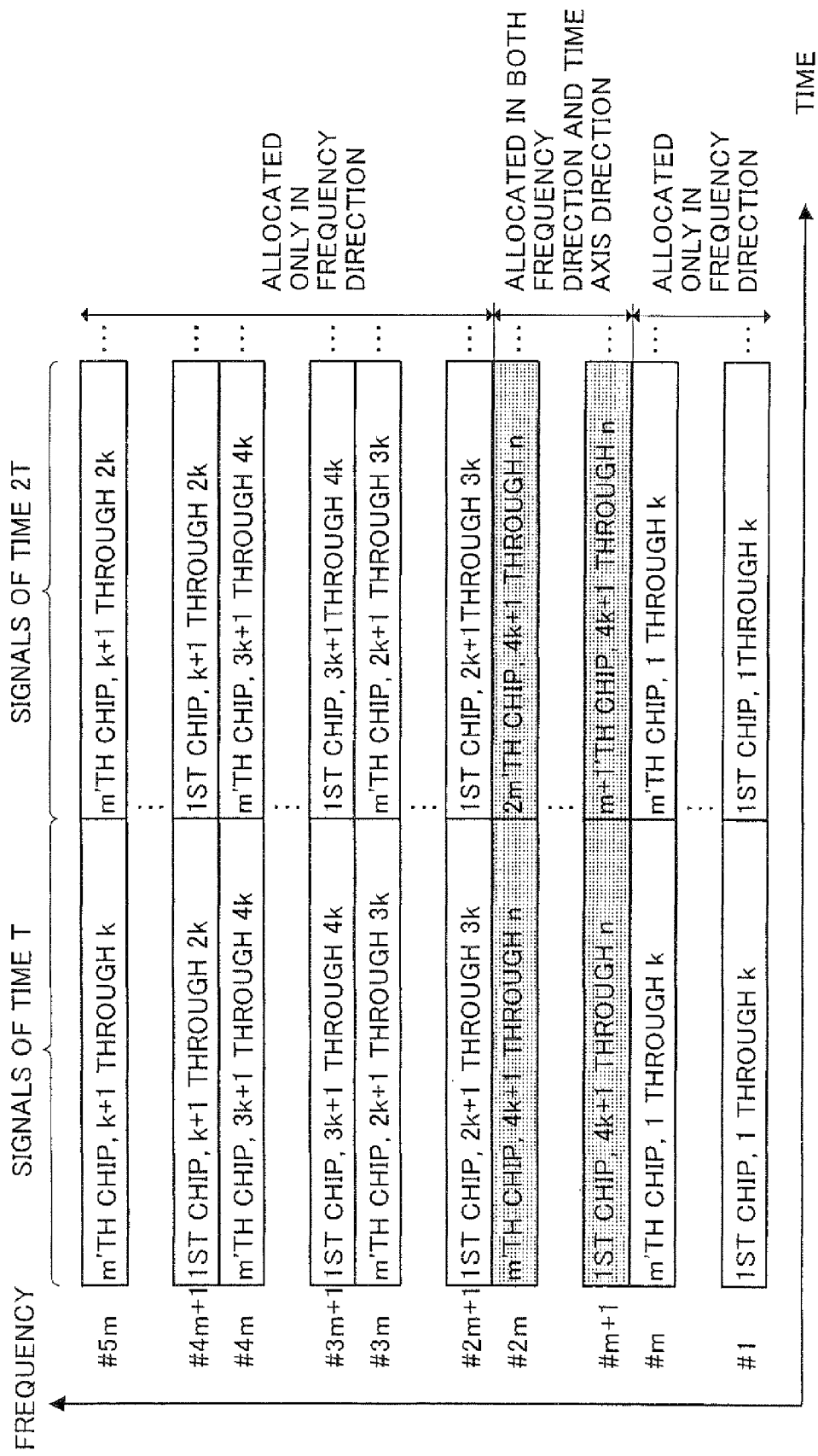
FIG. 65 is a drawing provided in order to explain an OFDM-CDMA signal according to Embodiment 46.

FIG. 65 shows an example of OFDM-CDMA signal S7 formed by OFDM-CDMA communication apparatus 4600. As can be seen from this drawing, code division multiplexed signal S5 obtained by spreading with a spreading ratio twice that of other code division multiplexed signals S1 through S4, is allocated by two-dimensional spreading to subcarriers in both the frequency axis direction and the time axis direction (that is, the spread signal is allocated over a plurality of symbols).

In the above configuration, by providing a subcarrier group G1 in which spread signals are allocated in both the frequency axis direction and the time axis direction, it is possible to prevent the frequency band of other subcarrier groups from being decreased even if the spreading ratio of a spread signal allocated to this subcarrier group G1 is increased.

Also, by providing subcarrier groups in which spread signals are allocated only in the frequency axis direction, wasteful band usage due to subcarriers that do not transmit any data can be prevented as compared with the case where spread signals are allocated in both the frequency axis direction and the time axis direction for all subcarriers.

Moreover, by making the degree of multiplexing of transmit signals 4k+1 through n of subcarrier group G1, in which spread signals are allocated in both the frequency axis direction and the time axis direction, lower than the degree of signal multiplexing of other subcarrier groups, inter-code interference on the propagation path is reduced, and therefore the error rate characteristics of signals superimposed on subcarriers in which spread signals are allocated in both the frequency axis direction and the time axis direction can be significantly improved.

As a result, compared with a case in which the degree of multiplexing and spreading direction are decided uniformly for all subcarriers (for example, when it is decided that spread signals are to be allocated in both the frequency axis direction and the time axis direction for all subcarriers), if transmit signals (4k+1) through n for which it is desired to improve error rate characteristics, such as important information, are spread in both the frequency axis direction and the time axis direction and also allocated to subcarriers with a low degree of signal multiplexing, and transmit signals 1 through k, . . . , (3k+1) through 4k for which the error rate need not be improved so much are spread only in the frequency axis direction and also allocated to subcarriers with a high degree of signal multiplexing, degradation of error rate characteristics can be prevented without lowering spectral efficiency significantly.

Thus, by selecting independently for each subcarrier whether spread signals are to be allocated only in the frequency axis direction, or are to be allocated in both the frequency axis direction and the time axis direction, an OFDM-CDMA communication apparatus 4600 can be implemented that enables spectral efficiency and error rate characteristics to be made compatible.

Furthermore, by making the degree of signal multiplexing of subcarriers for which spread signals are allocated in both the frequency axis direction and the time axis direction higher than the degree of signal multiplexing of other subcarriers, it is possible to significantly improve the error rate characteristics of signals superimposed on these subcarriers.

In this embodiment, a case has been described in which a code division multiplexed signal for which the degree of signal multiplexing is set lower than for others is spread in both the frequency axis direction and the time axis direction, but the present invention is not limited to this, and it is possible to select independently for any subcarrier whether a signal spread only in the frequency axis direction is to be allocated, or a signal spread in both the frequency axis direction and the time axis direction is to be allocated.

Also, in FIG. 65 of this embodiment a case has been illustrated in which a signal spread over two symbols is allocated as regards the time axis direction, but the present invention is not limited to this, and allocation is also possible over any number of symbols.

(Embodiment 47)

Figure 66:
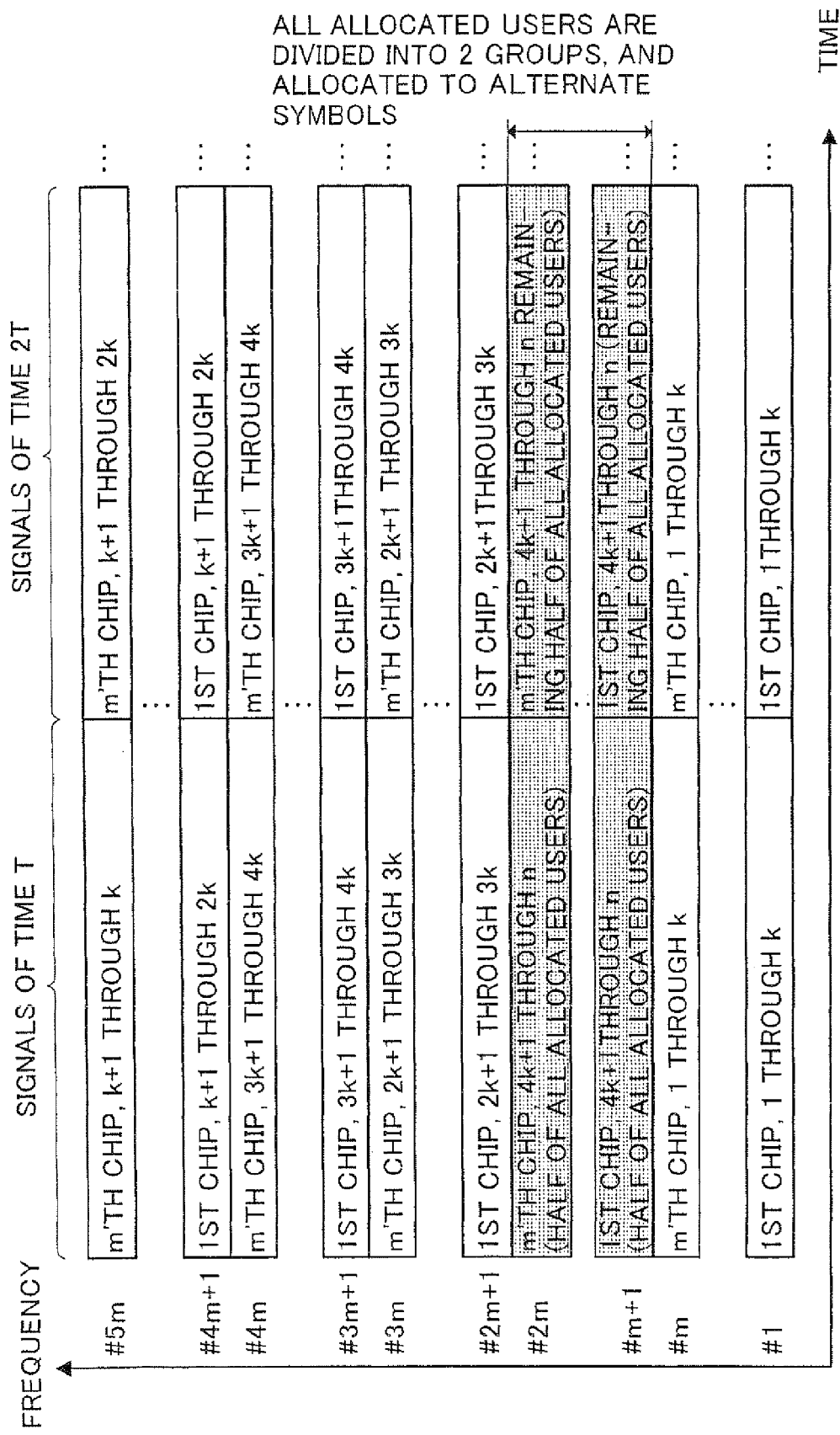
FIG. 66 is a drawing provided in order to explain an OFDM-CDMA signal according to Embodiment 47.

A special feature of an OFDM-CDMA communication apparatus according to Embodiment 47 of the present invention is that, as shown in FIG. 66, for subcarriers in which spread signals are allocated in both the frequency axis direction and the time axis direction, the degree of signal multiplexing is further decreased, and spread signals are allocated only in the frequency axis direction at intervals of a plurality of symbols.

By this means, the receiving side need only perform processing from FFT (fast Fourier transform) onward for symbols to which a signal is allocated, enabling power consumption to be further reduced compared with Embodiment 1.

Figure 67:
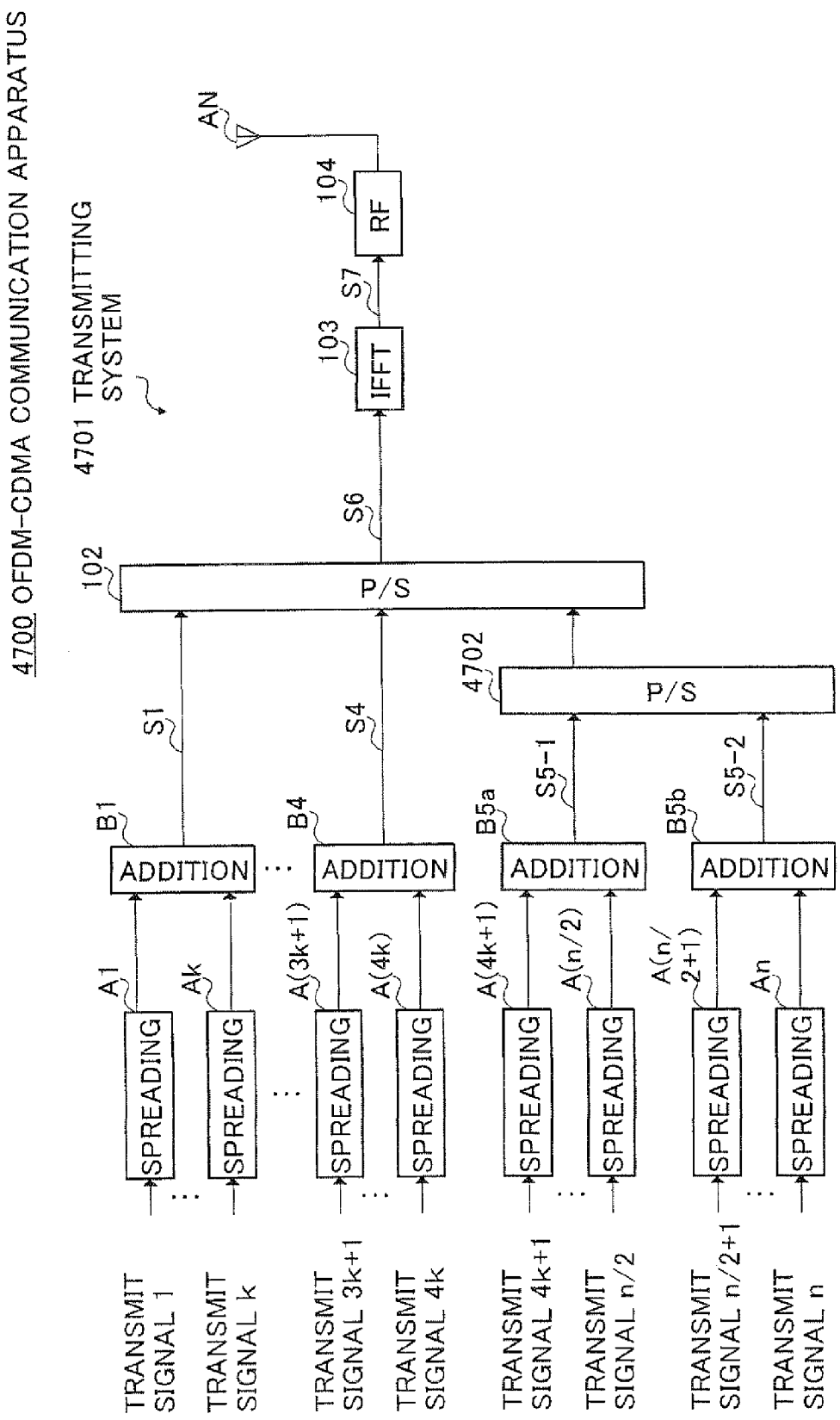
FIG. 67 is a block diagram showing the configuration of the transmitting system of an OFDM-CDMA communication apparatus according to Embodiment 47.

FIG. 67 shows the configuration of the transmitting system of an OFDM-CDMA communication apparatus according to this embodiment. In FIG. 67, in which parts corresponding to those in FIG. 64 are assigned the same codes as in FIG. 64, in transmitting system 4701 of OFDM-CDMA communication apparatus 4700, users allocated to subcarriers for which spread signals are assigned in both the frequency axis direction and the time axis direction (transmit signals 4k+1 through n) are divided into two groups, for example.

Specifically, a code division multiplexed signal S5-1 is obtained by multiplexing spread signals of half of the users by means of adder B5a, and a code division multiplexed signal S5-2 is obtained by multiplexing spread signals of the other half of the users by means of adder B5b. These code division multiplexed signals S5-1 and S5-2 are then sent to parallel/serial converter (P/S) 102 in a predetermined order via parallel/serial converter (P/S) 4702.

By this means, in transmitting system 4701, as shown in FIG. 66, half of the users are allocated to the first symbol (transmit signals 4k+1 through n/2) and the other half of the users are allocated to the second symbol (transmit signals n/2+1 through n) (that is, they are allocated in the time axis direction). Looking at subcarriers of the same time, code division multiplexed signals of half of the users are allocated in the frequency axis direction. Thereafter, spread signals continue to be allocated to alternate symbols in the same way.

According to the above configuration, when allocating spread signals in both the frequency axis direction and the time axis direction, a plurality of transmit signals 1 through n are divided into at least two groups, a code division multiplexed signal of first group $4k+1$ through n/2 and a code division multiplexed signal of second group n/2+1 through n are allocated alternately in the time axis direction, and a first or second group code division multiplexed signal is allocated in the frequency axis direction within the same time, so that on the receiving side, it is only necessary to process code division multiplexed signals (symbols) of the same group in the same time—that is, to perform processing from FFT (fast Fourier transform) onward only for symbols allocated to subcarriers of the same time—thereby enabling power consumption to be further reduced.

In this embodiment, a case has been described in which spread signals are allocated every other symbol, but the present invention is not limited to this, and spread symbols can be allocated at intervals of any number of symbols.

The present invention is not limited to the above-described embodiments, and various variations and modifications may be possible without departing from the scope of the present invention.

A radio transmitting apparatus according to the present invention has a configuration comprising an orthogonal frequency division multiplexing section that assigns a spread plurality of transmit signals to a plurality of subcarriers, and a signal multiplexing degree selecting section that selects on a subcarrier-by-subcarrier basis the degree of multiplexing of the aforementioned transmit signals transmitted by subcarriers.

According to this configuration, inter-code interference on the propagation path is smaller for transmit signals allocated to subcarriers with a low degree of signal multiplexing than for transmit signals allocated to subcarriers with a high degree of signal multiplexing. As a result, compared with a case in which the degree of signal multiplexing is decided uniformly for all subcarriers, if transmit signals representing important information are assigned to subcarriers with a low degree of signal multiplexing and transmit signals representing other information are assigned to subcarriers with a high degree of signal multiplexing, for example, degradation of the error rate characteristics of important information can be prevented without lowering spectral efficiency significantly. By this means, an OFDM-CDMA radio transmitting apparatus can be implemented that enables spectral efficiency and error rate characteristics to be made compatible.

A radio transmitting apparatus according to the present invention has a configuration wherein the signal multiplexing degree selecting section forms a multiplex signal after spreading in which the rates differ on a subcarrier-by-subcarrier basis.

According to this configuration, it is possible to select the degree of multiplexing of a transmit signal to be transmitted by subcarriers on a subcarrier-by-subcarrier basis with a simple configuration, and send code division multiplexed transmit signals for which the degree of signal multiplexing differs on a subcarrier-by-subcarrier basis.

A radio transmitting apparatus according to the present invention has a configuration wherein the signal multiplexing degree selecting section allocates transmit signals for which better channel quality is required than for other information to subcarriers for which the degree of signal multiplexing is set low.

According to this configuration, degradation of error rate characteristics on the propagation path for a code division multiplexed signal transmitted by subcarriers for which the degree of signal multiplexing is set low is less than for a code division multiplexed signal transmitted by subcarriers for which the degree of signal multiplexing is set high, and therefore if information of a communicating party for which better channel quality is required, such as a distant radio station or a radio station with a poor SIR (Signal to Interference Ratio), for example, is transmitted by subcarriers for which the degree of signal multiplexing is set low, prevention of degradation of error rate characteristics and an improvement in spectral efficiency can be made compatible to a significantly greater extent. Also, if a signal such as a retransmission signal or control signal, for example is taken as an instance of a transmit signal for which better channel quality is required than for other information, and such a signal is transmitted by subcarriers with a low degree of signal multiplexing, degradation of this information can be prevented, and therefore satisfactory communication can be performed.

A radio transmitting apparatus according to the present invention has a configuration comprising a multiplex signal allocation selecting section that selects multiplex transmit signals to be allocated to subcarriers, wherein that multiplex signal allocation selecting section allocates a multiplex signal with a low degree of multiplexing selected by a signal multiplexing degree selecting section to subcarriers including the DC point.

According to this configuration, while generally, in an OFDM-CDMA radio transmitting apparatus, DC offset is generated by analog circuitry provided in the amplifier of the radio transmitting section, and therefore degradation of a signal transmitted by subcarriers near the DC point is greater than degradation for signals transmitted by other subcarriers, if a multiplex signal with a low degree of multiplexing is allocated to subcarriers that include the DC point, as in the present invention, the error rate of this subcarrier can be improved. As a result, signal degradation on a subcarrier that is susceptible to degradation can be suppressed, thereby enabling highly reliable transmission to be performed overall.

A radio transmitting apparatus according to the present invention has a configuration comprising a multiplex signal allocation selecting section that selects multiplex transmit signals to be allocated to subcarriers, wherein that multiplex signal allocation selecting section preferentially allocates a multiplex signal with a low degree of multiplexing selected by a signal multiplexing degree selecting section to subcarriers at a distance from the center frequency.

According to this configuration, taking into consideration the fact that generally, in an OFDM-CDMA radio transmitting apparatus, the further a subcarrier is from the center frequency, the greater is the interference of other channels, and the greater is the degradation (amplitude deviation or phase deviation) of an analog filter in the radio transmitting section, signal degradation in such subcarriers, in particular, is suppressed by assigning a multiplex signal with a lower degree of multiplexing the further a subcarrier is from the center frequency. As a result, signal degradation of subcarriers susceptible to degradation can be suppressed, thereby enabling highly reliable transmission to be performed overall. Also, while side lobe components are larger in subcarriers at a distance from the center frequency, according to the present invention, the degree of signal multiplexing of these subcarriers is reduced, and therefore the transmission power of these subcarriers can be decreased, and side lobes can also be decreased. As a result, out-of-band leakage power can also be decreased.

A radio transmitting apparatus according to the present invention has a configuration comprising a signal power control section that raises signal power proportionally the lower the degree of signal multiplexing of subcarriers of a transmit signal.

According to this configuration, degradation of a multiplex signal transmitted by subcarriers that include the DC point, or subcarriers located at a distance from the center frequency, can be suppressed, enabling error rate characteristics to be significantly improved. Also, a further advantage of the present invention is that, since the degree of signal multiplexing of these subcarriers is lower than the degree of signal multiplexing of other subcarriers, even if signal power is increased to a certain extent there is little likelihood of the occurrence of a peak voltage greater than or equal to a predetermined value, which is a problem with the OFDM-CDMA method.

A radio transmitting apparatus according to the present invention has a configuration wherein a spreading section makes the spreading ratio proportionally larger for transmit signals that form a multiplex signal with a low degree of signal multiplexing selected by a signal multiplexing degree selecting section.

According to this configuration, since the signal-to-noise ratio is increased proportionally as the spreading ratio is increased, it is possible to obtain an effect of improvement of error rate characteristics through increasing the spreading ratio in addition to an effect of improvement of error rate characteristics through decreasing the degree of signal multiplexing, thereby significantly improving the error rate of, for example, important information or signals in a state in which they are susceptible to signal degradation, and enabling an OFDM-CDMA radio transmitting apparatus of significantly higher reliability to be implemented.

A radio transmitting apparatus according to the present invention has a configuration wherein the signal multiplexing degree selecting section includes a known signal in subcarriers for which the degree of signal multiplexing is set low.

According to this configuration, a known signal used in propagation path compensation, synchronization processing, or the like, on the receiving side, is allocated to subcarriers with a low degree of multiplexing of signals with a small propagation error rate, enabling the error rate characteristics of the known signal to be improved, as a result of which received signal propagation path compensation and synchronization processing can be performed with a high degree of accuracy, and a high-quality received signal can be obtained.

A radio transmitting apparatus according to the present invention has a configuration comprising a multiplex signal allocation selecting section that selects multiplex transmit signals to be allocated to subcarriers, wherein that multiplex signal allocation selecting section steers subcarriers to which is allocated a multiplex signal with a low degree of signal multiplexing selected by a signal multiplexing degree selecting section.

According to this configuration, it is possible to prevent the occurrence of burst errors when channel fluctuations are slow. That is to say, even when the degree of signal multiplexing of particular subcarriers has been reduced in order to improve the error rate characteristics of those signals, if channel fluctuations are slow, there is a risk of burst errors occurring in signals allocated to those subcarriers due to frequency selective fading. Focusing on this point, in the present invention the error rate characteristics of transmit signals that form a multiplex signal with a low degree of multiplexing can be significantly improved by steering so that the subcarriers to which a multiplex signal with a low degree of signal multiplexing is allocated are varied sequentially.

A radio transmitting apparatus according to the present invention has a configuration comprising a multiplex signal allocation selecting section that selects multiplex transmit signals to be allocated to subcarriers, wherein that multiplex signal allocation selecting section selects subcarriers to which a multiplex signal with a low degree of multiplexing is allocated according to the cell to which the communicating party belongs.

According to this configuration, the receiving side can easily identify the cell to which the station itself belongs, even if a signal for cell identification is not transmitted, by detecting subcarriers with a low degree of signal multiplexing. As a result, effective transmission efficiency can be improved.

A radio transmitting apparatus according to the present invention has a configuration comprising a modulation section that makes the modulation M-ary value of a transmit signal smaller the lower the degree of multiplexing of a multiplex signal selected by a signal multiplexing degree selecting section.

According to this configuration, since error rate characteristics are better the smaller the modulation M-ary value, the error rate characteristics of a multiplex signal with a low degree of multiplexing can be significantly improved.

A radio transmitting apparatus according to the present invention has a configuration wherein a spreading section executes one-times spreading processing on each of a plurality of transmit signals, a signal multiplexing degree selecting section selects the degree of multiplexing of each subcarrier so that the degree of multiplexing of each subcarrier is 1, and the radio transmitting apparatus further comprises a modulation section that makes the modulation M-ary value of transmit signals allocated to specific subcarriers smaller than the modulation M-ary value of transmit signals allocated to other subcarriers.

According to this configuration, the above-described radio transmitting apparatus can be extended to OFDM transmission, and it is also possible to improve the error rate characteristics of transmit signals allocated to specific subcarriers. As a result, if subcarriers that include the DC point, or subcarriers at a distance from the center frequency, for example, are selected as specific subcarriers, an OFDM signal can be formed in which degradation of error rate characteristics can be suppressed for subcarriers susceptible to error rate characteristic degradation.

A radio transmitting apparatus according to the present invention has a configuration wherein at least one of a plurality of transmit signals is a known signal, and the type or spreading code of that known signal is changed at the timing of the start of a transmit frame.

According to this configuration, frame synchronization can be performed easily by detecting the timing at which the known signal changes, the signal level peak timing after despreading processing, or the like, without adding a signal for frame synchronization on the receiving side, such as a preamble, for example, within a transmit signal. As a result, it is no longer necessary to insert a signal for frame synchronization such as a preamble. Therefore, the configuration can be simplified accordingly, and an OFDM-CDMA radio transmitting apparatus can be implemented with transmission efficiency improved inasmuch as a signal for frame synchronization such as a preamble need not be transmitted.

A radio transmitting apparatus according to the present invention has a configuration wherein a known signal is transmitted only at the start of a transmit frame.

According to this configuration, noting that in a case where the spreading code at the start of a frame is changed, a plurality of spreading codes must be assigned to a known signal and the necessary number of spreading codes increases, the necessary number of spreading codes is held down and frame synchronization can be achieved easily by spreading and transmitting a known signal only at the start of a transmit frame.

A radio transmitting apparatus according to the present invention has a configuration wherein a spreading section assigns a plurality of spreading codes to a specific transmit signal among a plurality of transmit signals.

According to this configuration, if a specific spread signal is despread on the receiving side using a plurality of spreading codes, and the signals after despreading are combined, it is possible to recover a specific signal with a high signal level. As a result, it is possible to perform OFDM-CDMA transmission with error rate characteristics significantly improved for a specific signal.

A radio transmitting apparatus according to the present invention has a configuration comprising a multiplex signal allocation selecting section that selects multiplex transmit signals to be allocated to subcarriers, wherein that multiplex signal allocation selecting section allocates a multiplex signal with a low degree of multiplexing, selected by a signal multiplexing degree selecting section, at intervals of a plurality of subcarriers.

According to this configuration, the error rate characteristics of a multiplex signal with a low degree of multiplexing can be significantly improved when the multipath delay time is short, for example. That is to say, the present invention was arrived at by noting that, in a propagation path environment in which multipath delay time is short, it may happen that the reception levels of a plurality of subcarriers close in frequency decline together, and error rate characteristics degrade in this case.

A radio transmitting apparatus according to the present invention has a configuration comprising a multiplex signal allocation selecting section that selects multiplex transmit signals to be allocated to subcarriers, wherein that multiplex signal allocation selecting section allocates a multiplex signal with a low degree of signal multiplexing, selected by a signal multiplexing degree selecting section, to a plurality of subcarrier groups.

According to this configuration, chips of a transmit signal spread by frequency domain spreading are allocated to a predetermined plurality of subcarriers, but if a plurality of subcarrier groups are provided to which a multiplex signal with a low degree of signal multiplexing among these is allocated, demodulation can be performed with a significantly lower error rate of a multiplex signal with a low degree of signal multiplexing by selecting and demodulating a plurality of subcarrier groups with the highest reception level among these subcarrier groups on the received signal, for example.

A radio transmitting apparatus according to the present invention has a configuration further comprising a known signal allocating section that changes the subcarriers to which a known signal is allocated according to the cell to which the communicating station belongs.

According to this configuration, it is possible for the receiving side to easily identify the cell to which it belongs by detecting the positions of subcarriers by which the known signal was transmitted, even if a signal for cell identification is not transmitted. As a result, transmission efficiency can be improved inasmuch as a signal for cell identification is not transmitted.

A radio transmitting apparatus according to the present invention has a configuration further comprising, in addition to the above-described configuration, a selecting section that selects the kind of known signal according to the cell to which the communicating station belongs.

According to this configuration, the number of cells that can be identified can be further increased.

A radio transmitting apparatus according to the present invention has a configuration comprising, in addition to an above-described configuration, a signal amplification section that makes the signal level of specific subcarriers to which a multiplex transmit signal composed of only a known signal is allocated higher than the signal level allocated to other subcarriers.

According to this configuration, the signal-to-noise ratio of pilot carriers can be increased, enabling cell identification characteristics to be significantly improved.

A radio transmitting apparatus according to the present invention has a configuration wherein the above-described signal amplification section has a bit shifting circuit.

According to this configuration, processing that raises the transmission level of a known signal after spreading above the transmission level of other subcarriers can be performed with a simple configuration.

A radio transmitting apparatus according to the present invention has a configuration wherein the above-described multiplex signal allocation selecting section changes subcarriers composed only of a known signal at the start of a frame.

According to this configuration, frame synchronization characteristics can be improved on the receiving side since frame synchronization acquisition can be performed using both pilot carriers and a pilot channel.

A radio transmitting apparatus according to the present invention has a configuration wherein, in addition to an above-described configuration, a known signal is changed only at the start of a frame.

According to this configuration, it is possible to increase the number of cells that can be used.

A radio transmitting apparatus according to the present invention has a configuration further comprising a level varying section that changes the signal level of each subcarrier adaptively according to the degree of signal multiplexing.

According to this configuration, by lowering the signal level of subcarriers other than subcarriers with a low degree of multiplexing relative to the signal level of subcarriers with a low degree of multiplexing, for example, by means of the level varying section, it is possible to significantly improve the quality of signals assigned to subcarriers with a low degree of signal multiplexing while satisfactorily reducing peak power, which is a problem in OFDM-CDMA transmission.

A radio transmitting apparatus according to the present invention has a configuration wherein the above-described level varying section has a bit shifting circuit.

According to this configuration, it is possible to improve the quality of signals assigned to subcarriers with a low degree of signal multiplexing by means of a much simpler configuration, while satisfactorily reducing peak power, which is a problem in OFDM-CDMA transmission.

A radio transmitting apparatus according to the present invention has a configuration wherein the above-described level varying section changes the signal level of each subcarrier according to the channel quality.

According to this configuration, it is possible to suppress an undesired increase in peak power and improve error rate characteristics.

A radio transmitting apparatus according to the present invention has a configuration comprising a plurality of antennas, wherein subcarriers with a high degree of signal multiplexing and subcarriers with a low degree of signal multiplexing are transmitted from different antennas.

According to this configuration, it is possible to increase the signal level of subcarriers with a low degree of signal multiplexing without being overly concerned about peak power, as a result of which signals assigned to subcarriers with a low degree of signal multiplexing can be transmitted with significantly higher quality.

A radio transmitting apparatus according to the present invention has a configuration wherein the above-described signal multiplexing degree selecting section changes the degree of multiplexing according to the channel quality.

According to this configuration, for example, transmission efficiency is raised by increasing the degree of multiplexing when channel quality is good, and conversely, degradation of error rate characteristics is prevented by reducing the degree of multiplexing when channel quality is poor. As a result, it is possible to make an improvement in error rate characteristics compatible with an improvement in transmission efficiency.

A radio transmitting apparatus according to the present invention has a configuration wherein a known signal is transmitted only at the timing of the start of a transmit frame and that known signal is transmitted assigned to subcarriers with a low degree of signal multiplexing, and wherein a signal multiplexing degree selecting section makes the degree of signal multiplexing of subcarriers with a low degree of signal multiplexing to which the known signal is assigned lower at the timing of the start of a transmit frame.

According to this configuration, it is possible to improve the accuracy of frame synchronization detection with almost no lowering of spectral efficiency.

A radio transmitting apparatus according to the present invention has a configuration wherein the above-described signal multiplexing degree selecting section preferentially assigns a transmit signal destined for a communicating station for which there are a large number of retransmissions to subcarriers with a low degree of multiplexing.

According to this configuration, since propagation degradation is small for subcarriers with a low degree of signal multiplexing, the probability of retransmission of signals assigned to these subcarriers decreases. As a result, it is possible to suppress a further increase in the number of retransmissions of transmit signals for which the number of retransmissions is already high. By this means, a drop in throughput and transmission delay time can be prevented.

A radio transmitting apparatus according to the present invention has a configuration wherein a null signal is transmitted by subcarriers adjacent to subcarriers with a low degree of signal multiplexing.

According to this configuration, it is possible to prevent degradation of error rate characteristics when the speed of movement is high.

A radio transmitting apparatus according to the present invention has a configuration wherein subcarriers with a low degree of signal multiplexing are located at intervals of one or more subcarriers, and also a null signal is transmitted by subcarriers between those subcarriers with a low degree of signal multiplexing.

According to this configuration, it is possible to prevent degradation of error rate characteristics significantly more effectively when the speed of movement is high.

A radio transmitting apparatus according to the present invention has a configuration wherein amplitude limiting is performed independently for subcarriers for which the degree of multiplexing is set low and for other subcarriers.

According to this configuration, it is possible to keep the adverse effects of peak power to a minimum, and to significantly improve the error rate characteristics of subcarriers for which the degree of multiplexing is set low.

A radio transmitting apparatus according to the present invention has a configuration wherein the number of a preamble for propagation path estimation is set independently for each subcarrier.

According to this configuration, since error rate characteristics are better the longer the propagation path estimation preamble inserted, by setting the number of a propagation path estimation preamble independently for subcarriers for which the degree of multiplexing is set low and for other subcarriers, according to the propagation path status or the importance of the transmit signal, for example, an improvement in the error rate and transmission efficiency can be made compatible to a significantly greater extent.

A configuration is provided that comprises a spreading section that spreads a plurality of transmit signals using different spreading codes, a spread signal shifting section that shifts a spread signal obtained by the spreading section by one or more chips, a multiplexing section that multiplexes a spread signal obtained by the spreading section and a shifted spread signal obtained by the spread signal shifting section, and a multicarrier transmitting section that transmits a code division multiplexed signal obtained by the multiplexing section assigned to a plurality of subcarriers.

According to this configuration, since the probability of disruption of orthogonality being severe for both the unshifted code division signal and the shifted code division signal is low, a received signal with good error rate characteristics can be obtained by selecting or combining the despread values of one or other thereof.

A configuration is provided wherein processing by the above-described spread signal shifting section and the above-described multiplexing section is performed only for a specific transmit signal.

According to this configuration, it is possible to improve the error rate characteristics of a transmit signal to a specific user without degrading error rate characteristics when transmit signals are viewed as a whole.

A configuration is provided wherein processing by the above-described spread signal shifting section and the above-described multiplexing section is performed only for a known signal.

According to this configuration, it is possible to improve the error rate characteristics of a known signal without degrading error rate characteristics of other transmit signals code division multiplexed with the known signal.

A configuration is provided wherein processing by the above-described spread signal shifting section and the above-described multiplexing section is performed only for the start of a frame.

According to this configuration, it is possible for frame synchronization detection processing to be performed on the receiving side without increasing the number of spreading codes or increasing the number of known signals.

A configuration is provided wherein the above-described spread signal shifting section varies the number of chips shifted.

According to this configuration, it is possible to prevent the occurrence of a state in which severe disruption of orthogonality between spreading codes continues for a long period, thereby enabling the possibility of burst errors occurring to be greatly reduced.

A configuration is provided wherein the above-described spread signal shifting section changes the shift amount and forms a plurality of spread signals with different shift amounts, and the above-described multiplexing section multiplexes a predetermined number of spread signals among that plurality of plurality of spread signals with different shift amounts with a spread signal obtained by the above-described spreading section.

According to this configuration, spread signals with different shift amounts can be code division multiplexed with an arbitrary degree of multiplexing, and therefore it is possible to effectively improve the error rate characteristics of a specific transmit signal, while suppressing a decline of the error rate characteristics of other transmit signals.

A configuration is provided wherein the degree of multiplexing of above-described shifted spread signals multiplexed by the above-described multiplexing section is selected according to the channel quality.

According to this configuration, if the degree of multiplexing of a signal shifted by one or more chips is increased in proportion to the poorness of channel quality, for example, it is possible to effectively improve the error rate of a user with poor channel quality.

A configuration is provided that further comprises a signal multiplexing degree selecting section that selects on a sub-carrier-by-subcarrier basis the degree of multiplexing of above-described transmit signals transmitted by subcarriers, wherein that signal multiplexing degree selecting section assigns a code division multiplexed signal that includes shifted spread signals multiplexed by the above-described multiplexing section to subcarriers for which the degree of signal multiplexing is set low.

According to this configuration, since inter-code interference on the propagation path is less for transmit signals allocated to subcarriers with a low degree of signal multiplexing than for transmit signals allocated to subcarriers with a high degree of signal multiplexing, it is possible to significantly improve the error rate of a code division multiplexed signal that includes shifted spread signals.

A configuration is provided wherein the degree of multiplexing of an above-described shifted spread signal multiplexed by the above-described multiplexing section is selected according to the degree of signal multiplexing of subcarriers to which that shifted spread signal is assigned.

According to this configuration, if the degree of multiplexing of a shifted spread signal is made larger when the degree of signal multiplexing of subcarriers is low, and the degree of multiplexing of a shifted spread signal is made lower when the degree of signal multiplexing is high, it is possible to effectively improve the error rate characteristics of a transmit signal to a specific user, while suppressing a decline of the error rate characteristics of transmit signals to other users.

A configuration is provided wherein the shift amount is changed according to the cell to which the communicating party belongs.

According to this configuration, it is possible for the communicating station to identify the cell to which the station itself belongs by detecting the number of chips by which a signal is shifted.

A configuration is provided wherein the above-described spread signal multiplexing section changes the shift amount at the start of a frame.

According to this configuration, by, for example, multiplexing a code division signal shifted by one or more chips and the original code division signal throughout an entire frame, and changing the number of chips shifted only at the start of a frame, it is possible to perform frame synchronization detection, and also to obtain an effect of improvement in error rate characteristics.

A configuration is provided further comprising a preamble inserting section that sets the propagation path estimation preamble insertion interval independently for each subcarrier.

According to this configuration, it is possible to improve the error rate characteristics of a user for which propagation path fluctuations are large, such as a user moving at high speed, with almost no lowering of transmission efficiency.

A configuration is provided wherein a differential modulation method is used only for transmit signals corresponding to a multiplex signal with a low degree of multiplexing selected by the above-described signal multiplexing degree selecting section.

According to this configuration, it is possible to significantly improve the error rate characteristics of a user moving at high speed.

A radio receiving apparatus according to the present invention has a configuration comprising an orthogonal conversion section that executes orthogonal conversion processing on a received signal, a multiplex signal discrimination section that divides a signal that has undergone orthogonal conversion into a multiplex signal with a low degree of multiplexing and a multiplex signal with a high degree of multiplexing, and an identifying section that identifies the cell to which the station itself belongs by discriminating subcarriers to which a multiplex signal with a low degree of multiplexing is assigned.

According to this configuration: the cell to which a station itself belongs can be identified easily by detecting subcarriers with a low degree of signal multiplexing.

A radio receiving apparatus according to the present invention has a configuration comprising an orthogonal conversion section that executes orthogonal conversion processing on a received signal, a multiplex signal discrimination section that divides a signal that has undergone orthogonal conversion into a multiplex signal with a low degree of multiplexing and a multiplex signal with a high degree of multiplexing, and a frame synchronization signal detecting section that obtains a frame synchronization signal by finding the maximum value detection timing of the correlation value between a multiplex signal with a low degree of multiplexing and a known signal or spreading code.

According to this configuration, since a frame synchronization signal is obtained by detecting the maximum value of the correlation value between a multiplex signal with a low degree of multiplexing and a known signal or spreading code, a frame synchronization signal can be obtained accurately and easily based on a signal with good error rate characteristics.

A radio receiving apparatus according to the present invention has a configuration comprising an orthogonal conversion section that executes orthogonal conversion processing on a received signal, a multiplex signal discrimination section that divides a signal that has undergone orthogonal conversion into a multiplex signal with a low degree of multiplexing and a multiplex signal with a high degree of multiplexing, a combining section that combines multiplex signals with a low degree of multiplexing allocated to a plurality of subcarrier groups, and a despreading section that extracts a predetermined signal from multiplexed signals by despreading a signal after combining using a predetermined spreading code.

According to this configuration, since multiplex signals with a low degree of signal multiplexing allocated to a plurality of subcarrier groups are combined, it is possible to obtain a received signal with a high signal level. As a result, multiplex signals for which the transmission error rate has been decreased by setting the degree of multiplexing low are further combined, and the received signal level is thereby raised, enabling a multiplex signal with a significantly improved error rate to be obtained.

A radio transmitting method according to the present invention comprises a spreading step of spreading a plurality of transmit signals using different spreading codes, an orthogonal frequency division multiplexing step of assigning spread signals to a plurality of subcarriers that are in a mutually orthogonal relationship, and a signal multiplexing degree selecting step of selecting on a subcarrier-by-subcarrier basis the degree of multiplexing of transmit signals transmitted by subcarriers.

According to this method, inter-code interference on the propagation path is smaller for transmit signals assigned to subcarriers with a low degree of transmit signal multiplexing than for transmit signals assigned to subcarriers with a high degree of multiplexing. As a result, compared with a case in which the degree of signal multiplexing is decided uniformly for all subcarriers, if transmit signals representing important information are assigned to subcarriers with a low degree of signal multiplexing and transmit signals representing other information are assigned to subcarriers with a high degree of signal multiplexing, for example, degradation of the error rate characteristics of important information can be prevented without lowering spectral efficiency significantly. By this means, an OFDM-CDMA radio transmission method can be implemented that enables spectral efficiency and error rate characteristics to be made compatible.

As described above, according to the present invention an OFDM-CDMA radio transmitting apparatus and radio receiving apparatus are implemented that make it possible to make spectral efficiency compatible with error rate characteristics, by appropriately selecting the degree of transmit signal multiplexing by means of subcarriers when performing frequency domain spreading of transmit signals using the OFDM-CDMA method.

This application is based on Japanese Patent Application No. 2001-359964 filed on Nov. 26, 2001, Japanese Patent Application No. 2002-31243 filed on Feb. 7, 2002, and Japanese Patent Application No. 2002-115537 filed on Apr. 17, 2002, entire contents of which are expressly incorporated by reference herein.

INDUSTRIAL APPLICABILITY

The present invention is applicable to a radio communication system that uses the OFDM-CDMA method.

The invention claimed is:

1. An OFDM transmitting apparatus comprising:
an inserting section configured to insert a propagation path estimation signal into a plurality of user data;
an OFDM signal forming section configured to form a plurality of OFDM signals from the plurality of user data and from the propagation path estimation signal; and
a plurality of transmitting sections configured to transmit the plurality of OFDM signals from a plurality of antennas,
wherein, when both of the propagation path estimation signal and the plurality of user data are to be transmitted simultaneously in a same symbol interval, the propagation path estimation signal is transmitted from one antenna by using a specific subcarrier, and the plurality of user data are transmitted from the plurality of antennas by using only subcarriers other than the specific subcarrier.

2. A communication terminal apparatus comprising the OFDM transmitting apparatus according to claim 1.

3. A base station apparatus comprising the OFDM transmitting apparatus according to claim 1.

4. The OFDM transmitting apparatus according to claim 1, wherein each of the plurality of antennas is configured to transmit a different one of the plurality of user data in the same time interval.

5. A transmitting method comprising:
inserting a propagation path estimation signal into a plurality of user data;
forming a plurality of OFDM signals from the plurality of user data and from the propagation path estimation signal; and
transmitting the plurality of OFDM signals from a plurality of antennas,
wherein, when both of the propagation path estimation signal and the plurality of user data are to be transmitted simultaneously in a same symbol interval, the propagation path estimation signal is transmitted from one antenna by using a specific subcarrier, and the plurality of user data are transmitted from the plurality of antennas by using only subcarriers other than the specific subcarrier.

* * * * *